US011565359B2

(12) United States Patent
Sheldon et al.

(10) Patent No.: US 11,565,359 B2
(45) Date of Patent: Jan. 31, 2023

(54) POSITIONING AND CENTERING DEVICE, SYSTEM, AND METHOD FOR USE WITH A TEMPLATE GUIDANCE SYSTEM FOR A PANTOGRAPH ROUTER

(71) Applicant: Woodcraft Solutions LLC, Oregon City, OR (US)

(72) Inventors: Dwight Sheldon, Oregon City, OR (US); Kuldeep Singh, Kyoto (JP)

(73) Assignee: Woodcraft Solutions LLC, Oregon City, OR (US)

( * ) Notice: Subject to any disclaimer, the term of this patent is extended or adjusted under 35 U.S.C. 154(b) by 410 days.

(21) Appl. No.: 16/813,460

(22) Filed: Mar. 9, 2020

(65) Prior Publication Data

US 2020/0206856 A1 Jul. 2, 2020

Related U.S. Application Data

(63) Continuation-in-part of application No. 15/650,794, filed on Jul. 14, 2017, now Pat. No. 10,639,754.

(51) Int. Cl.
*B27C 5/04* (2006.01)
*B23Q 9/00* (2006.01)
*B27C 5/10* (2006.01)

(52) U.S. Cl.
CPC .............. *B23Q 9/0028* (2013.01); *B27C 5/04* (2013.01); *B27C 5/10* (2013.01)

(58) Field of Classification Search
CPC ...... B23Q 35/00; B23Q 35/005; B23Q 35/02; B23Q 35/04; B23Q 35/08; B23Q 35/10;
(Continued)

(56) References Cited

U.S. PATENT DOCUMENTS 4,561,478 A 12/1985 Fields
4,733,997 A 3/1988 Ford et al.
(Continued)

OTHER PUBLICATIONS

Educating Savvas, Testing Four Engraving Bits / CNC V Carving, Dec. 31, 2016, https://www.youtube.com/watch?v=Z1j9yGPqlA0 (Year: 2016).*

(Continued)

*Primary Examiner* — Matthew Katcoff
(74) *Attorney, Agent, or Firm* — Howard Russell

(57) ABSTRACT

Positioning and centering device, system, and method comprises a pointer having a flat-surface portion and able to be chucked in a cutting-bit holder, together with a thickness gauge mounted relative to a template holder cross member having a positioning and centering hole therein, a centering line on an associated workpiece cutting table, an adjustable fence and scale combination, and a guide-bearing shaft collar, wherein the method comprises inserting the pointer into the router chuck, adjusting the template holder, and the router pinned to the template holder, and through a center hole of a template, to align the pointer with the workpiece table centering line, using the thickness gauge to determine a workpiece thickness midpoint, using the fence and scale combination to center the workpiece on the table, and using the locking collar to enable easy re-location of the guide bearing relative to the tapered template on a subsequent workpiece.

20 Claims, 29 Drawing Sheets

(58) Field of Classification Search
CPC ........ B23Q 35/42; B23Q 35/44; B23Q 35/46; B23Q 33/00; B27C 5/00; B27C 5/003; B27F 5/00; B27F 5/02; B27F 5/12; B27F 1/00; B27F 1/02; B27F 1/04; B27F 1/08; B27F 1/10; B27F 1/12; B27F 1/14; B27F 1/16

See application file for complete search history.

(56) References Cited

U.S. PATENT DOCUMENTS

| | | |
|---|---|---|
| 5,494,089 A | 2/1996 | Lubbe |
| 6,736,173 B1 | 5/2004 | Grisley et al. |
| 6,845,699 B1 | 1/2005 | Anton |
| 2004/0022595 A1 | 2/2004 | Owen |
| 2005/0236069 A1 | 10/2005 | O'Brien |
| 2006/0021676 A1 | 2/2006 | McDaniel et al. |
| 2009/0290949 A1 | 11/2009 | Steger |

OTHER PUBLICATIONS

Matthias Wandel, Assembling the Hybrid PantoRouter (2015 version), Oct. 13, 2015, https://woodgears.ca/pantorouter/assembly/index.html (Year: 2015).*

PantoRouter, Legacy Video about alignment of the PantoRouter™, Oct. 17, 2015, https://www.youtube.com/watch?v=vQh5ZHHP6x0 (Year: 2015).*

Matthias Wandel, How the pantorouter works, posted at youtube.com, published Dec. 12, 2010, © Standard YouTube License, [online], [site visited Aug. 1, 2017], 67 pages, available from Internet, <URL:https://www.youtube.com/watch?v=8wZ1v4PlsYl>.

Matthias Wandel, The Pantorouter, posted at woodgears.ca, [online], [site visited Aug. 2, 2017], 5 pages, available from Internet, <URL:https://woodgears.ca/pantorouter/>.

Humwer, Templates, posted at humwer.com, © humwer Inh. Werner Hummel—2015, [online], [site visited Aug. 2, 2017], 3 pages, available from Internet, <URL:http://www.humwer.com/en/Templates/>.

Dwight Sheldon, predecessor template with very minimal outer tapering only sold by applicant in 2015, photograph, 1 page.

Dwight Sheldon, predecessor template holder sold by applicant in 2015, photograph, 1 page.

GuidoZelf, Templates for Tenons & Mortises for Pantorouter (Woodworking router accessory), Aug. 1, 2015, 2 pages, https://www.thingiverse.com/thing:951634 (Year: 2015).

Pantorouter, Butterfly Mortise and tenon joint by Hybrid Pantorouter, Sep. 4, 2016, 1 page, https://www.youtube.com/watch?v=5yGoiqCLTk8 (Year: 2016).

Pantorouter, making large mortise and tenon by hybrid pantorouter, Jun. 7, 2013, 1 page, https://www.youtube.com/watch?v=-QxgrukqFGc (Year: 2013).

* cited by examiner

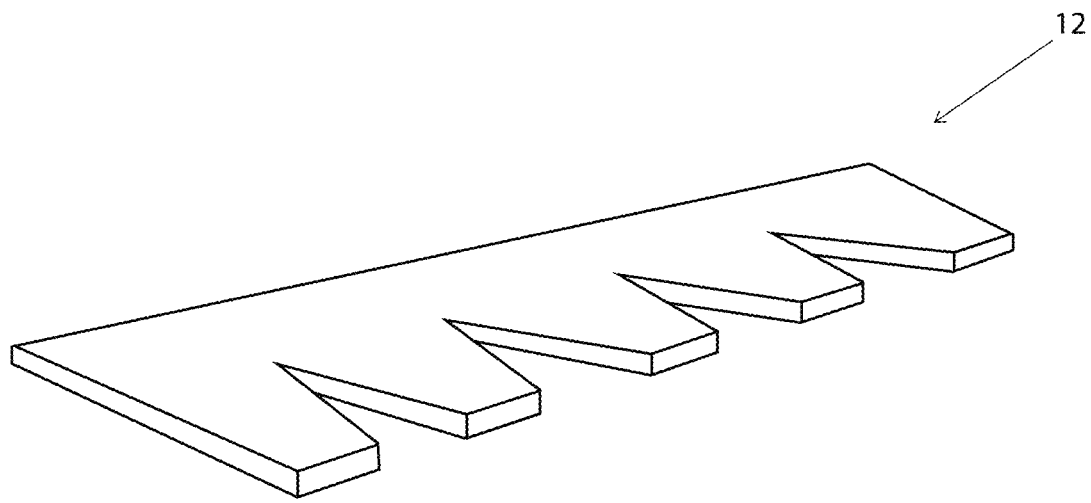
FIG. 1A — Prior Art
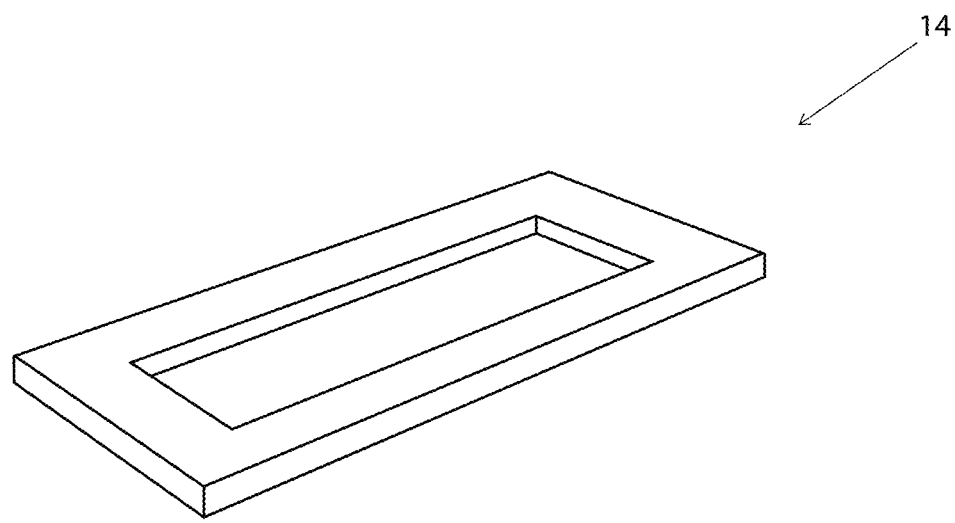
FIG. 1B — Prior Art

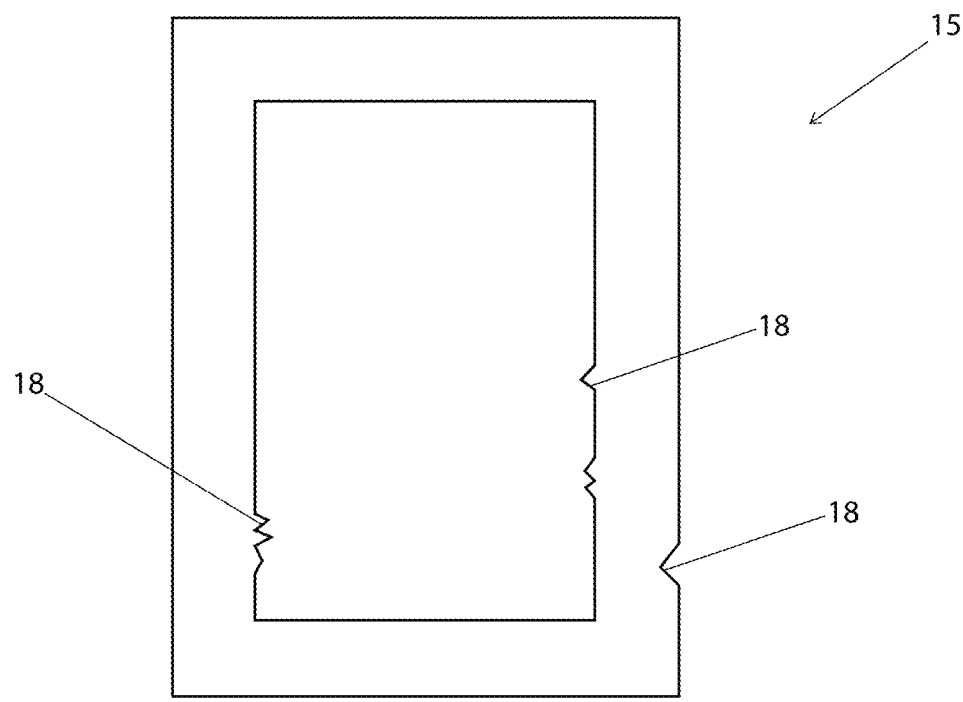
FIG. 1C — Prior Art
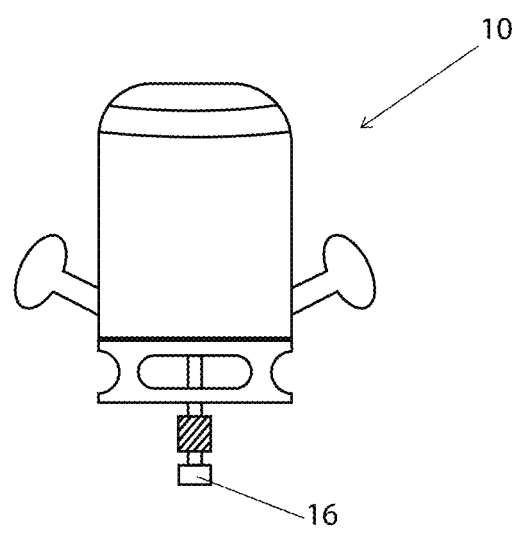
FIG. 1D — Prior Art

Mortise and Tenon Bit and Guide Bearing Calculation Tool

Inch Template Dimensions

| | | | | |
|---|---|---|---|---|
| Tenon | Mortise and Tenon Thickness | 1/2 | inch | |
| | Mortise and Tenon Width | 2 1/2 | inches | |
| | Bit Diameter | 1/2 | inch | |
| | Tenon GB Diam | 0.87 | inch | 22 mm |
| | 2(Width + Bit) − Guide Bearing = Template Width | | | 5.13 inches wide |
| | 2(Width + Bit) − Guide Bearing = Template Width | | | =2*(D5+D6)−D7 |
| | 2(Thickness + Bit) − Guide Bearing = Template Thickness | | | 1.13 inches Tall |
| | 2(Thickness + Bit) − Guide Bearing = Template Thickness | | | =2*(D4+D6)−D7 |
| Mortise | Mortise and Tenon Thickness | 1/2 | inch | |
| | Mortise and Tenon Width | 2 1/2 | inches | |
| | Bit Diameter | 1/2 | inch | |
| | Mortise GB Diam | 0.39 | inch | 10 mm |
| | 2(Width − Bit) + Guide Bearing = Template Width | | | 4.39 inches Wide |
| | 2(Width − Bit) + Guide Bearing = Template Width | | | =2*(D16−D17)+D18 |
| | 2(Thickness − Bit) + Guide Bearing = Template Thickness | | | 0.39 inches Tall |
| | 2(Thickness − Bit) + Guide Bearing = Template Thickness | | | =2*(D15−D17)+D18 | mm Template Dimensions

| | | | | |
|---|---|---|---|---|
| Tenon | Mortise and Tenon Thickness | 1/2 | inch | |
| | Mortise and Tenon Width | 2 1/2 | inches | |
| | Bit Diameter | 1/2 | inch | |
| | Tenon GB Diam | 0.87 | inch | 22 mm |
| | 2(Width + Bit) − Guide Bearing = Template Width | | | 130 mm Wide |
| | 2(Width + Bit) − Guide Bearing = Template Width | | | =(2*(K5+K6)−K7)*25.4 |
| | 2(Thickness + Bit) − Guide Bearing = Template Thickness | | | 28.70 mm Tall |
| | 2(Thickness + Bit) − Guide Bearing = Template Thickness | | | =(2*(K4+K6)−K7)*25.4 |
| Mortise | Mortise and Tenon Thickness | 1/2 | inch | |
| | Mortise and Tenon Width | 2 1/2 | inches | |
| | Bit Diameter | 1/2 | inch | |
| | Mortise GB Diam | 0.39 | inch | 10 mm |
| | 2(Width − Bit) + Guide Bearing = Template Width | | | 112 mm Wide |
| | 2(Width − Bit) + Guide Bearing = Template Width | | | =(2*(K16−K17)+K18)*25.4 |
| | 2(Thickness − Bit) + Guide Bearing = Template Thickness | | | 10 mm Tall |
| | 2(Thickness − Bit) + Guide Bearing = Template Thickness | | | =(2*(K15−K17)+K18)*25.4 |

FIG. 26

POSITIONING AND CENTERING DEVICE, SYSTEM, AND METHOD FOR USE WITH A TEMPLATE GUIDANCE SYSTEM FOR A PANTOGRAPH ROUTER

CROSS-REFERENCE TO RELATED APPLICATION

The present patent application is a continuation-in-part patent application filed under 35 U.S.C. § 120 and claiming the priority and benefit of U.S. patent application Ser. No. 15/650,794, filed 14 Jul. 2017.

FIELD OF INVENTION

The present invention relates to a template-guided system for routers, and more particularly to a device, system, and method, or methods, for facilitating efficient, easily-repeatable, highly accurate router cuts on workpieces using a pantograph-type router system further comprising a readily adjustable template holder for holding a tapered template guide that is readily adjustable and easily positioned and centered on the template holder.

BACKGROUND OF INVENTION

As shown in FIGS. 1A-D, a router 10 (as shown in FIG. 5) has been commonly used with a pattern or jig 12, 14, 15 to follow a shape or a form. Some jigs have used a bit-mounted guide bearing 16 to follow the shape, and some jigs have used the base of the router, or a collar around the bit, to follow the inside or outside of a pattern. These have all been one-to-one ratio router guide systems where the pattern 12, 14 has been the same size, or has allowed the same travel, as the desired carved or cut pattern or shape in the workpiece.

A Hybrid PantoRouter™, such as a PantoRouter™ 49 shown in FIGS. 5 and 16-18 (otherwise known as a pantograph-type router system), and other router systems, have used a router to make cuts in wood, plastic and soft metals. The bit 52 for such a router 49 typically spins at up to ~24,000 RPM and is often difficult to precisely control using conventional, manually-operated, methods and commonly available jigs and templates. Templates and template holder systems available to date, such as those from JDS Multi-Tools or Rockler Woodworking and Hardware, have been manufactured and sold in fixed sizes and shapes and have not allowed the degree of fine adjustment provided by the present disclosure to compensate for slightly different router bit diameters, for example as may have been encountered from one bit manufacturer to another, to allow for desired glue space, or to compensate for different wood species. The manufacturer of the JDS Multi-Tools and Rockler Woodworking and Hardware jigs have offered different templates of slightly different sizes, but no other system has been provided by the prior art to allow simple micro-adjustment of a router like that of the present template system.

Pantograph-type router systems comprise a guide bearing that is adapted to follow along a template, and the position of such a guide bearing has been adjustable to varying depths relative to the tapered template to affect the positioning of the guide bearing relative to the template used to create, for example mortise and tenon, joints for joining wood members together. Despite the improvements represented by using tapered templates as otherwise described in previous related applications, this adjustment of the guide bearing of the pantograph-type router system has still been somewhat time-consuming and has required a certain amount of trial and error to set the depth of the guide bearing to an appropriate depth—therefore, the development of additional means and methods to further facilitate the accuracy and efficiency of cutting operations, such as are for example involved in creating joinery, would be desirable.

A common method of alignment of a workpiece on a mount or table has been to measure the thickness of the workpiece using a scale or caliper, after which the user, or operator, has moved the router or mount to center the desired joint or shape on the workpiece. A common method of fitting the joint has been to cut the mortise first then to have adjusted the size of the tenon for the proper fit. This common method has required trial and error to find the desired fit each time a similar joint has been cut. A prior method of aligning a template, or templates, so that they have been centered on a template holder, has involved a more time-consuming effort of attempting to center the template, or templates, on the template holder using a ruler and a straight-edge combined to assure that the template is located in the horizontal center of the template holder in order to facilitate greater uniformity of cuts and carves.

With these common methods, there have often been required more manual measuring, multiple test cuts, and fine-tuning before a cut has been accurately centered. Of course, a downside of such a system has been wasted material, more time-consuming measuring, uncertainty in the process of cutting, and this has also resulted in a final product that has frequently not been as precise as would otherwise have been desirable. This in turn has led to woodworking joints, for example, such as mortise and tenon, dovetail, and box joints, that have not been as durable and have not been as accurately-fitting as would otherwise have been desirable. To attain the same level of precision joinery as the presently claimed device or system would have taken much longer for set-up and multiple test cuts per earlier methods. And these prior more time-consuming, trial and error-type, methods have led to more time spent as cutting work has needed to be repeated for sometimes many of the same size or type workpieces, similar size, or similar type workpieces while making the same, or similar, sizes of cuts.

Thus, for example in the case of a production facility, users have been required in the past to cut many mortise and tenon joints for multiple same, or similar, workpieces even when using the same cutting bit. And in the past, even though such joints may have been cut using a template with the same taper, there has nevertheless been required a more time-consuming setup and test-cutting process for each piece. Thus, in the past users have had to use more trial and error to re-position the cutting system relative to each new workpiece, or to make another same, or similar, cut on a newly positioned workpiece, regardless whether the same cutting bit has been used or not.

One such prior trial-and-error method developed after the tapered templates of the co-pending parent patent application were invented, has involved using index marks on such a tapered template, in order to know better where to locate the guide bearing on the template.

With such prior trial and error methods, a user has simply made a larger cut tenon and has tested it against a previously cut mortise that had been cut using an appropriate-width bit (usually with a bit that was about the same width as the mortise). Since the thus-cut tenon was known to be larger than would have fit in the mortise, subsequent cuts by moving the guide bearing further along the taper, to achieve a slightly smaller tenon, have been tried and tested again with the mortise. This process was repeated until the tenon would have fit in the mortise. Unfortunately, however, with past such methods, the only known way to have known where to relocate the guide bearing on the template for a new cut, has been to align it with a previously-noted index mark on the tapered template (i.e., after the co-pending parent application was filed). And while this was preferable to some prior trial-and-error methods, it still has been less than ideal, since sometimes different template have been required for a similar tenon (for example for a wider tenon), since cutting bits have worn over time (sometimes requiring new setups), and since still other steps have been needed that would have been better eliminated (e.g., a step of aligning the guide bearing with an appropriate index mark on the tapered template for each new cut).

With the index marking placed along the taper on the templates, as developed after the co-pending parent application, the user was simply enabled in identifying the template marking at which a correct-sized tenon was cut (again through trial and error at least the first time through), so thereafter as long as the user was using a same-sized cutting blade from the same manufacturer, the user could thus be assured that putting the guide bearing at that same location on the template again would produce another same-sized, appropriately-fitting, tenon.

Further, while many prior art templates available today have been factory-supplied and are of good quality, nevertheless imperfections in such factory-supplied templates as shown at 18 on FIG. 1C, or in custom-made templates, have been transferred to the cut or carving at full scale. This in turn has provided a lower quality, less durable, or slower output in design and functionality than would otherwise have been desirable.

SUMMARY OF THE INVENTION

A PantoRouter™-type system is advantageous over the prior art, since the aforementioned imperfections in a template are minimized by a reduction in scale of cutting movements, and hence such a system enables a cleaner and more precise cut. And a cleaner, more precise cut, results in a more pleasing, accurate, repeatable and durable resulting workpiece joinery.

The invention shown, described, and claimed herein addresses the problems of prior art router template systems, and it contributes to a more accurate, efficient, repeatable, pleasing appearance, and faster cut on a workpiece, as well as a safer operating environment for operators. The device and system of the present disclosure is preferably used with a pantographic-type router mount with a 2:1 mechanical advantage for the router, and this mechanical advantage gives the operator control and precision superior to any other manually-controlled means of operation.

In accordance with an aspect of the disclosure, there is provided a tapered relationship between a template and a guide bearing for following the template, wherein preferably the templates, or template, are mounted on a moveable template holder system, or armature, mounted on a moveable or stationary carriage, and wherein preferably the guide bearing, for following the template, is located on a pantographic mount.

In accordance with a first embodiment of this aspect of the disclosure, there is provided a template which is stepped and/or tapered, either on an inside surface, or on an outside surface, or optionally on both inside and outside surfaces, to allow micro-adjustments to cuts, or carvings, in the workpiece to allow greater precision, for example as in joining two workpieces together. Thus, the guide bearing can be moved up or down (in or out on) the steps or taper on the template, which creates a larger or smaller cut in the workpiece by the router bit.

Thus, in accordance with a first embodiment of the disclosure in accordance with this aspect of the disclosure, there is provided a router guide template comprising: a base portion; a top portion; and at least one of an exterior surface interconnecting the base portion and the top portion along an outer periphery of the template and an interior surface interconnecting the base portion and the top portion along an inner periphery of the template, wherein the at least one of the exterior surface and the interior surface is continuously tapered or stepped between the base portion and the top portion, and wherein the base portion is adapted for removable and adjustable interconnection with a template holder. In those templates having an interior surface, the interior surface may be tapered, not tapered, or stepped, and the interior surface and the base portion together may form a concave, stadium bowl-shaped interior in the case of a stadium-shaped templates common for creating mortise and tenon-type joinery.

The stadium shape is a geometric figure consisting of a rectangle with top and bottom lengths a, and the ends of which are capped off with semi-circles of radius r. The area of a stadium is therefore given by $A=\pi r2+2\ r\ a$, and the perimeter by $p=2\ (\pi r+a)$. While a stadium-shaped template, with a stadium-shaped outer periphery and a stadium-shaped inner periphery, or stepped inner periphery, is commonly, and even preferably employed in mortise and tenon joinery creation, it will be appreciated that other shapes, such as elliptical, circular, square, round, curved, or other shape appropriate to the desired design outcome, whether for joinery or otherwise, may also be employed in accordance with the present disclosure without departing from its true scope as claimed. Therefore, where stadium is mainly used herein to describe the shapes of the outer and inner peripheries of templates herein (and stadium may be interchangeably used with elliptical herein as pertaining to the drawings), it will be appreciated that elliptical, circular, square, or other basic shapes in accordance with a desired design outcome, whether for joinery or otherwise, may also be substituted without limiting the device as claimed.

Combining the outside surface (tenon template) together with the inside surface (mortise template) in a single template allows the operator to cut both mortise and tenon joints using the same setup, unlike prior art templates, which have required multiple additional steps (and therefore increased errors and time to set up) by an operator to achieve the same result.

In an alternative embodiment of this aspect of the disclosure, further comprising both an exterior surface and an interior surface formed by concave stepped-bowl-like edges and a base portion, where the interior surface actually comprises stepped interior surfaces, each surface forming in cross section a stadium (to form larger (upper) and smaller (lower) stadiums having partially concentric end portions) in cross section and having a larger circumference upper interior surface preferably at least at ends of the stadium shape thereof, and a smaller circumference lower interior surface also forming an inner stadium in cross section. In this embodiment, preferably an intermediate portion (i.e., the longer edges of the stadium bowl-shaped interior) of the interior surfaces forming the stadium-shaped concave, stepped-bowl-like edges are preferably the same width for both the upper interior surface and the lower interior surface, but there preferably is a step at each end in the interior portion of this embodiment of the template which is formed in between the two interior surfaces at each end of the stadium-bowl-shaped interior surfaces. This configuration of template allows the creation of a mortise having a larger or smaller width to allow more or less adjustability of the mortise and tenon joint.

Thus, in accordance with this embodiment and aspect of the disclosure, there is provided a router guide template, further comprising both an exterior surface and an interior surface, wherein the interior surface further comprises a plurality of stepped interior surfaces, an upper interior surface generally describing in cross section a stadium, or alternatively an elongated ellipse, having first and second ends and an elongated middle portion and a lower interior surface generally describing in cross section a stadium having first and second ends and an elongated middle portion, wherein at least the ends of the lower interior surface comprise a smaller circumference surface than at least the ends of the upper interior surface such that an intermediate step is formed at least adjacent the ends of and between the upper interior surface and the lower interior surface. Further, in this alternative embodiment, one or more of the stepped interior surfaces may also be tapered.

Referring back to the first embodiment described above in accordance with this aspect of the disclosure, both the exterior surface and the interior surface of the router guide template may be continuously tapered between the base portion and the top portion, and in this case at least a portion of the exterior continuous surface may be continuously tapered inwardly from the base portion to the top portion, and further in such a case where the interior surface is also tapered, a corresponding portion of that interior continuous surface may also be continuously tapered outwardly from the base portion to the top portion.

Preferably, the taper of the router guide template of this aspect of the disclosure comprises a continuously-tapered exterior surface. And where the interior surface of such a router guide template is also tapered (optionally), it too may be continuously-tapered. Further, the continuous tapers may extend around the entire exterior and/or interior peripheries, respectively, of the template.

It will be appreciated that different bit diameters used in a router impact the size of a template to be used. Thus, it is commonly understood by those skilled in the art that to determine template size, the formula for determining the template size for a Tenon=2(Tenon Width+Bit Diameter)−Guide Bearing Diameter, whereas the formula for determining the template size for the Mortise=2(Mortise Width−Bit Diameter)+Guide Bearing Diameter. Further, it will be appreciated that the router guide template tapers preferably comprise a taper of between 0.1 degree and 25 degrees to allow for micro-adjustment of cuts and carvings. The above formulas are for determine template width, and similar formulas, such as those shown in FIG. 26, may also be used generally to determine template thickness.

The tapered templates in accordance with this aspect of the disclosure on the pantographic mount are precisely calculated but approximately double the desired cut so that any imperfection in the template is translated only half-scale to the workpiece, and router control requires less (approximately half) the effort, which as described further below is safer and more accurate. Thus, not only are imperfections in a template minimized to the degree of 2:1 in the final product of the workpiece, but the 2:1 mechanical advantage in the pantograph system further facilitates the ease and safety with which an operator can perform cutting and carving operations using such a system. This is in part because, in fact, there is even a greater mechanical advantage than 2:1 that is achieved with a pantograph-type router system comparing the operator handle relative to the cutting blade output. Thus, the tapered templates provided in accordance with this aspect of the disclosure serve to facilitate the ease, accuracy and increased safety of routing operations with their use in connection with a pantograph-type router system.

In an alternative embodiment of this aspect of the disclosure, a guide bearing itself can also be tapered to be used as part of a router template guidance system having a combination guide bearing and a preferably non-tapered template, or a tapered template, for use with a router with a mechanical advantage between the guide bearing and a router bit to also allow micro-adjusting of the size and location of a cut or carve on the workpiece upon moving of the guide bearing relative to the template and template holder, or the template holder and template relative to the guide bearing, to also allow micro-adjusting of the size and location of the cut or carve on the workpiece. Thus, in accordance with this aspect of the disclosure, there is provided a router template guidance system having a combination guide bearing and guide template adapted for use with a router with a mechanical advantage between the guide bearing and a router bit, comprising: a template comprising an upper portion, a lower portion, and at least one exterior surface interconnecting the upper portion and the lower portion, said template further comprising at least one interior surface interconnecting the upper portion and the lower portion of the template; and a guide bearing comprising an exterior surface having a taper thereon adapted for following in contact with the exterior surface and the interior surface of the template.

Preferably in accordance with the combination guide bearing and guide template of this aspect of the disclosure, the guide bearing is a guide bearing wheel, and the taper of the guide bearing exterior surface preferably extends around the entire exterior guide bearing wheel, or roller, surface and is adapted for contact use with the interior and exterior surfaces of the template to guide a router blade for creating a tenon on a workpiece corresponding with the exterior of the template, and for creating a mortise on another workpiece corresponding with the interior of the template, the tenon and the mortise being matched in size and location on the workpieces in order to interconnect the workpieces.

In accordance with an aspect and embodiment of the disclosure, there is provided a router template guidance system further comprising a guide bearing assembly, the guide bearing assembly comprising a shaft for carrying the guide bearing, and a collar adapted to be relocatably lockable at varying locations along the shaft, the shaft being releasably and variably locatable relative to the router, the guide bearing assembly thus being easily repeatably relocatable to a pre-set position.

Such guide bearing assembly is adapted to be easily repeatably relocatably lockable at varying locations along the shaft, the shaft being releasably and variably locatable relative to the router, the guide bearing assembly being easily relocatable to a pre-set position, whether applied to a tapered guide bearing or a non-tapered guide bearing.

In accordance with another aspect and embodiment of the disclosure, there is provided a router template guide bearing assembly adapted for use with a pantographic router mount frame. The guide bearing assembly in accordance with this aspect of the disclosure comprises a shaft having first and second ends; a guide bearing rotatably mounted on a first end of the shaft; and a annular collar adapted to be relocatably mounted at an intermediate location between the first and second ends on the shaft, the shaft, and hence the guide bearing wheel, being adaptable for installation on an arm of the pantographic router mount to enable ready adjustability of the shaft and guide bearing relative to a template for guiding a user in making cuts and carves with the router.

In accordance with an embodiment of the disclosure, the guide bearing is a guide bearing wheel, and wherein the taper of the guide bearing extends around the entire exterior wheel surface and is adapted for contact use with the interior and exterior surfaces of the template to guide a router blade for creating a tenon on a workpiece corresponding with the exterior of the template, and for creating a mortise on another workpiece corresponding with the interior of the template, the tenon and the mortise being matched in size and location on the workpieces in order to interconnect the workpieces.

In accordance with another aspect of the disclosure, there is further provided, in addition to the template system of either of the aspects of the disclosure described above, a template holder in combination with the router guide template, the template holder having a plurality of support post members, preferably two such post members at either end of the cross member (to allow clearance of a router motor in-between the post members), and a cross member interconnecting the support post members and having a plurality of linear keyed slots therein, wherein the base portion of the template is adapted for removable and adjustable interconnection with the linear keyed slots of the cross member of the template holder. Thus, in accordance with this aspect of the disclosure, the tapered templates are able to be mounted adjustably and removably on one or more of the template holder's plurality of keyed slots or tracks. Into one or more of these cross member keyed slots, the disclosure provides that one or more adjustable keyed portions (i.e., an expanded head or nut on the end of a threaded bolt passing through the base portion of each template) and alignment guides (i.e., tapered tenons) on the base portion (i.e., a back portion) of each template may be removeably and slideably placed and tightened or loosed. This is similar to a keyed tongue and groove type relationship between each template and the keyed slots of the template holder cross member, to allow substantial adjustability of each template on the template holder. The keyed portions of each template are thus able to be tightened or loosed, by fixing or loosening, respectively, the keyed portion of each template as by screwing the threaded post within the template base, to be able to fix, or install, adjust or remove, a template relative to one or more of the tracks on the template holder. The readily adjustable tapered templates of the foregoing aspects of the disclosure allow for greater ease of use of the router to accomplish desired, and more accurate, cuts on a workpiece.

In accordance with another aspect of the disclosure, an improved system and method of more easily centering templates on an improved template holder, to allow greater ease and efficiency in making more accurate cuts and carves with a router, is provided comprising a drilled, or otherwise formed, centered hole in at least one, or preferably each, of the slotted tracks of the template holder, wherein the centered hole, or holes, are each located exactly midway between each end of the template holder cross member. In this way, a screw hole, or alignment hole, of a template may be aligned with one of the series of centered holes, as with a pin or a shaft (such as the guide bearing shaft) able to pass through, in order to center the template horizontally on the template holder.

Accordingly, in accordance with this aspect of the disclosure, there is provided a pantograph-type woodworking router guide template holder, comprising: a plurality of post members having at least one keyed slot defined along and extending at least a portion of the length of each post member and adapted for interconnection with a pantograph carriage, at least one cross member having first and second ends and adjustably interconnecting the plurality of post members, the template holder cross member further comprising at least one linear keyed slot, the template holder cross member defining a hole centered midway between the first and second ends of the template holder cross member and adapted for enabling centering a template by aligning a central hole of the template with the hole centered midway, and a plurality of clamps for adjustably fixing the cross member relative to the posts.

The template holder in accordance with this aspect of the disclosure may be provided either alone, or in combination with a template having a base portion and a top portion, the template further comprising exterior and interior continuous surfaces interconnecting the base and top portions of the template along an outer periphery and an inner periphery of the template, respectively, to facilitate joinery cuts and carves with a single template, the base portion adapted for removable and adjustable interconnection with the at least one linear keyed slot of the cross member, the template defining a template centering hole centered within the template and adapted for aligning with the hole centered between the first and second ends of the template holder cross member.

In an embodiment, the pantograph-type woodworking router guide template and template holder combination is provided wherein at least a portion of at least one of the exterior continuous surface and the interior continuous surface is tapered from the base portion to the top portion, and wherein the template has a locking key on either side of the template centering hole adapted for removeably locking the template onto the template holder cross member with the template centering hole of the template aligned with the hole centered midway between the first and second ends of the template holder cross member.

In an embodiment, the pantograph-type woodworking router guide template and template holder combination is provided wherein the interior surface further comprises a stepped interior surface having a larger circumference upper interior surface and a smaller circumference lower interior surface, and wherein the template has a locking key on either side of the template centering hole adapted for removeably locking the template onto the template holder cross member with the template centering hole of the template aligned with the hole centered midway between the first and second ends of the template holder cross member.

In accordance with an embodiment of the disclosure, there is provided a woodworking router guide template and template holder combination, wherein at least one of the exterior continuous surface and the interior continuous surface is tapered between the base portion and the top portion, and wherein the template has a locking key on each side of the template centering hole adapted for removeably locking the template onto the template holder cross member with the template centering hole of the template aligned with the hole centered midway between the first and second ends of the template holder cross member.

In accordance with an embodiment of the disclosure, there is provided a pantograph-type woodworking router guide template and template holder combination, wherein both the exterior continuous surface and the interior continuous surface are tapered, wherein the exterior continuous surface is tapered inwardly from the base portion to the top portion, wherein the interior continuous surface is tapered outwardly from the base portion to the top portion, wherein the taper of each of the continuously-tapered exterior and interior surfaces extends around the entire exterior and interior peripheries, respectively, of the template, and wherein the template has a locking key on each side of the template centering hole adapted for removeably locking the template onto the template holder cross member with the template centering hole of the template aligned with the hole centered midway between the first and second ends of the template holder cross member.

Further, in accordance with an embodiment of the disclosure, there is provided an improved method of horizontally centering templates on the template holder cross member comprising the following steps: inserting a keyed template tenon into a slot of the template holder, sliding the template in the slot to near the horizontal center of the template holder, pinning with a pin, or shaft, a center hole of the template to a corresponding center hole in the template holder so as to locate the template at a centered location on the template holder, tightening a locking mechanism of each key associated with the template to fix the template in place at the centered location on the template holder.

The system and method centering the template in accordance with this aspect of the disclosure makes centering templates on template holders easier, and thus the process of installing templates centered on template holders is less time consuming than prior art methods of installing templates on template holders.

In accordance with another aspect of the disclosure, a thickness gauge for allowing the operator to quickly, accurately and easily center the height of cuts in a Y-axis on a workpiece is located on the template holder support post, or cross-member (see FIG. 10 for an axis diagram for orientation references for this specification). Thus, the operator is allowed to insert the workpiece, or sample stock of a same thickness as the workpiece, further allowing the operator to lock the template holder in place and to automatically center the cut, joint or shape in the workpiece, in order to properly adjust the desired height of the router cutting blade relative to the workpiece before beginning cutting operations. The thickness of the workpiece or sample measured by the gauge is doubled in a 2:1 pantograph system so that imperfections in the surface are translated at half-scale to the workpiece, thus improving precision of cuts and carves on the workpiece.

Thus, in accordance with this aspect of the disclosure, the template holder of the router guide template system further comprises a thickness gauge for use with a 2:1-ratio-type, pantograph-type router system. The thickness gauge of this aspect of the disclosure is for enabling centering cuts and carvings in a Y-axis of a workpiece, the thickness gauge preferably further comprising a plurality of clamps on one of the cross member or the support posts. The thickness gauge of this aspect of the disclosure is adapted for holding a sample of stock that is the same thickness as the intended workpiece such that the cutting blade of the router is adapted to be positioned so as to create one or more of a mortise and a tenon in a center location of the workpiece and another workpiece.

In accordance with yet another aspect and embodiment of the disclosure, each tapered template is provided in a plurality of segments, wherein multiple segments of tapered templates may be mixed, matched, and combined to form differing shapes and sizes of cuts. Thus, in accordance with this aspect of the disclosure, there is provided a router guide template, wherein the template is comprised of a plurality of segments of tapered templates. Further, each such segment of tapered template comprises a top portion, a base portion, and at least one of an exterior continuously-tapered or stepped surface interconnecting the base portion and the top portion along an outer periphery and an interior continuously-tapered or stepped surface interconnecting the base portion and the top portion along an inner periphery. Still further, each such segment of tapered or stepped template further comprises two mating end portions such that the plurality of segments of tapered templates may be removably and adjustably attached to the template holder in end-to-end fashion. When combined in this manner, the top portions, the base portions, any exterior continuously-tapered surfaces and interior continuously-tapered surfaces of each segment are mated end-to-end with an end of another segment forming a continuous top portion, a continuous base portion, and one of an exterior continuously-tapered surface and an interior continuously-tapered surface between each mated segment. When the entire plurality of segments are thus mated end-to-end together they form a complete router guide template with a continuous top portion, a continuous base portion, and at least one of an exterior continuously-tapered or stepped surface, and an interior continuously-tapered, non-tapered, or stepped surface. This aspect of the disclosure further supports and enables greater ease and flexibility in forming templates to accomplish a wider range of joining, or decorative, cuts in the workpiece.

In accordance with one or more aspects of the disclosure provided above, in an embodiment of the disclosure, there is provided: A pantograph-type woodworking router guide template and template holder combination, comprising: a template holder comprising a plurality of post members having at least one keyed slot defined along and extending at least a portion of the length of each post member and adapted for interconnection with a pantograph carriage, the template holder further comprising at least one cross member adjustably interconnecting the plurality of post members, the template holder cross member further comprising means for removeably retaining at least one template, wherein the template holder further comprises a plurality of clamps for adjustably fixing the cross member relative to the posts; a template having a base portion and a top portion, the template further comprising exterior and interior continuous surfaces interconnecting the base and top portions of the template along an outer periphery and an inner periphery of the template, respectively, the base portion being adapted for removable and adjustable interconnection with the cross member of the template. The post members of the template holder are typically connected to the carriage of the pantograph with a plurality of bolts.

In accordance with an alternative, embodiment of one or more of the foregoing aspects of the disclosure, there is provided a pantograph-type woodworking router guide template and template holder combination, wherein the interior surface and exterior surface further comprises a stepped interior surface having a larger circumference upper interior surface and a smaller circumference lower interior surface. This configuration allows the creation of a larger or smaller mortise to allow for adjustment of the tenon in the mortise.

Preferably, in accordance with an embodiment of a pantograph-type woodworking router guide template and template holder combination, either or both the exterior continuous surface and the interior continuous surface are one of non-tapered, tapered or stepped.

Further, in accordance with another embodiment of a pantograph-type woodworking router guide template and template holder combination, both the exterior continuous surface and the interior continuous surface are tapered, wherein the exterior continuous surface is tapered inwardly from the base portion to the top portion, wherein the interior continuous surface is tapered outwardly from the base portion to the top portion, and wherein the taper of each of the continuously-tapered exterior and interior surfaces extends around the entire exterior and interior peripheries, respectively, of the template.

Preferably, in connection with this pantograph-type woodworking router guide template and template holder combination embodiment in accordance with any of the foregoing aspects of the disclosure, each of the exterior continuous surface and the interior continuous surface is continuously tapered or stepped, and preferably the taper or step of each of the continuously-tapered or stepped exterior and interior surfaces extends around the entire exterior and interior peripheries, respectively, of the template.

However, as described in connection with interior stepped surfaces above in connection with another embodiment and aspect of the disclosure, the interior of this embodiment and aspect of the disclosure may be tapered, non-tapered, or preferably it may be stepped at the ends of the template. Thus, in those templates having an interior surface, where the interior surface may be tapered, non-tapered, or stepped, the interior surface and the base portion together may form a concave, stadium-bowl-shaped interior in the case of a stadium-shaped template common for creating mortise and tenon-type joinery. Thus, in this latter embodiment, the interior-concave-stadium-bowl-shaped end portions of the interior portion of the template are preferably stepped.

And, thus, in the alternative embodiment of this aspect of the disclosure, further comprising both an exterior surface and an interior surface formed by concave stepped-bowl-like edges and a base portion, where the interior surface actually comprises stepped interior surfaces, each surface forming a stadium (to form larger (upper) and smaller (lower) stadiums having partially concentric end portions) in cross section and having a larger circumference upper interior surface preferably at least at ends of the stadium shape thereof, and a smaller circumference lower interior surface also forming an inner stadium in cross section. In this embodiment, preferably an intermediate portion (i.e., the longer edges of the stadium bowl-shaped interior) of the interior surfaces forming the stadium-shaped concave, stepped-bowl-like edges are preferably the same width for both the upper interior surface and the lower interior surface, but there preferably is a step at each end in the interior portion of this embodiment of the template which is formed in between the two interior surfaces at each end of the stadium-bowl-shaped interior surfaces. This configuration of template allows the creation of a mortise having a larger or smaller width to allow more or less adjustability of the mortise and tenon joint. In this alternative embodiment, one or more of the stepped interior surfaces may also be tapered, elliptical, square, round, curved, or other shape appropriate to the desired design outcome, and whether for joinery cuts or otherwise.

Further, as described previously in accordance with one or more previously-described embodiments and aspects of the disclosure, preferably the opposing exterior and interior continuous surface tapers of this embodiment may be generally corresponding and opposed to each other, such that an innermost portion of the exterior and interior continuously-tapered surfaces near the top of the template (as well as near the base of the template and also in-between the top and the base of the template) may generally correspond so as to generally guide the operator in cutting and carving.

Still further, preferably in connection with this embodiment of the disclosure, the cross member interconnecting the support post members defines a plurality of linear keyed slots, and wherein the base portion of the template is adapted for removable and adjustable interconnection with the linear keyed slots of the cross member of the template holder.

Still further, preferably, in connection with this embodiment of any of the foregoing aspects of the disclosure, the template holder further comprises a thickness gauge on a 2:1-ratio-type, pantograph-type routing woodworking system, for enabling centering cuts and carvings in a Y-axis of a first workpiece, the thickness gauge further comprising a plurality of clamps on one of the cross member or the support posts and adapted for holding a sample of stock that is the same thickness as the intended workpiece such that the cutting blade of the router is adapted to be positioned so as to create one of a mortise and tenon in the center of the workpiece and another workpiece.

Further, in accordance with yet another alternative embodiment in accordance with any of the foregoing aspects of the disclosure, the template is comprised of a plurality of segments of tapered templates, wherein each segment of tapered template comprises a top portion, a base portion, an exterior (optionally continuously-tapered) surface interconnecting the base portion and the top portion along an outer periphery, and an interior (optionally continuously-tapered) surface interconnecting the base portion and the top portion along an inner periphery, and wherein each segment of template further comprises two mating end portions such that the plurality of segments of tapered templates may be removably and adjustably attached to the template holder in end-to-end fashion such that the top portions, the base portions, the exterior (optionally continuously-tapered) surfaces and the interior (optionally continuously-tapered) surfaces of each segment mated with an end to another segment end forms a continuous top portion, a continuous base portion, a continuous exterior (optionally continuously-tapered) surface and a continuous interior (optionally continuously-tapered) surface, and such that when the plurality of segments are mated end-to-end together they form a complete router guide template with a continuous top portion, a continuous base portion, a continuous exterior (optionally continuously-tapered) surface, and a continuous interior (optionally continuously-tapered) surface.

The tapered-template system in accordance with one or more aspects and embodiments of the disclosure summarized above addresses the problem of inaccurate or complicated joinery using a router and fixed-size guides or templates, thus enabling quicker, more accurate, safer, and easier-to-make joinery cuts, whether dovetail, mortise and tenon, or box joint cuts. No other known system provides similar micro-adjustment as provided with the tapered templates of the present disclosure. With such a system of the present disclosure, an operator is enabled in adjusting the depth of the guide bearing on a pantograph-type router, moving it in or out to engage a different portion of a taper on either or both an exterior surface and an interior surface of a template, to enable easy-to-make and precise joinery cuts.

Further, the tapered-template system in accordance with one or more aspects and embodiments of the disclosure summarized above enables users in easy and quick micro-adjustments to proposed cuts and carves.

Still further, the tapered-template system in accordance with yet another aspect of the disclosure enables operators to more quickly and easily center the thickness (Y-axis) of a joint or shape in a workpiece. Thus, one or more of the foregoing aspects and embodiments of the disclosure helps users to more quickly and accurately center their work on an intended workpiece. With the use of the tapered-template system in accordance with one or more aspects and/or embodiments of the disclosure, operators are enabled in greater control over routers using a pantographic or non-pantographic router mount, thus making such template-guided routers easier to use and more accurate.

The tapered template system in accordance with one or more aspects and embodiments of the disclosure enables operators in installing and changing templates and template holders, thus facilitating the work of setting up, creating, and taking down, a project.

In accordance with an aspect of the disclosure, there is provided a positioning and centering device adapted for installation into a cutting bit holder of a pantograph-type router system having a workpiece cutting table with a centering line thereon. The cutting bit holder has an anterior portion adapted to be closest to the workpiece cutting table and a posterior portion. The positioning and centering device of this aspect of the disclosure is adapted for use in ultimately positioning and centering a cutting bit adapted to be held within the cutting bit holder relative to a workpiece adapted to be cut while the workpiece is fastened to the workpiece table and centered relative to the centering line of the workpiece table. The positioning and centering device comprises: a retained portion adapted for being retained in the cutting bit holder; and a pointed portion contiguous with and extending from the retained portion and adapted for extending outwardly from the anterior portion of the cutting bit holder to an end of the pointed portion, the end adapted to be positioned closely to the workpiece and the workpiece table for centering purposes, the pointed portion being at least partially tapered along at least a part of its length to a point at the end of the pointed portion, the pointed portion further comprising at least one flat surface extending along at least a part of the length of the pointed portion and terminating at the pointed end of the pointed portion, such that the flat surface of the pointed portion may be brought to rest flush on the workpiece table with the pointed end of the pointed portion pointing along the centering line of the workpiece table.

Preferably, at least a portion of the retained portion of the positioning and centering device is elongated adapted for being retained in the cutting bit holder. Further, preferably, the pointed portion is also elongated and adapted for extending longitudinally along the centering line of the workpiece table when the pointed end is precisely aligned with the centering line of the table and the flat surface is further adapted for being flush with, that is in contact along its surface with, the workpiece table.

Still further, preferably, the positioning and centering device retained portion is circular in cross section, and the pointed portion is generally at least partially semi-circular in cross section, wherein the diameter of a semi-circular cross-section portion gradually decreases to a point as the pointed portion tapers from its widest at its intermediate origin to its pointed end. And further, preferably, the flat surface of the positioning and centering device extends from an intermediate point of origin along a length of the retained portion and the contiguous pointed portion combined, the flat surface portion further comprising a shelf cut perpendicular to a longitudinal axis of the positioning and centering device such that the shelf forms a right angle with the flat surface at the point of origin, or origin, of the flat surface, regardless of whether the rest, or any part, of the device is circular, or semi-circular, in cross section.

In accordance with another aspect of the disclosure, there is provided a workpiece and cutter blade positioning and centering system adapted for use with a guide bearing and template-guided pantograph-type router system having a workpiece cutting table, a first arm for moving the router and cutting blade in X and Y coordinate spaces, a second arm for moving the router and cutting blade in a Z coordinate space, and a cutting blade holder. The positioning and centering system comprises: a template holder comprising a plurality of legs and an adjustable cross member fixable horizontally normal to the legs, the cross member having a first upper surface and a second lower surface, the cross member having defined therein at least one hole. The positioning and centering system further comprises: a first thickness gauge member on at least one of the plurality of legs, the first thickness gauge member having a surface adapted to engage a surface of the cross member in a first initializing position of the cross member, wherein upon moving the cross member away from the first thickness gauge member, the first thickness gauge member and the cross member are adapted to have a workpiece inserted therebetween in a second position wherein a surface of the first thickness gauge member and a surface of the cross member each engage opposing surfaces of the thus-inserted workpiece, the cross member being adapted for being releasably fixed to the plurality of vertical legs.

The positioning and centering system further comprises: a pointed elongated positioning and centering device comprising a partially flat surface and adapted for installation into the cutting blade holder and a centering line on the workpiece cutting table. Also, there is provided a centering pin having first and second ends and adapted at the first end for insertion into the first arm of the pantograph-type router system, and further adapted at the second end also for being inserted into the hole defined in the template holder cross member, wherein upon having been inserted in both the first arm and the hole, the centering pin aligns the first arm at a location wherein the pointed elongated positioning and centering device is aligned with the centering line of the workpiece cutting table in the first initializing position useful for centered placement of a workpiece on the workpiece cutting table. In a preferred alternative embodiment, as further described below, the centering pin may actually preferably be comprised of the guide bearing shaft, with the guide bearing thereon, and wherein a first end of the guide bearing shaft may be inserted through both the arm and the centering hole of the template holder cross member.

In another aspect of the disclosure, the workpiece and cutter blade positioning and centering system further comprises a template having a center hole therein adapted for aligning with the center hole of the cross member of the template holder and associated tightening means for releasably locking the template into position on the cross member. The template in accordance with this aspect is adapted for being centered on the cross member by aligning the hole of the template with the hole of the cross member and inserting the centering pin through both holes while tightening the template onto the cross member.

In accordance with another aspect of the disclosure, the workpiece and cutter blade positioning and centering system further comprises an adjustable fence and full-scale-half-scale combination, the fence being moveably attached and adjustable relative to the centering line and the workpiece cutting table. Further, the adjustable fence and half-scale combination is adapted for use measuring a full width of the workpiece with the adjustable fence and full-scale-half-scale combination and setting the adjustable fence and full-scalehalf-scale combination to a width corresponding to half of the workpiece width aligned at the centering line of the workpiece cutting table to thus center the workpiece relative to the centering line.

In accordance with another aspect of the disclosure, the workpiece and cutter blade positioning and centering system further comprises a guide bearing shaft releasably lockable in the first arm of the pantograph-type router system. Thus, preferably, the aforementioned centering pin of the system comprises the guide bearing shaft adapted for being releasably locked in the first arm in a guide bearing function direction or for being releasably locked in the first arm in a pin-centering function direction.

In accordance with another aspect of the disclosure, the workpiece and cutter blade positioning and centering system further comprises a collar releasably attachable to the guide bearing shaft at a pre-determined location on the shaft corresponding to an appropriate depth of insertion of the shaft into the first arm (during a forward presentation of the shaft into the first arm) and thus corresponding to a desired position of the guide bearing relative to the template.

In accordance with another aspect of the disclosure, the workpiece and cutter blade positioning and centering system further comprises a second thickness gauge member adapted for use as a reference in allowing simplified return of the first thickness gauge member to the first initializing position after having moved the first thickness gauge member to another position. This aspect of the disclosure greatly reduces the amount of effort and time necessary to return the template holder and router to a position suitable for cutting above the level of the surface of the workpiece table, whereas before the router may have been set to a position suitable for cutting below the level of the surface of the workpiece table.

Preferably, in accordance with this aspect of the disclosure, the adjustable fence and full-scale-half-scale combination comprises a fence portion and a full-scale-half-scale portion normal to the fence portion, the full-scale-half-scale portion further comprising an outer scale that is a full-scale measuring device and an inner scale that is a half-scale measuring device integral with the full-scale measuring device. Thus, preferably, the full-scale-half-scale portion has measurement numbers that are in paired full-scale-half-scale 2:1 ratios at equidistant outer and inner locations, respectively, relative to the fence portion.

In accordance with an aspect of the disclosure, preferably the pointed elongated positioning and centering device of the workpiece and cutter blade positioning and centering system further comprises an elongated retained portion adapted for being retained in the cutting bit holder, and a pointed portion contiguous with and extending from the retained portion and adapted for extending outwardly from the anterior portion of the cutting bit holder to an end of the pointed portion. Accordingly, the pointed end of the positioning and centering device is thus adapted to be positioned closely to the workpiece and the workpiece table for positioning and centering purposes, the pointed portion being at least partially tapered along at least a part of its length to a point at the end of the pointed portion. Further, preferably, the pointed portion of the positioning and centering device of the positioning and centering system further comprises a flat surface, wherein the flat surface extends along at least a part of the length of the pointed portion and terminates at the pointed end of the pointed portion. Thus, the flat surface of the pointed portion preferably may be brought to rest flush, that is with the flat surface contacting, an upper surface on the workpiece table with the pointed end of the pointed portion pointing along the centering line of the workpiece table in at least a first initializing position.

In accordance with another aspect of the disclosure, there is provided an improved method of locating a cutting bit relative to a workpiece using a template-guided pantograph-type router system having a router-bit holder, and a workpiece holding table having a centering line thereon relative to which the router is capable of being adjusted. The method comprises the steps: inserting into the router bit holder a partial-shaft pointer having a standard mounting end, a pointed-tip end, and a longitudinally-extending cut surface extending from a location between the mounting end to the pointed tip end; and adjusting and locating the router so that the pointed tip of the pointer points precisely along a centering line of the workpiece holding table.

In accordance with another aspect of the disclosure, wherein the router system further comprises a template holder having a horizontally centrally-located hole, and one of a guide bearing on a shaft and another shaft adapted to be held within a hole defined in a first arm of the pantograph-type router system, a method comprises, and/or the aforementioned method further comprises, a step of reversing the one of the guide bearing shaft and the another shaft within the guide bearing holder (preferably a hole and tightening-knob combination, in the first arm of the pantograph-type router system) so that the shaft may be inserted into the centrally-located hole of the template holder to facilitate aligning the pointer with the centering line of the workpiece holding table.

In accordance with another aspect of the disclosure, and wherein the pantograph-type router system further comprises a thickness gauge moveably mounted on a post for the template holder corresponding to a location at zero height of the pointer pointed-tip end relative to the workpiece table, wherein the template holder is adapted to also be located on the post a set distance, or no distance, from the thickness gauge, and wherein the step of reversing the one of the guide bearing shaft and the another shaft in the first arm of the pantograph-type router system to align the pointer with the centering line of the workpiece holding table is accomplished while there is no space between the thickness gauge and the bottom of the template holder (corresponding with the fact that, preferably in the initializing position the pointer flat surface is positioned flush with the w orkpiece cutting table upper surface and aligned with the centering line of the workpiece cutting table), a method comprises, and/or a aforementioned method or methods further comprise, the following steps:

after centering the pointer relative to the workpiece table, centering the pointer relative to a central midpoint of the workpiece height by inserting a workpiece into the thickness gauge;

adjusting the template holder, and hence the router pinned in the centrally-located hole of the template holder, upwardly to a location so it rests on the workpiece at its full height so that the workpiece is between the thickness gauge and the bottom portion of the template holder; and tightening the template holder in place at that resting location on the w orkpiece so that, when the workpiece is removed from the thickness gauge and is placed on the workpiece table, the router bit will be located at the center of the workpiece as the workpiece is centered on the centering line of the workpiece holding table.

Still further, in accordance with this aspect of the disclosure, wherein the router system further comprises a template having a centrally-located hole therein adapted to be aligned with the centrally-located hole of the template holder, a method comprises, and/or the foregoing method, or methods, further comprise, the following step: inserting the one of the guide bearing shaft and the another shaft into both the centrally-located hole of the template and the centrally-located hole of the template holder.

Still further, in accordance with this aspect of the disclosure, wherein the router system further comprises an adjustable workpiece alignment fence connected to a full-scale-half-scale having a full-scale portion and a corresponding half-scale portion, the fence being capable of being adjusted and fixed by a user at a set distance from, and parallel to, the workpiece table centering line, the method comprises, and/or the foregoing method, or methods, further comprise, the following steps:
 measuring the width of the workpiece on the full-scale portion; and
 setting the fence a distance from the workpiece table centering line at the half-scale portion distance magnitude corresponding to the full-scale portion width magnitude of the workpiece.

In accordance with another aspect of the disclosure, wherein the router system further comprises a lockable collar on the shaft of the guide bearing, and plunge depth stops, the method comprises, and/or the foregoing methods further comprise, the following steps:
 replacing the pointer with a router cutting bit;
 removing the rearwardly-oriented one of the guide bearing shaft and the another shaft from the hole defined in the arm;
 loosely placing the lockable collar on the one of the guide bearing shaft and the another shaft;
 inserting the one of the guide bearing shaft and the another shaft in the hole defined in the arm with the guide bearing being in a forwardly-oriented position;
 locating the arm of the pantograph-type router system such that the guide bearing is positioned at a location on an outside taper of the template corresponding with a largest tenon cut on the workpiece;
 setting a desired plunge stop depth controlling a desired length of a tenon;
 making a first pass cut trial-and-error cut with the router at the largest tenon cut position on the tapered template and at the desired tenon length;
 testing the tenon fit;
 adjusting the guide bearing relative to the outside taper of the template corresponding to a smaller cut trial-and-error tenon cut position on the tapered template;
 testing the tenon fit; and
 locking the lockable collar on the guide bearing shaft to enable ready re-positioning of the router via the pantograph-type router arm at the thus precisely-determined template taper location for a highly-accurate tenon size corresponding to a desired mortise size.

The foregoing methods and method steps greatly reduce the amount of time and effort required to cut on workpieces, and in particular to cut mortise and tenon joints on a pantograph-type router system, than that previously experienced. Further, the foregoing methods and method steps greatly reduce the amount of time and effort required to re-setup the pantograph-type router system to return to work that is similar to work performed previously. Thus, for example, in accordance with the aforementioned device, system, and methods, a user is enabled in quickly recreating similar cuts, in particular tenon cuts, since a pre-set collar and guide-bearing shaft combination may be selected, regardless of the length of a particular template chosen to cut a particular tenon, as long as a same type diameter of cutting bit is used (i.e., from the same manufacturer), since otherwise different cutting bits typically have different characteristics.

These advantages associated with simplified methods of positioning and centering, and with the aforementioned pre-set collar locations, makes the cutting of differing-width tenons (which have the same thickness) a very quick and easy process as compared to prior art methods. And this relative ease by using a guide bearing and shaft with a same collar location on the shaft may obtain whether one is using it to cut a tenon that is, for example, 1", 1.5", 2.0", 2.5", or 3.0" wide, since each of these may be cut using a template having the same taper, as long as the user is using the same size, and similar type, cutting bit. Further, and thus, different templates are required to make different widths of mortise and tenons, but each template can nevertheless be used to make different thickness of tenons. For instance, the 2" template can make ¼", ⅜", ½", ¾" and 1" thick tenons using the same template and same bit but by changing the guide bearing to make each thickness. For purposes of this disclosure, these may be referred to as analogous tenons (cut with a same or similar template).

With the device, system, and methods of the present disclosure, once the user has found the ideal location for the guide bearing on the template, and the collar is locked on the shaft, and even marked with sizing information, the collar and shaft combination may be stored and easily retrieved for the next time a similarly-sized, or analogous, tenon is to be cut. This reduces the amount of time and effort that a user is required to spend in re-finding the right location for the guide bearing on the template.

The subject matter of the present disclosure is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTION OF THE DRAWINGS

In consideration of the following detailed description of various embodiments, the disclosure may be more completely understood in connection with the following drawings.

FIG. 1A is a perspective view of a prior art template for a router;

FIG. 1B is a perspective view of another prior art template for a router;

FIG. 1C is a plan view of another prior art template for a router;

FIG. 1D is a front view of a router with a prior art guide bearing thereon;

FIG. 26 is a standard table for determining correct template sizes for given desired mortise and tenon joinery which may be readily adapted for use with tapered templates by understanding that a mid-point along the tapered template generally corresponds with a chosen desired joinery element size.

DETAILED DESCRIPTION OF THE INVENTION

Referring specifically to FIGS. 2 and 3A-E, a template holder system 20 in accordance with one or more aspects of the disclosure preferably comprises a plurality of stands, or posts, 22 (preferably there are provided two such posts), and preferably a single cross member 24 interconnecting the two posts. The template holder system 20 may be comprised of a single post 22 and cross member 24, or more posts 22 may be employed as well, without departing from the true scope and spirit of the disclosure and per the claims hereof. However, it will be appreciated by those skilled in the art that two such posts is preferable from the standpoint of simplicity of use, rigidity and sturdiness of the resulting template guide system 20.

Figure 5:
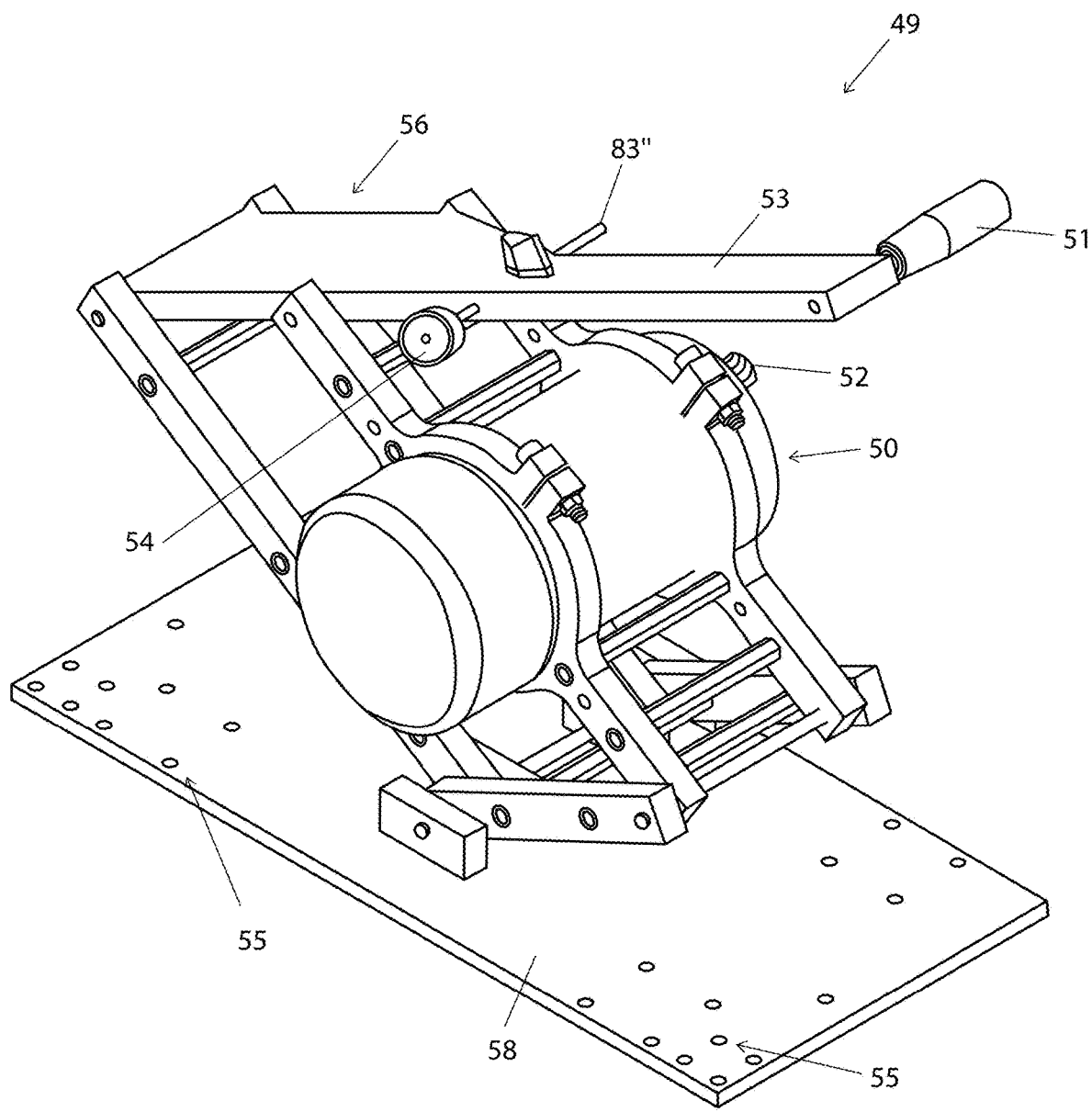
FIG. 5 is a perspective view of a pantograph-type router on a mount, having a standard guide bearing adjustably mounted thereon, and adapted for use with, and in combination with, a tapered template system in accordance with an embodiment and aspect of the disclosure.

Each of the posts 22 of the template holder system 20 preferably has key slots, or grooves, 26 therein for facilitating alignment of the cross-member 24 thereon, for facilitating the adjustment of the template holder for use as described further hereafter for height adjustment, as well as for attaching the posts with bolts (four bolts for each post) to holes 55 in the router or pantograph mount 58 (FIG. 5).

The cross-member 24 of the template holder system 20 comprises measurement indicia 28 on an upper edge surface 7, and/or lower edge surface 5, thereon, either inch or metric scale, to assist with positioning and centering, or otherwise locating, a tapered template 30 on the template holder in order to allow correspondingly-located cuts on workpieces. Indicia 31 may also be provided on the posts 22 as well, in order to facilitate measurement of the cross member 24 and height guide 27 position, as discussed further below, relative to the posts 22.

The cross-member 24 of the template holder system 20 further preferably comprises one or more horizontal mounting grooves, or keyed slots, 29, made either of plastic or metal, such as aluminum. Each of the templates 30, 30' (as well as other templates described herein) have corresponding tapered tenons, or tapered tongues, 44 (and 84, 85, 88 of FIGS. 8A-8C) to help orient and fix the templates in the keyed slots. The taper of each of these orienting tenons 44, 44' is provided as slightly larger at a base of each tenon than at a tip of each tenon, as shown in FIGS. 3D and 8A-8C, so that upon placement and tightening of the template 30, 30' onto the template holder 24 as further described below, the templates are snugly attached fixed in the slots 29 of the template holder.

Figure 3A:
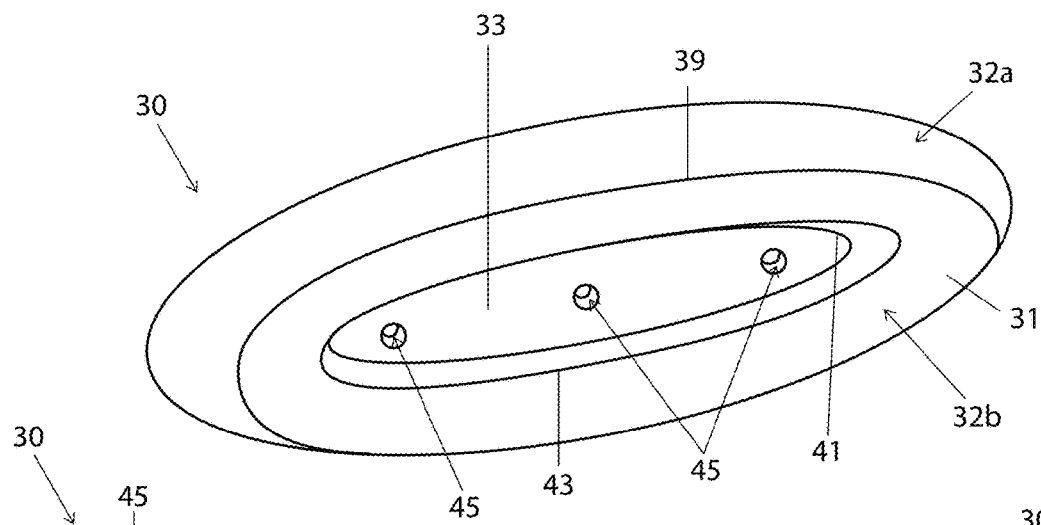
FIG. 3A is a perspective view of a tapered template of a template guide system in accordance with an embodiment and aspect of the disclosure.
Figure 3B:
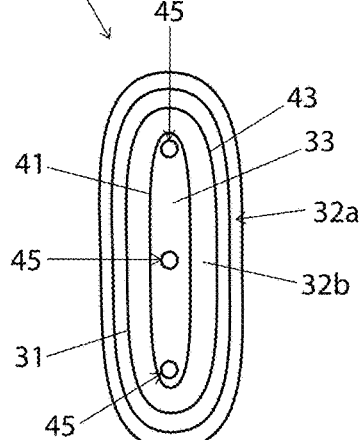
FIG. 3B is a top plan view of a tapered template of a template guide system in accordance with an embodiment and aspect of the disclosure.
Figure 3D:
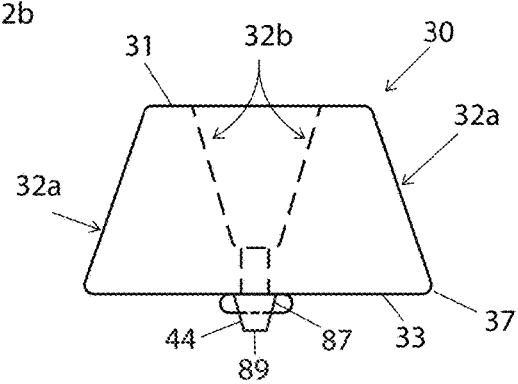
FIG. 3D is a side elevation view of a tapered template of a template guide system in accordance with an embodiment and aspect of the disclosure.
Figure 3C:
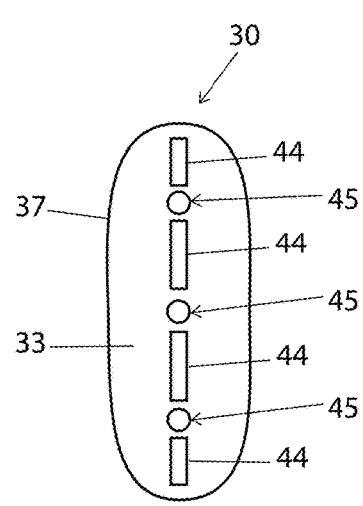
FIG. 3C is a bottom plan view of a tapered template of a template guide system in accordance with an embodiment and aspect of the disclosure.

These tapered tenons 44, 44', 84, 85, 88 may be oriented longitudinally the length of the template 30 as shown in FIG. 3C, the keyed slots 29 are preferably spaced about ¾ inch, or about 20 mm, apart which provides optimal spacing for the templates 30, 30' in order to place single or multiple ½", ⅜", or ¼" thick mortise and tenon joints in dimensional lumber common to North America, such as 2×4, 2×6, 2×8, etc. Further, paired mortise and tenon joints may be created with a stacked manufacturing configuration where two templates are located on the cross member 24. The template holder 20 also accommodates non-tapered, tapered or stepped templates, as further described herein in accordance with one or more aspects of the disclosure, to make fixed or variably-spaced dovetail and box joints. The tapered templates 30 may be tapered on the exterior and interior surfaces to allow micro-adjustment of the joinery.

The template holder 20 further comprises an L-shaped side angle system 19 mounted, as with screws to each side of the template holder cross member 24, and the template holder cross member is partially retained within, and maintained squared relative to, the two L-shaped side angles by an outer vertically-oriented lip 11 on each L-shaped angle and engaging either end of the cross member. The L-shaped angle system 19, comprises left and right such L-shaped angles on either side of the template holder cross member. The L-shaped angles 19 and cross member 24, are removably fixed together with tightening screws so that the L-shaped angles and cross member combination is fixed together and adjustable as a unit, and alternatively able to be fixed, or locked at a certain height, relative to the posts 22 with the use of clamps 21, each clamp having a tightening lever 23.

The angles 19 and cross member 24 combination are able to be adjusted to an appropriate height according to indicia 31 on one of the posts 22, and the workpiece may be used temporarily for a height measurement as further described below, or a representative sample workpiece of the same thickness as the workpiece 3. Thus, the system of clamps 21 each have a tightening lever 23 for the operator to actuate to adjust the template holder cross member 24 position relative to the posts 22, the pantograph carriage 58, and thus the workpiece 3, via the L-shaped angles 19 fixed to the template holder cross member.

Figure 10:
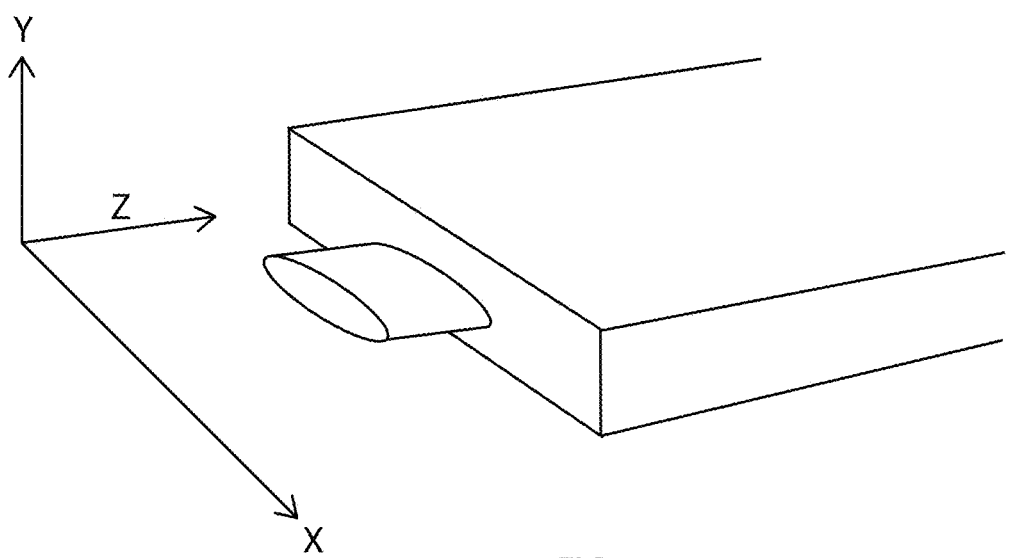
FIG. 10 is an illustrative perspective view of a tenon joint on a workpiece and further illustrating reference X, Y, and Z axes referred to in this specification.

Thus, in an embodiment, there is also provided a height measurement clamp, or thickness gauge, 27 for holding a reference, or sample, workpiece/stock 3, to allow simple adjustment of the height of the cross member 24 and attached template 30 relative to the cross member, the pantograph carriage 58, and thus the actual workpiece 3 on which cutting or carving is to be performed. The thickness gauge 27 allows the operator to quickly, accurately and easily center a cut or carving in the Y-axis of an actual workpiece (see FIG. 10 for an axis diagram for proper orientation for this specification).

This is accomplished by first referencing the upper surface of the thickness gauge 27 at the cutting table surface, and then by adding the sample/workpiece stock 3, followed by moving the cross member 24 (via the L-shaped angles sliding along the posts 22) up or down so that an underside of the cross member 24 comes to rest on the upper surface of the reference stock 3. Thereafter, the operator is able to fix the cross member 24 at that location using the levers 23 of clamps 21 which thus clamp the L-shaped angles 19 and attached cross member 24 to the posts 22 at the desired height. The thickness gauge 27 is built into the template holder system 20, preferably mounted on a template holder support post 22, or cross member 24. Thus the thickness of the workpiece 3 or sample is measured by the gauge 27 to accurately position or center the joinery on the workpiece.

The clamps 21 are both for adjusting the template holder 20 and operating the cross member 24 and L-shaped angles 19 combination relative to the thickness gauge 27. The thickness gauge 27 is attached, and independently slides into, and is held in place within, the grooves 26 in the posts 22, via a screw 27a. The side angle assembly 19 must be aligned on entry into the groove 26 in the posts 22, and upon tightening of the clamp 21 via the lever 23. Therefore, a part of the disclosure offsets the clamps 21 so one may be aligned at a time. This makes changing template holders 20 easier and faster. Thus the template holder and system 20, 21, 22, 24, 27, 30, 54, as well as inventive parts, combinations and other embodiments thereof, enables operators to more quickly and easily center the thickness (Y-axis) of a joint or shape in a workpiece 3. Thus, this aspect, or these aspects, of the disclosure helps users to more quickly and accurately center their work on an intended workpiece 3 and allows for greater precision in cuts and carves.

Figure 14:
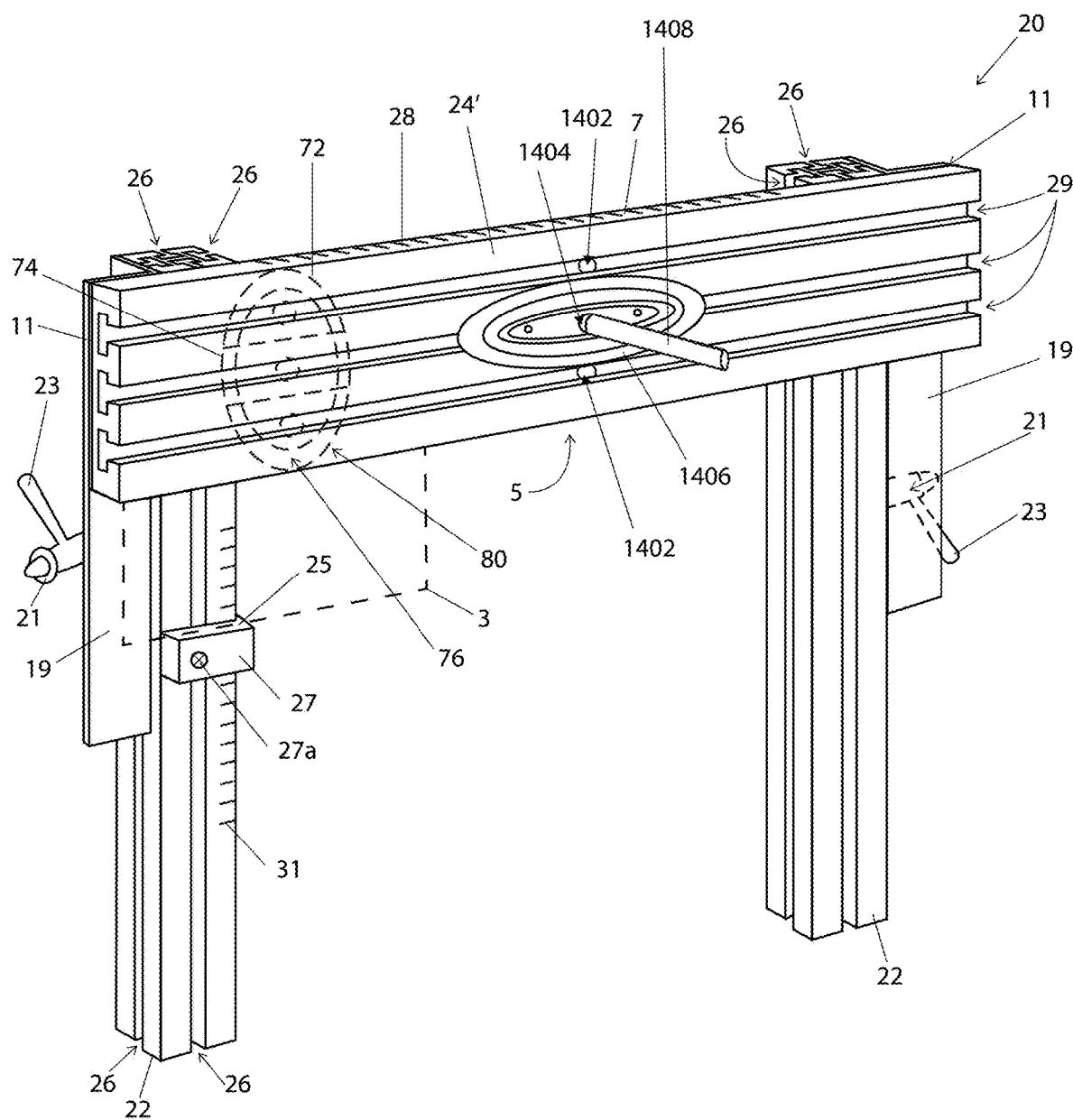
FIG. 14 is a perspective view of an alternate adjustable template holder for a template guide system in accordance with an embodiment and aspect of the disclosure.

Referring to FIG. 14, in accordance with another aspect of the disclosure, there is provided an improved cross member 24' for more easily positioning and centering templates on the template holder cross member, to allow greater ease and efficiency in making more accurate cuts and carves with a router. Thus, as shown in FIG. 14, the template holder cross member 24' is drilled, or there are otherwise formed, preferably a plurality of centered holes 1402, one centered hole in at least one, or preferably each, of the slotted tracks 29 of the template holder, wherein the centered hole, or holes 1402, are each located exactly midway between each end of the template holder cross member in its respective slotted track. In this way, a template 1406 having a central hole 1404, may be aligned with one of the series of centered holes 1402, as with a pin or a shaft 1408 (such as the guide bearing shaft) able to pass through, in order to center the template 1406 horizontally on the template holder 24'.

Accordingly, there is also provided an improved method of horizontally positioning and centering templates 1406 on the template holder cross member 24' comprising the following steps: inserting a keyed 42 template tenon 44 (see FIGS. 3C-3E, and FIGS. 8A-8C) into a slot 29 of the template holder 24', sliding the template in the slot to near the horizontal center hole 1402 of the template holder, pinning with a pin 1408, or shaft, a central hole 1404 of a template 1406 to a corresponding center hole 1402 in the template holder so as to locate the template 1406 at a centered location on the template holder, tightening a locking mechanism of each key 42 associated with the template to fix the template in place at the centered location on the template holder. The template 1406 is just like template 30, 30', 30'', 30''', except it has a central hole 1404 in it provided adapted to receive the pin 1408 for aligning the central hole 1404 with a corresponding hole 1402 in the template holder 24'

The system and method positioning and centering the template 1406 in accordance with this aspect of the disclosure makes positioning and centering templates 1406 on template holders 24' easier, and thus the process of installing templates centered on template holders is less time consuming than prior art methods of installing templates on template holders.

Referring more specifically now to FIGS. 3A-E, there is provided one or more tapered templates 30 (other embodiments, including non-tapered templates, stepped templates, segmented templates, and other types of templates, are discussed hereafter in connection with other figures). Each tapered template 30 comprises a top portion 31, a base portion 33, and one or more continuously-tapered surfaces, exterior, outer continuously-tapered surface 32a, and interior, inner continuously-tapered surface 32b, interconnecting the top portion and the base portion of each tapered template 30. Each continuously-tapered surface 32a, 32b is continuously tapered in the sense that the surface has a continuous taper from the base portion 33 to the top portion 31. In the case of exterior continuously-tapered surface 32a, the taper preferably extends continuously inwardly from the intersecting edge 37 of the base portion 33 and the tapered surface 32a to the intersecting edge 39 of the top portion 31 and the tapered surface 32a. Similarly, in the case of interior continuously-tapered surface 32b, the taper preferably extends continuously outwardly from the intersecting edge 41 of the interior continuously-tapered surface 32b and the base portion 33 to the intersecting edge 43 of the interior continuously-tapered surface 32b and the top portion 31.

In this way, there is provided the ability for micro-adjustment of cuts and carves because of the fact that, to the degree there are provided tapered surfaces, they are adapted to interface in a continuously-tapered fashion with an adjustable guide bearing 54 (FIGS. 4A and 5) to allow for such continuously-adjustable micro-adjustment.

It will be appreciated by those skilled in the art that the templates described herein may be stadium-shaped, elliptical-shaped or some other shape as shown or described. The terms stadium and elliptical are used somewhat interchangeably herein when describing one or more of the figures. The stadium shape is a geometric figure consisting of a rectangle with top and bottom lengths a, and the ends of which are capped off with semi-circles of radius r. The area of a stadium is therefore given by $A=\pi r2+2ra$, and the perimeter by $p=2(\pi r+a)$. While a stadium-shaped template, with a stadium-shaped outer periphery and a stadium-shaped inner periphery, or stepped inner periphery, is commonly, and even preferably employed in mortise and tenon joinery creation, it will be appreciated that other shapes, such as elliptical, circular, square, round, curved, or other shape appropriate to the desired design outcome, whether for joinery or otherwise, may also be employed with the present disclosure without departing from its true scope as claimed. Therefore, where stadium is mainly used herein to describe the shapes of the outer and inner peripheries of templates herein (and stadium may be interchangeably used with elliptical herein as pertaining to the drawings), it will be appreciated that elliptical, circular, square, or other basic shapes in accordance with a desired design outcome, whether for joinery or otherwise, may also be substituted without limiting the disclosure as claimed. For example, see the tenons of FIGS. 25A and 25B for alternative tenon shapes achievable with differently-shaped templates.

Each tapered template 30 is provided with a series of holes 45 adapted for receiving the key system 42 for use in releasably securing each template to the cross member 24 slot 29. The key system 42 further comprises a machine screw 47 preferably having an Allen Wrench or screwdriver slot(s) operable head 49 thereon. In this way, each tapered template 30 is adapted for interchangeable interconnection with a slot 29 of the cross member 24.

Figure 3E:
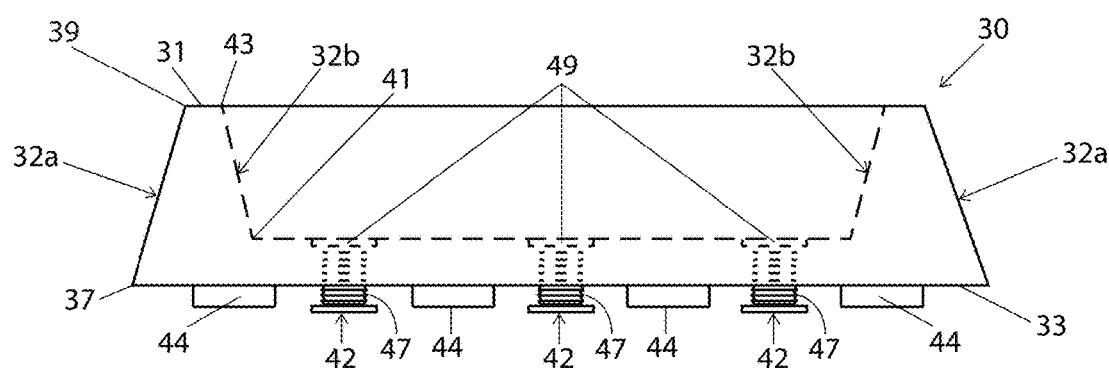
FIG. 3E is a front elevation view of a tapered template of a template guide system in accordance with an embodiment and aspect of the disclosure.
Figure 6A:
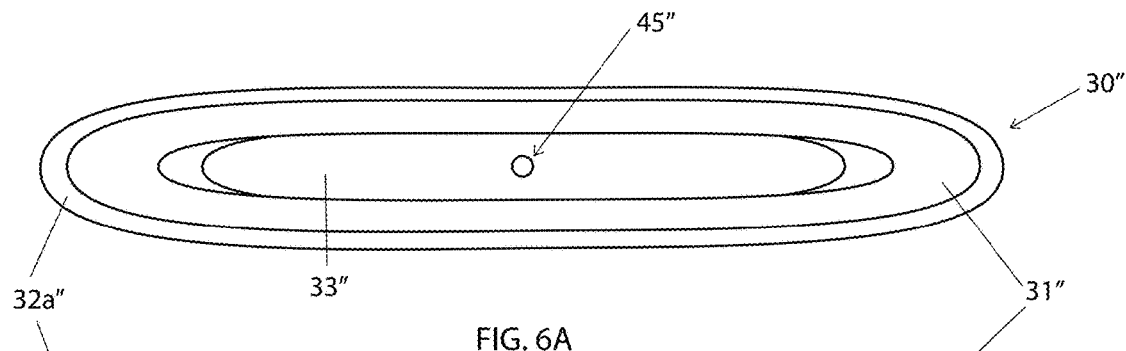
FIG. 6A is a top plan view of a tapered, stepped template of a template guide system in accordance with an alternate embodiment and aspect of the disclosure.
Figure 6B:
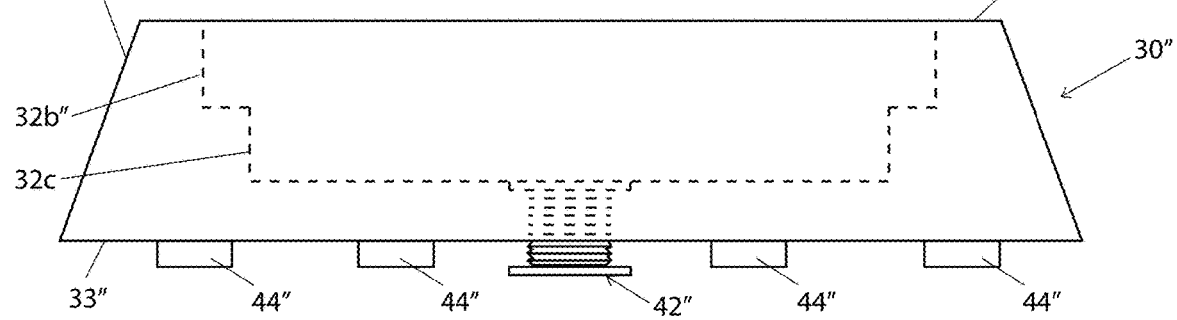
FIG. 6B is a front elevation view of the tapered, stepped template of FIG. 6A.
Figure 6C:
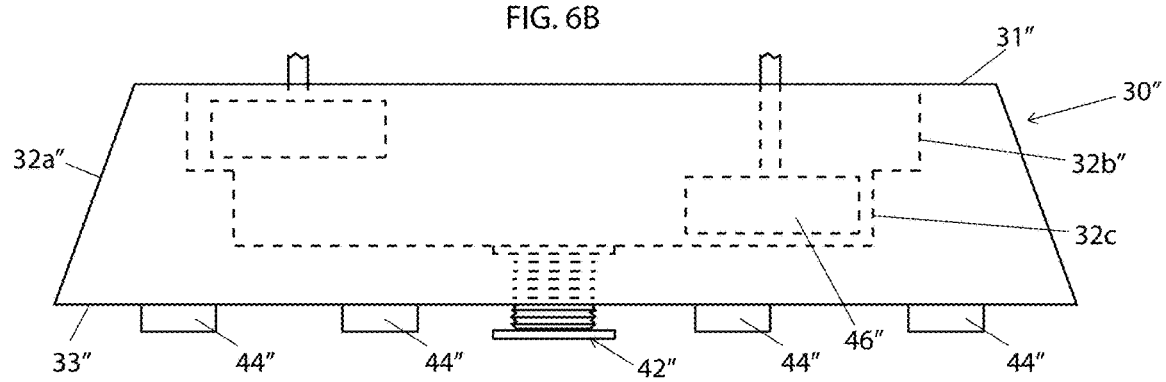
FIG. 6C is an illustrative front elevation view of the tapered, stepped template of FIGS. 6A and 6B, further showing in partial phantom view how a guide bearing would interface with the tapered, stepped template during operation.
Figure 6D:
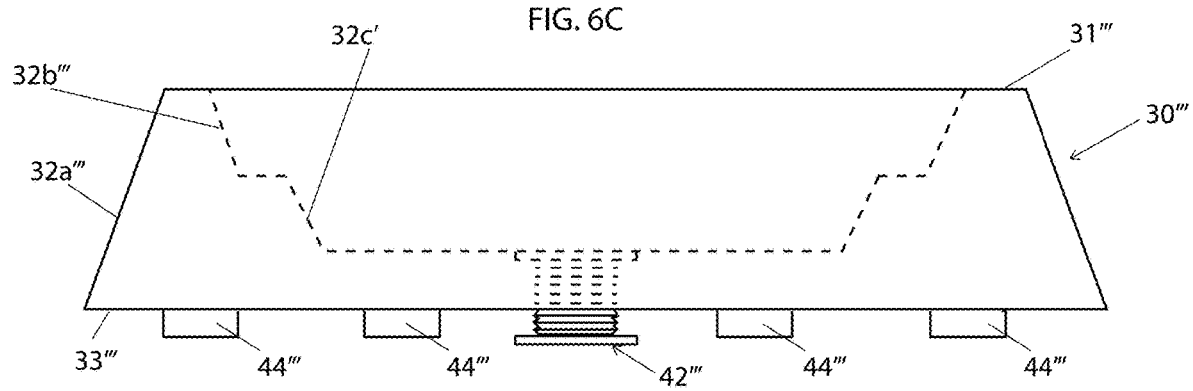
FIG. 6D is a front elevation of yet another alternative embodiment of a tapered, stepped template.

Each tapered template 30 is held on the slots 29 of the cross member 24 of the template holder 20 with the use of a releasably tightenable and adjustable key 42 and tapered tenon 44 system associated with each tapered template 30 as shown in FIG. 3E. The releasably tightenable and adjustable key 42 and tapered tenon 44 system may employ the use of multiple keys 42 as shown in FIG. 3E, or a single key 42' as shown in FIGS. 6B-6D. In either case, the tapered tenons 44, together with the key 42, serve to hold the tapered template 30 in aligned position on, and relative to, the template guide system cross member 24. See FIGS. 8A-8C for bottom plan views of these types of tapered tenons 84, 85, 88.

Figure 7A:
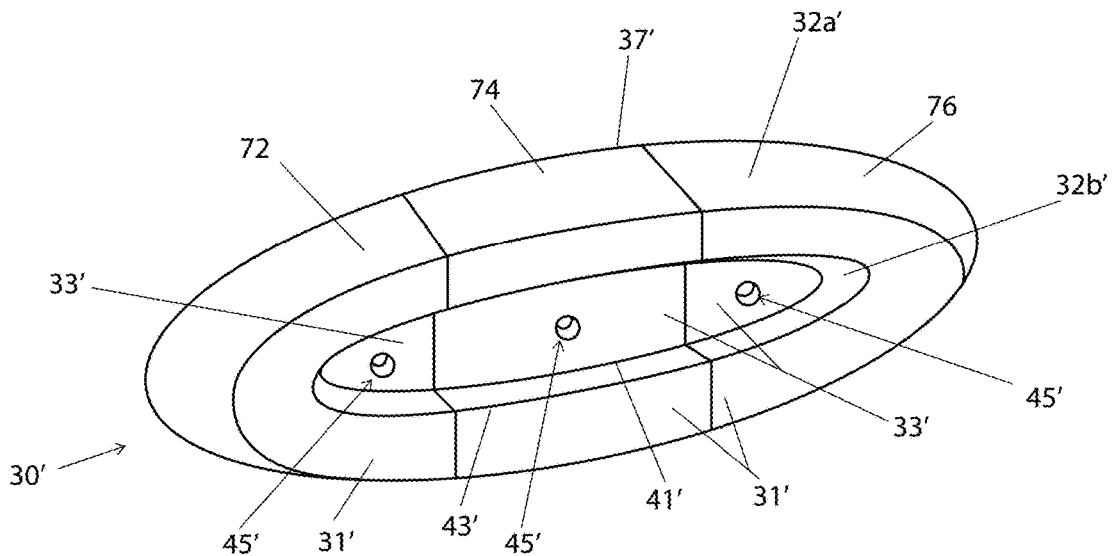
FIG. 7A is a perspective view of a plural-segment tapered template in accordance with an alternative embodiment and aspect of the disclosure.
Figure 7B:
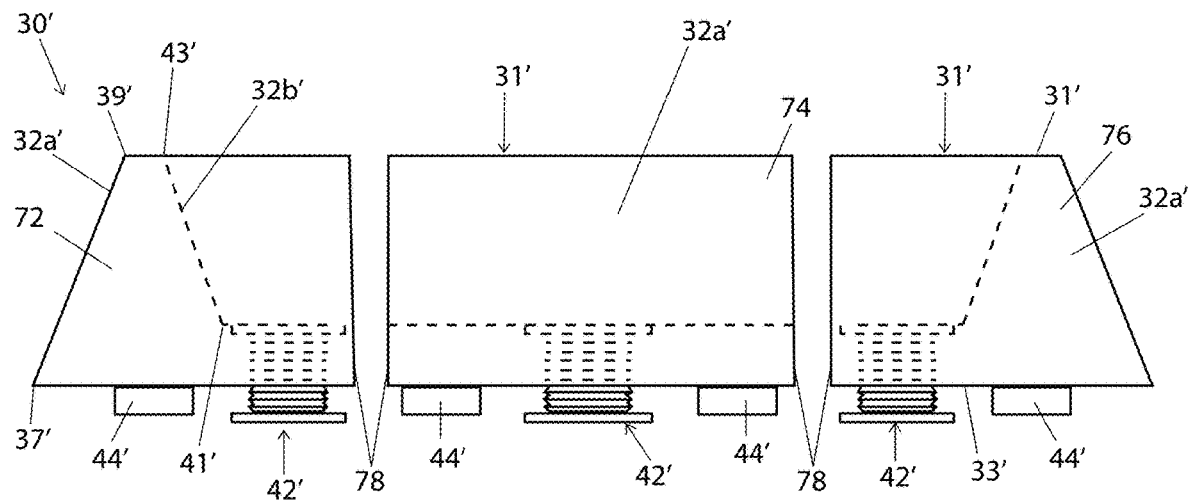
FIG. 7B is a front elevation exploded view of a plural-segment tapered template in accordance with an alternative embodiment and aspect of the disclosure.
Figure 8A:
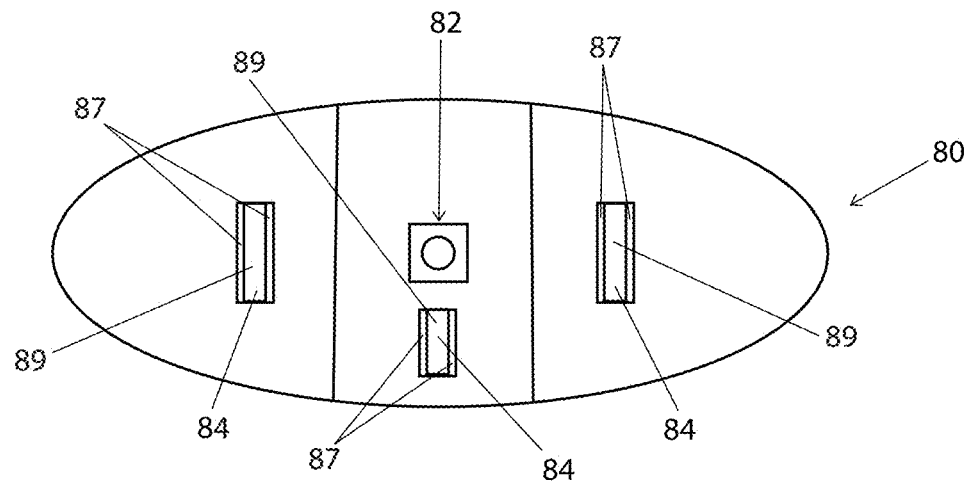
FIG. 8A is a bottom plan view of a base portion of a template adapted for vertical orientation on a template holder in accordance with an alternative embodiment and aspect of the disclosure.

Referring now specifically to FIGS. 7A-B and 8A, in accordance with another embodiment and aspect of the disclosure, there are provided a plurality of segments 72, 74, 76 comprising together a tapered template 30'. It will be appreciated that other types of templates, whether tapered, non-tapered, stepped, angular, or otherwise as discussed in other locations or in connection with other Figures in this specification, may be segmented and/or attached horizontally, vertically, or in angled orientation, to cross member 24 in accordance with an aspect and embodiments of the disclosure, without departing from the scope of the disclosure as claimed.

As with tapered template 30, tapered template 30', when considered with multiple segments fit together end-to-end, also comprises a continuous top portion 31', a continuous base portion 33', and one or more continuously-tapered surfaces, such as exterior, outer continuously-tapered surface 32a', and/or interior, inner continuously-tapered surface 32b', interconnecting the top portion and the base portion of each tapered template 30'. Each continuously-tapered surface 32a'/32b' is continuously tapered in the sense that the surface has a continuous taper from the base portion 33' to the top portion 31'. In the case of exterior continuously-tapered surface 32a', the taper preferably extends continuously inwardly from the intersecting edge 37' of the base portion 33' and the tapered surface 32a' to the intersecting edge 39' of the top portion 31' and the tapered surface 32a'. Similarly, in the case of interior continuously-tapered surface 32b', the taper preferably extends continuously outwardly from the intersecting edge 41' of the interior continuously-tapered surface 32b' and the base portion 33' to the intersecting edge 43' of the interior continuously-tapered surface 32b' and the top portion 31'.

In this way, there is provided a tapered relationship not only between the exterior continuously-tapered surface 32a' and the interior continuously-tapered surface 32b', but there is also provided for micro-adjustment of cuts and carves because of the fact that these tapered surfaces are adapted to interface in a continuously-tapered fashion with an adjustable guide bearing 54 to allow for such continuously-adjustable micro-adjustment.

In FIGS. 7A-B, tapered template 30' differs from tapered template 30 in that tapered template 30' is comprised of a plurality of segments 72, 74, 76. Thus, each of the segments 72, 74, 76 has a top portion 31', a base portion 33', an exterior continuously-tapered surface 32a', an interior continuously-tapered surface 32b', and preferably a hole 45', tapered tenons 44', and key members 42'. Further, each tapered template segment 72, 74, 76 also preferably has at least one cross-section end cut 78, and in some cases (i.e., segment 74) a plurality of cross-section end cuts. Preferably, these cross-section end cuts 78 will match corresponding cross-section end cuts 78, so that two or more segments may be located end-to-end in the slots 29 of cross member 24 (as shown in dotted lines at 30' on FIG. 2) in order to form a complete template 30'.

Thus, it will be appreciated that segments 72, 74, 76, or other segments having differing shapes in order to form desired cuts on a workpiece as will be appreciated by those skilled in the art, may be mixed, matched, and combined to form differing shapes and sizes of cuts. Thus, there is provided a router guide template 31', wherein the template is comprised of a plurality of segments of tapered templates 72, 74, 76. Further, each such segment 72, 74, 76 of tapered template 30' comprises a top portion 31', a base portion 33', and at least one of an exterior continuously-tapered surface 32a' interconnecting the base portion and the top portion along an outer periphery and an interior continuously-tapered surface 32b' interconnecting the base portion and the top portion along an inner periphery.

Still further, each such segment 72, 74, 76 of tapered template 30' further comprises two mating end portions 78 such that the plurality of segments of tapered templates may be removably and adjustably attached to the template holder 24 in end-to-end fashion. When combined in this manner, the top portions 31', the base portions 33', any exterior continuously-tapered surfaces 32a' and interior continuously-tapered surfaces 32b' of each segment 72, 74, 76 are mated end-to-end with an end 78 of another segment forming a continuous top portion 31', a continuous base portion 33', and one of an exterior continuously-tapered surface 32a' and an interior continuously-tapered surface 32b' between each mated segment.

When the entire plurality of segments 72, 74, 76 are thus mated end-to-end together they form a complete router guide template 30' with a continuous top portion 31', a continuous base portion 33', and at least one of an exterior continuously-tapered surface, 32a', an interior continuously-tapered surface 32b', and even a non-tapered interior or exterior surface (e.g., for example if template 81 or 83 of FIG. 8 were to be shown as segmented, since there are not shown guide surface tapers on these templates). This aspect of the disclosure further supports and enables greater ease and flexibility in forming templates 30' to accomplish a wider range of joining, or decorative, cuts in a workpiece.

Each tapered template 30 (30', 30'', 30''', 80, 81, 83, 90, 92, etc.) is provided with a series of holes 45 adapted for receiving the key system 42 for use in releasably securing each template to the cross member 24 slot 29. The key system 42 further comprises a threaded post 47 preferably with an Allen Wrench (other screwdriver) operable head 49 thereon. In this way, each template is adapted for interchangeable interconnection with a slot 29 of the cross member 24.

It will be appreciated that any taper of the interior and the exterior tapered surfaces of the templates (e.g., 30) described herein, may beneficially extend along the entire tapered surface (depending upon the desired output of such a guided pantographic-type router system), both from the base portion (e.g., 33) of the template to the top portion (e.g., 31) of the template, as well as around the entire length, or circumference in the case of an entirely stadium, elliptical, circular or oval template. Thus, there may be advantageously provided such a taper both near the top portion (e.g., 31) of the template (e.g., 30), near the base portion (e.g., 33) of the template, in between these two extreme locations, and along the entire tapered length of the template.

Referring now to FIGS. 6A-D, there is provided an alternative embodiment template 30'', comprised of a stepped, tapered template 30'', wherein, similar to tapered template 30, there is provided a top portion 31'', a base portion 33'', an exterior continuously—tapered surface 32a'', and stepped interior surfaces 32b'' and 32c. Further, as with template 30, and 30', template 30'' also comprises alignment tapered tenons 44'', and a key system 42'', except unlike the key systems 42, 42' of templates 30, 30', respectively, template 30'' only has a single key system 42'', which together with the alignment tapered tenons 44'', serves to releasably hold the template 30'' on a cross member 24 slot 29.

In FIG. 6D, there is provided yet another alternative embodiment template 30''', comprised of a stepped, tapered template 30''', wherein similar to tapered template 30'', there is provided a top portion 31''', a base portion 33''', an exterior continuously-tapered surface 32a''', and stepped interior surfaces 32b''' and 32c'. However, unlike tapered template 30'', interior surfaces 32b''' and 32c' are tapered at each of the steps. Like tapered template 30'', tapered template 30''' also comprises alignment tapered tenons 44''', and a key system 42''' for releasably holding the template 30''' on a cross member 24 slot 29.

Figure 8B:
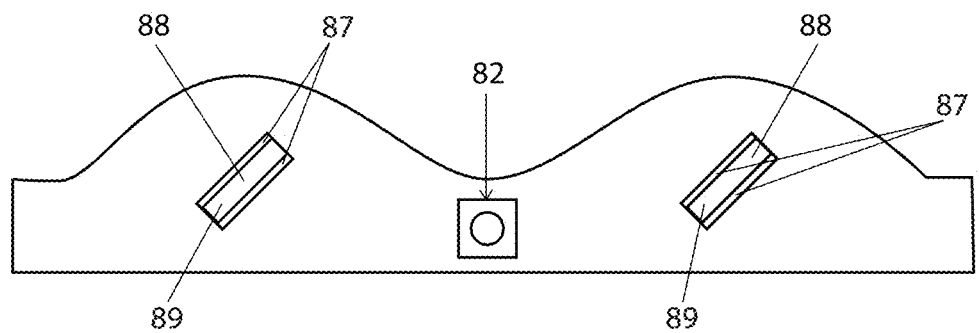
FIG. 8B is a bottom plan view of another base portion of a template adapted for angled orientation on a template holder in accordance with an alternative embodiment and aspect of the disclosure.
Figure 8C:
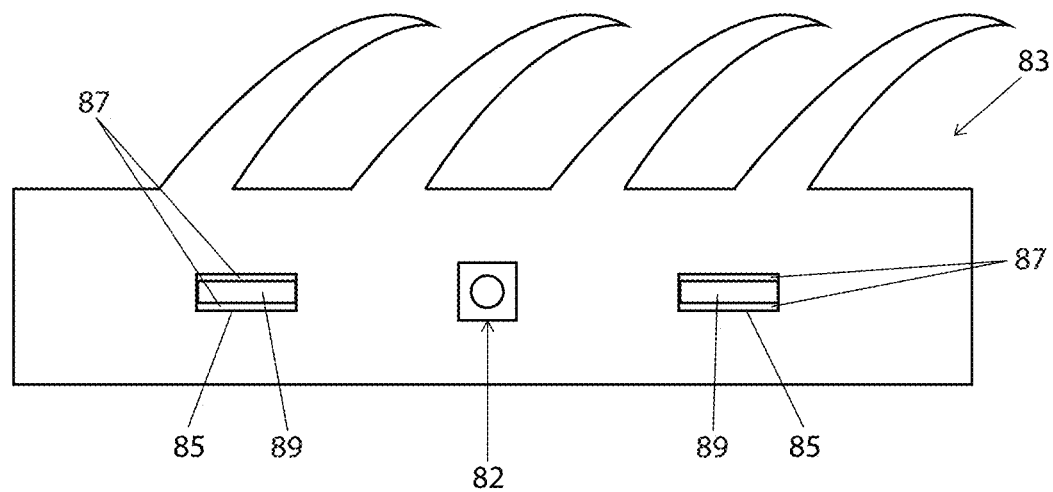
FIG. 8C is a bottom plan view of yet another base portion of a template adapted for horizontal orientation on a template holder in accordance with an alternative embodiment and aspect of the disclosure.

Referring now to FIGS. 8A, 8B, and 8C, there are provided alternative templates 80, 81, 83, respectively. Each such template has a key system 82 similar to that of tapered template 30, for example, and tapered tenons 84, 88, 85, respectively as to FIGS. 8A, 8B, 8C. Because of the orientation of the tapered tenons 84, the segmented template 80 would sit vertically on the cross member 24 similar to segmented template 80 shown in dotted lines on FIG. 2, whereas the template 81 would sit at an angle on the cross member 24, and the template 85 would sit horizontally on the cross member 24. The tapered tenons 84, 85, 88 each have tapered sides 87, and a preferably flat upper/lower portion interconnecting the tapered sides.

Figure 4A:
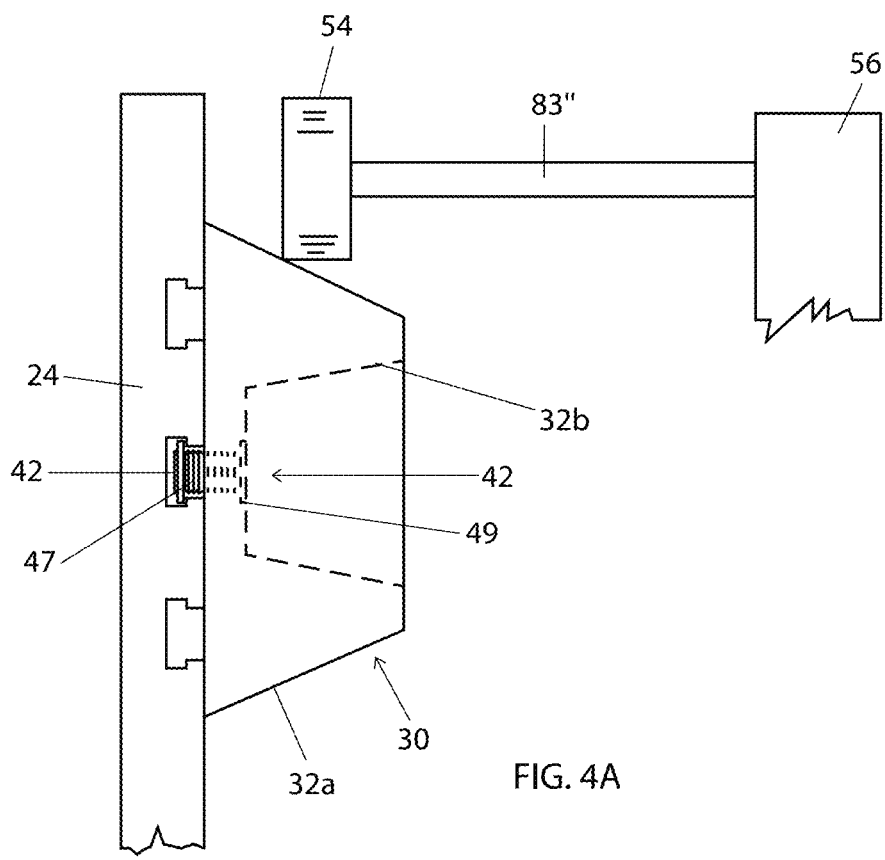
FIG. 4A is a partial side elevation view of a tapered template and guide bearing combination system in accordance with an embodiment and aspect of the disclosure.

Referring now also to FIGS. 4a and 5, the disclosure provides a router motor 50 (as part of a PantoRouter™, or Hybrid PantoRouter™, router system 49), having a router bit 52 and guide bearing, or guide wheel, 54 held on a guide bearing shaft 83" on a pantographic mount 56 on a base or carriage 58. On the pantographic mount 56, the center of the guide bearing 54 is located twice the distance from the reference pivot as the center of the router bit 52. The guide bearing 54 is guided by the operator around or within a template 30, 30', 30", 30''', 80, 81, 83, 90, 92 moveably located in the moveable tapered template holder system 20. Using the handle 51 and arm 53 of the pantographic mount 56, the operator can move the guide bearing 54 around the tapers 32a, 32b of the tapered template 30, or tapers 32a', 32b' of the tapered template 31', etc., which creates a larger or smaller cut in the workpiece by the router bit 52. Further, it will be appreciated that by loosening the knob 81 of FIG. 5, or knob 1202 of FIG. 16, the user is enabled in adjusting the guide bearing to a different position relative to the taper 32a or 32b of the template, to enable micro-adjusting the size of the cut or carve on a workpiece.

Figure 9A:
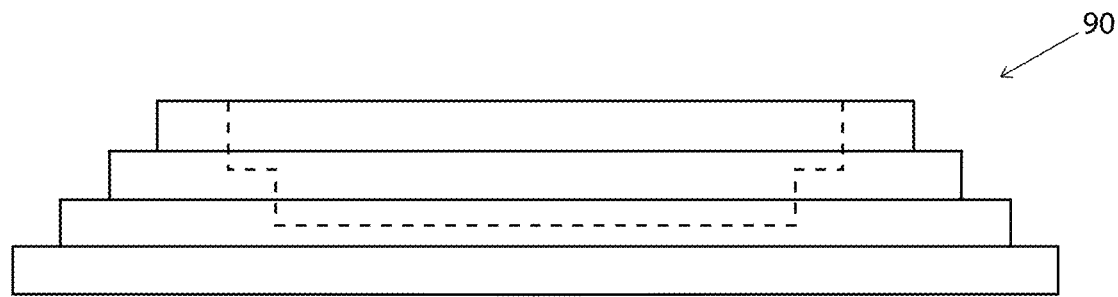
FIG. 9a is a front elevation partial view of part of an alternative embodiment of a template comprising an exterior stepped portion and an interior stepped portion (and without showing tapered tenons and keys for interconnecting to a template holder as per an aspect of the disclosure)
Figure 9B:
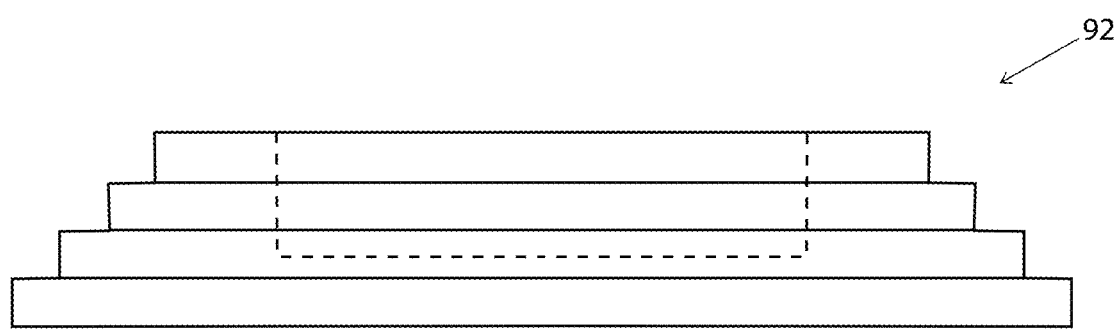
FIG. 9b is a front elevation partial view of part of another alternative embodiment of a template comprising an exterior stepped portion and an interior non-tapered portion (and without showing tapered tenons and keys for interconnecting to a template holder as per an aspect of the disclosure)

Of course, it will be appreciated by those skilled in the art that templates such as those shown in FIGS. 9a and 9b may be adapted for use with all other aspects of the disclosure, since these templates may be adapted in accordance with this disclosure to include tapered tenons and keys for interconnecting to a template holder as per an embodiment and aspect of the disclosure. Thus, the template 90 shows an alternative embodiment of a template comprising an exterior stepped portion and an interior stepped portion (without showing, for purposes of avoiding redundancy, tapered tenons and keys for interconnecting to a template holder as per an embodiment and aspect of the disclosure). Moreover, the template 92 shows a template comprising an exterior stepped portion and an interior non-tapered portion (again without showing, for purposes of avoiding redundancy, tapered tenons and keys for interconnecting to a template holder as per an embodiment and aspect of the disclosure).

Figure 4B:
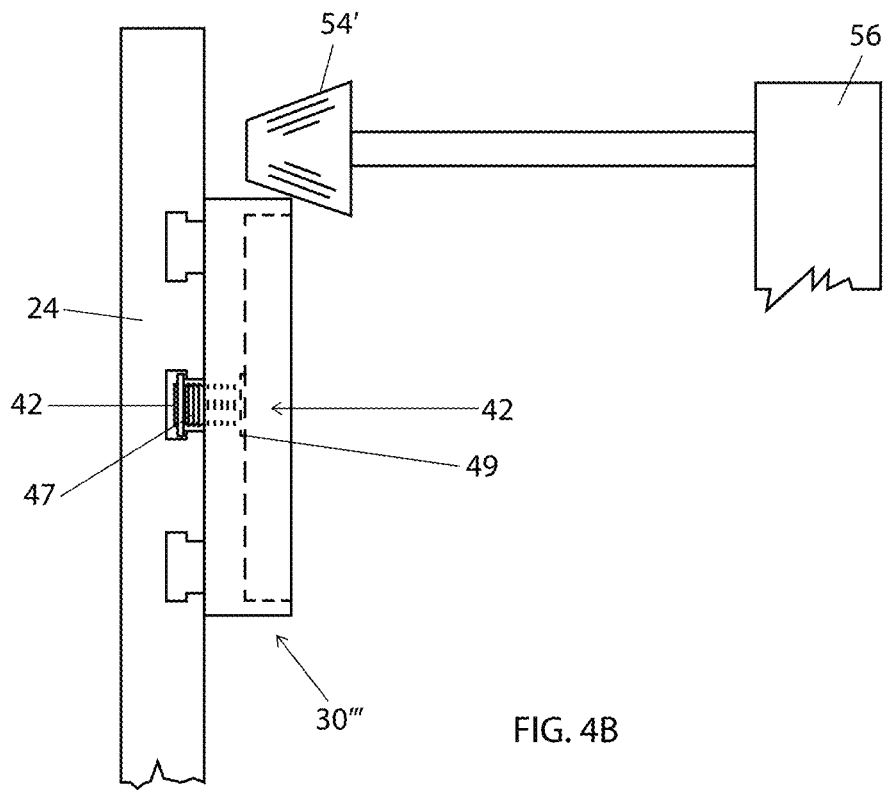
FIG. 4B is a partial side elevation view of a template and tapered guide bearing system in accordance with an alternate embodiment and aspect of the disclosure.

In accordance with an alternative embodiment of the disclosure as shown additionally in FIG. 4B, guide bearings can also be tapered as shown at 54' to be used with stepped templates (e.g., 30" of FIG. 6B, or 90 of FIG. 9A), non-tapered templates 30"" (e.g., FIG. 13), tapered templates (e.g., 30 of FIGS. 3A-E), or segmented templates (e.g., 30' of FIGS. 7A-B and 80 of FIGS. 8A and 2), to also allow micro-adjusting the size of the cut or carve on a workpiece.

The disclosure, or certain aspects thereof, can be used in any position, including but not limited to horizontal, such as with a Hybrid PantoRouter™ and PantoRouter™, or vertical such as a pin router or similar application. The disclosure, or certain aspects thereof, can also be used with non-pantographic router mount devices. Thus, the template holder system in accordance with an aspect of the disclosure can be moved to different positions, different jigs, or with different machines.

The tapered-template system in accordance with an aspect of the disclosure addresses problems of safety, inaccurate joinery using a router and fixed-size guides or templates. Thus, the disclosure enables quick, accurate, safer and easy-to-make joinery cuts, whether dovetail, mortise and tenon, or box joint cuts.

Further, the tapered-template system in accordance with an aspect of the disclosure allows for easy and quick micro-adjustments to cuts and carves, and thus certain aspects of the disclosure enable quick, accurate and easy-to-make micro-adjustments to a proposed cut. With the use of the template system (whether with non-tapered, tapered, or stepped templates) in accordance with one or more aspects of the disclosure, operators are enabled in greater control over routers using a pantographic router mount in order to make routers safer, easier to use and more accurate. The tapered template system in accordance with an aspect of the disclosure enables installing and changing templates and template holders, thus facilitating the work of setting up, creating, and taking down, a project.

Figure 11:
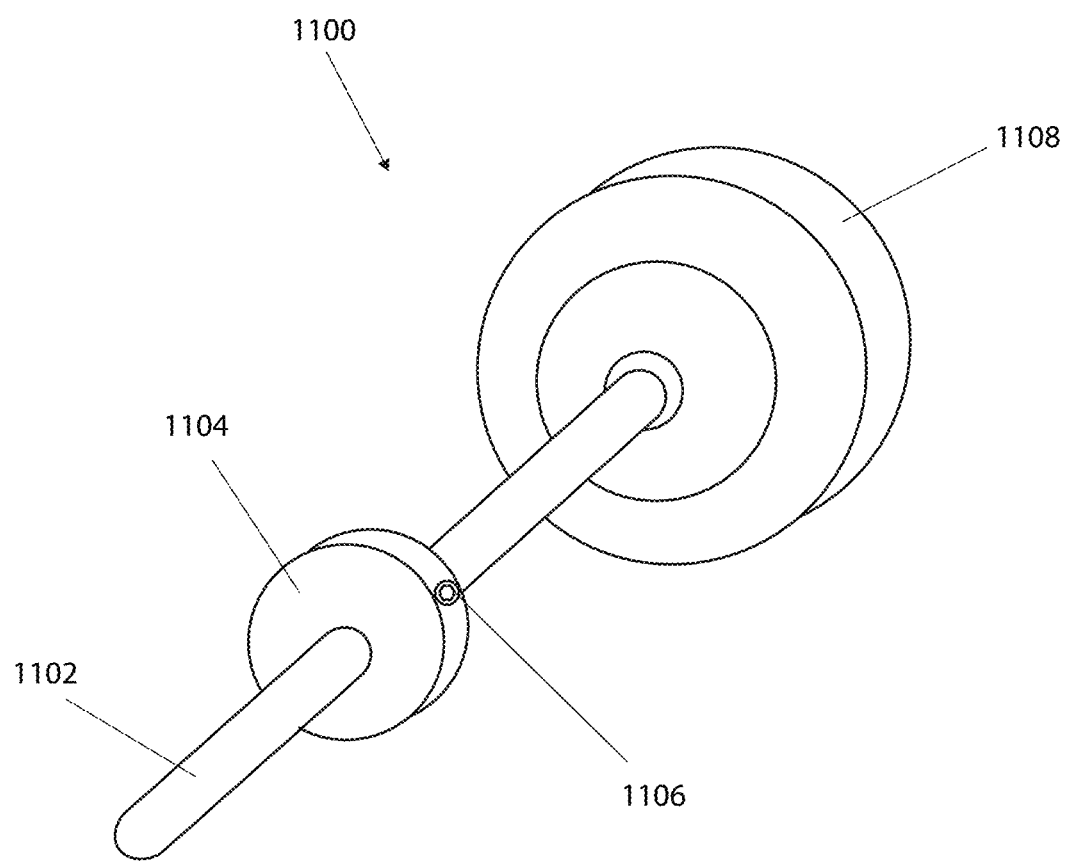
FIG. 11 is a perspective view of a guide bearing assembly comprising a shaft, a locking collar, and a non-tapered guide bearing.

As shown in FIG. 11, there is provided a guide bearing assembly 1100 comprising a shaft 1102, a locking, or lockable, collar 1104, the collar having a tightenable screw 1106 for allow adjustability of the collar on the shaft. The guide bearing assembly further comprises a bearing wheel 1108, which in the embodiment shown is a non-tapered guide bearing wheel adaptable for use as described elsewhere in the disclosure, for example, with a tapered template 30.

The guide bearing assembly 1100 differs from the guide bearing 54 and shaft 83 shown in FIG. 5, in that the guide bearing assembly 1100 comprises the collar 1104 added which enables easy positioning (location), and repositioning (relocation) of the shaft 1102, and hence the guide bearing assembly 1100, relative to arm 53 of the pantographic router mount 56.

Figure 12:
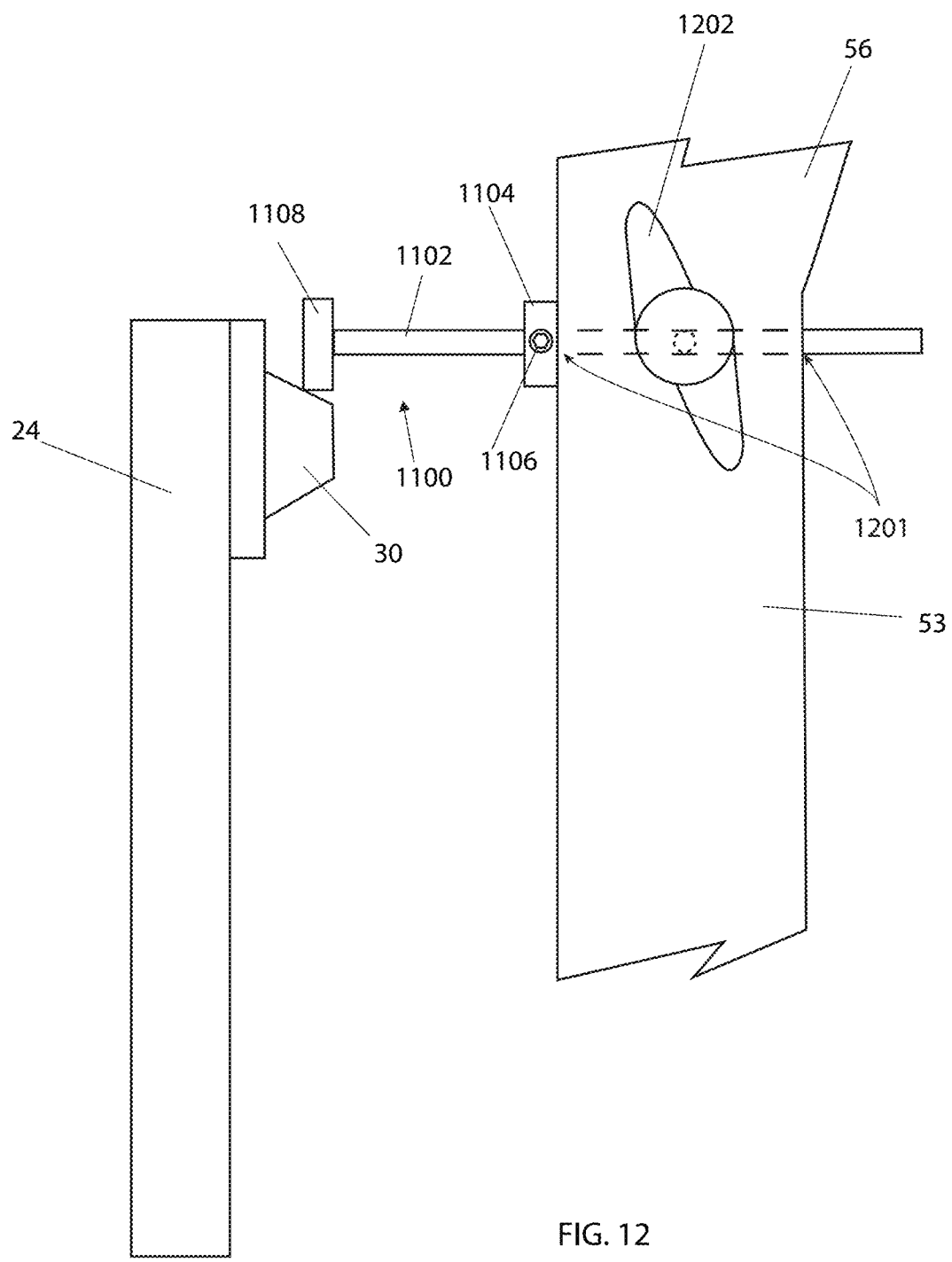
FIG. 12 is a side view of the non-tapered guide bearing assembly with a locking collar shown in FIG. 11 but retained in a router mount frame, preferably such as a control arm for the router.

As shown in FIG. 12, there is provided the non-tapered guide bearing assembly 1100 with a locking collar 1104 and on shaft 1102, similar to that shown in FIG. 11, but in FIG. 12 the guide bearing assembly is shown installed on arm 53 of the pantographic router mount 56, wherein the pantographic router mount is part of a pantograph router system with a mechanical advantage, e.g., a 2:1 ratio, in the relative sizes of the template and the cutting path, between the guide bearing 54 and the router bit 52. The shaft 1102 of the guide bearing assembly 1100 is held in place with a knob 1202 retained on a threaded shaft and screwed into the arm 53.

To adjust the depth of the guide bearing assembly 1100, one may unscrew the knob 1202 to loosen its hold on the guide bearing assembly shaft 1102 so that the shaft may be either moved closer to the template 30, or further away from the template. It will be appreciated that in order to move the shaft 1102, and hence the wheel 1108, further away from the template, one would have to loosen the screw 1106 on the locking collar 1104 to allow the collar to slide along the shaft. Then, once the desired depth of the shaft 1102 and wheel 1108 has been achieved relative to the template 30, the collar 1104 may be re-tightened against the arm 53 in such a way that the desired depth may be retained upon removal, and reinstallation, of the guide bearing assembly 1100 into the arm 53.

Figure 13:
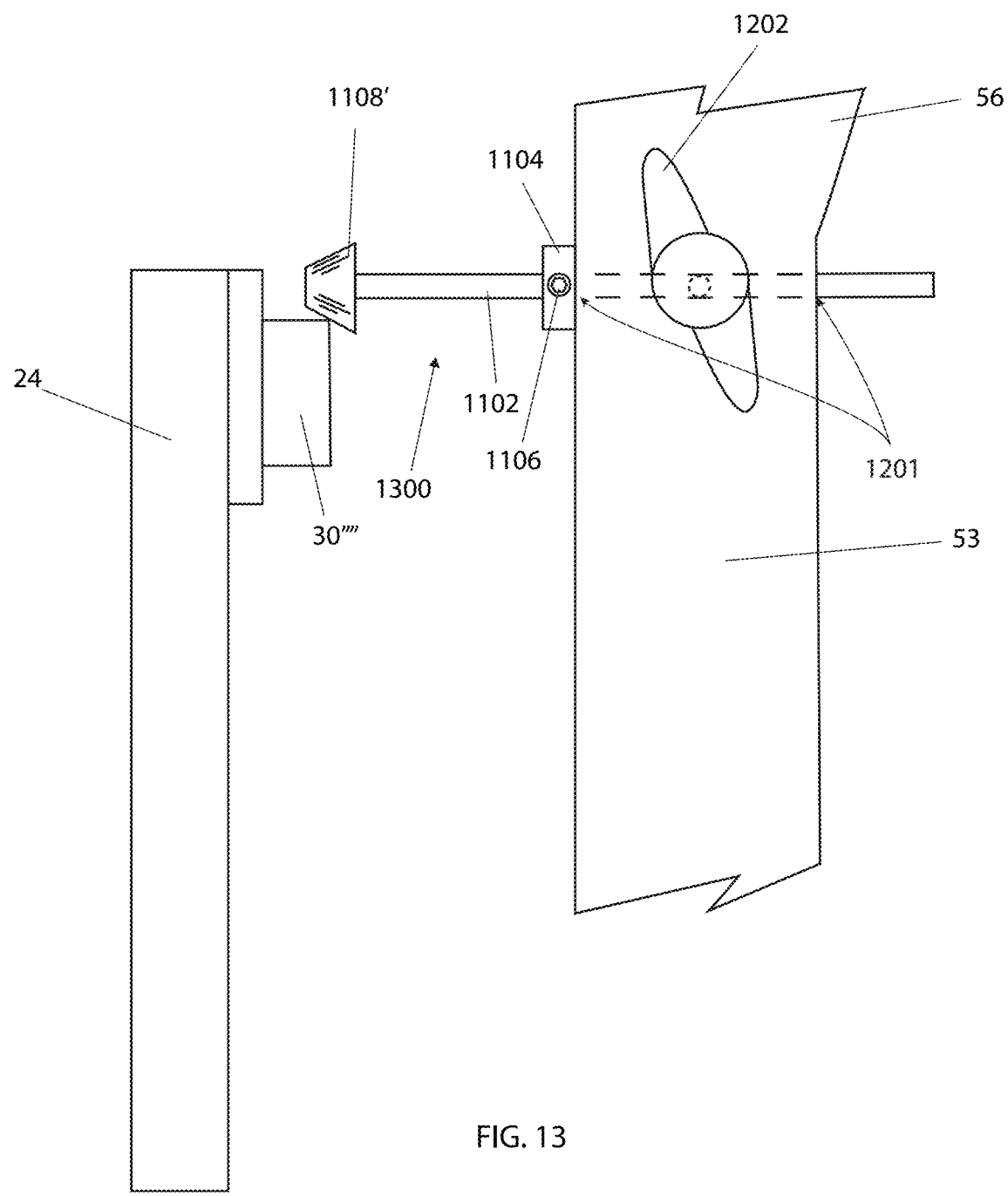
FIG. 13 is a side view of an alternative and tapered guide bearing assembly with a locking collar and retained in an arm, or handle, of a router frame.

As shown in FIG. 13, there is provided an alternative, tapered, guide bearing assembly 1300 with a locking collar 1104 and on a shaft 1102, similar to that shown in FIG. 12, with the guide bearing assembly shown installed on arm 53 of the pantographic router mount 56, the shaft 1102 of the guide bearing assembly 1300 also being held in place with the knob 1202 retained on a threaded shaft and screwed into the arm 53.

The tapered guide bearing assembly 1300 is similar to that shown in FIG. 4B for use, for example, with a non-tapered template 30'''' (but still allowing micro-adjustability of depth of cut according to the desired depth of the guide bearing wheel 1108', but in FIG. 13 the guide bearing assembly 1300 is shown installed on arm 53 of the pantographic router mount 56, with a locking collar 1104 on shaft 1102 to help locate and hold the guide bearing assembly 1300 at a desired depth relative to the arm 53. Like that shown in FIG. 4B, the guide bearing wheel 1108' is tapered.

To adjust the depth of the guide bearing assemblies 1100, 1300, one may unscrew the knob 1202 to loosen its hold on the guide bearing assembly shaft 1102 so that the shaft may be either moved closer to the template 30, 30'''', or further away from the template. It will be appreciated that in order to move the shaft 1102, and hence the wheel 1108, 1108', further away from the template, one would have to loosen the screw 1106 on the locking collar 1104 to allow the collar to slide along the shaft. Then, once the desired depth of the shaft 1102 and wheel 1108, 1108' has been achieved relative to the template 30, 30''', the collar 1104 may be re-tightened against the arm 53 in such a way that the desired depth may be retained upon removal, and to facilitate easily repeatable reinstallation, of the guide bearing assembly 1100 into the arm 53.

In this way, with the use of guide bearing assemblies 1100, 1300, repeated manufacture of, for example, consistently-sized mortise and tenon joints, becomes much easier and much less time consuming when re-setting up, for example, after working on another type of project. This in turn, prevents wasted materials as well otherwise involved, where a more trial-and-error-type method of determining position for the guide bearing wheel 54 relative to a template 30, for example, is used.

Referring to FIGS. 15-20, in accordance with other aspects of this disclosure, there are provided a device and system for positioning and centering, and re-positioning and re-centering, a cutting bit 52 relative to a workpiece 1608 using a pantograph-type routing system. Referring specifically to FIGS. 19A-19D, there are shown four different views of a half-cut positioning and centering device 1900 adapted for use with the system for positioning and centering using a pantograph-type router system 1600 having a workpiece cutting table 1602 with a centering line 1604 thereon, the router 50 thereof having a cutting bit holder 1606 having an anterior portion adapted to be closest to the workpiece cutting table and a workpiece, as well as a posterior portion.

Figure 16:
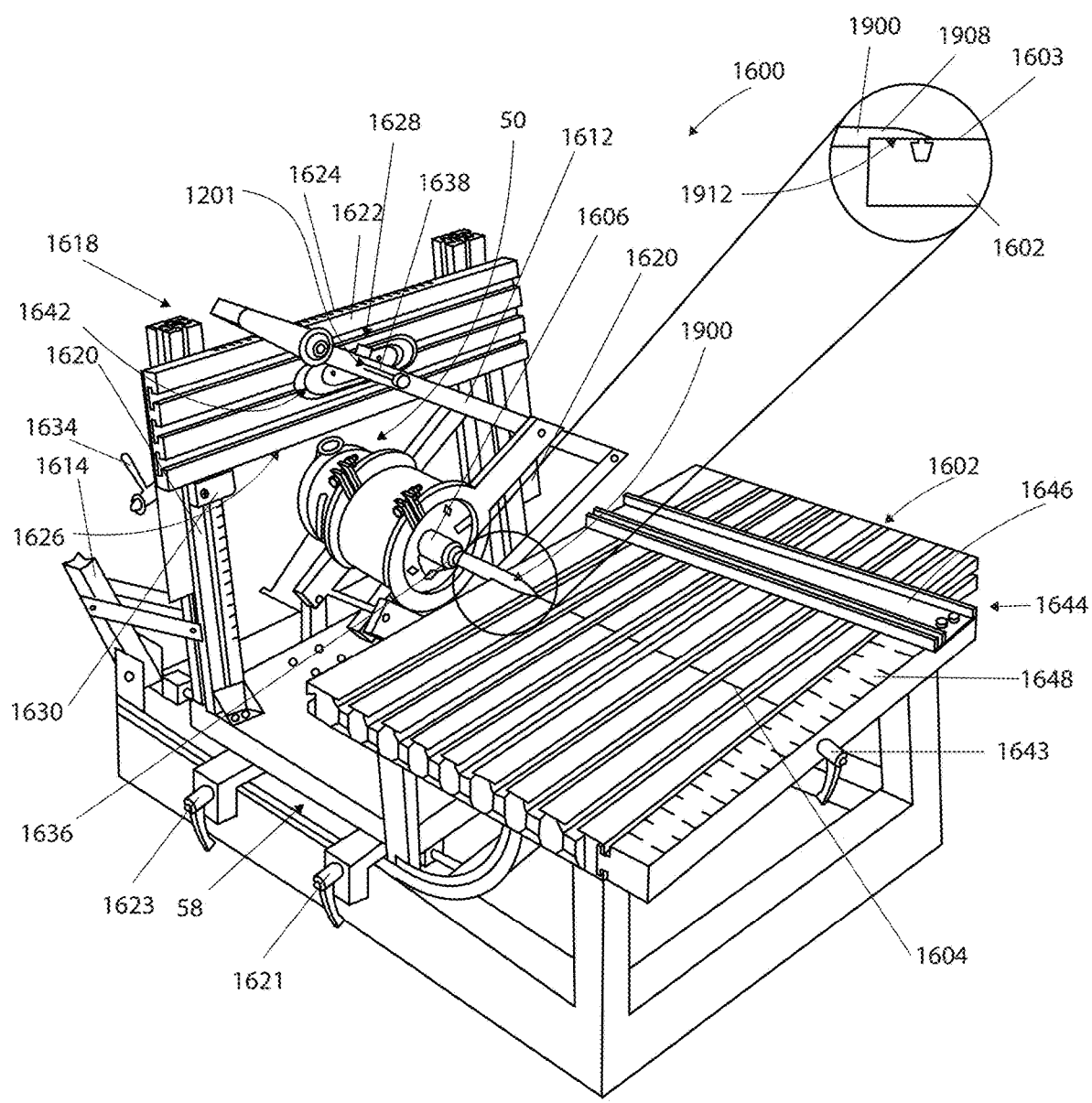
FIG. 16 is a perspective view of the elements of one or more aspects of the disclosure showing the positioning and centering system for a pantograph-type router system in the first initializing position.

The half-cut positioning and centering device 1900 comprises: a retained portion 1902 adapted for being retained in the cutting bit holder 1606; and a pointed portion 1908 preferably contiguous with and extending from the retained portion and adapted for extending outwardly from the anterior portion of the cutting bit holder to an end 1910 of the pointed portion. The end 1910 is adapted to be positioned closely to the workpiece 1608 and the workpiece table 1602 for centering purposes (see FIG. 16, and the inset thereof), with the pointed portion 1908 being at least partially tapered along at least a part of its length to the point at the end 1910 of the pointed portion. The pointed portion 1908 of the half-cut positioning and centering device 1900 further preferably comprises at least one flat surface 1912 extending along at least a part of the length of the pointed portion and terminating at the pointed end 1910 of the pointed portion. Therefore, the flat surface 1912 of the pointed portion may be brought to rest flush on the workpiece table 1602 with the pointed end of the pointed portion pointing along the centering line 1604 of the workpiece table 1602 as shown in FIG. 16. In this position, the router 50 and guide bearing 54 thereof are initialized at a level precisely with the center point 1910 of the half-cut positioning and centering device 1900 aligned with the centering line 1604 of the workpiece table 1602 and at the level of a top surface 1603 of the workpiece table.

Preferably, at least a portion 1903 of the retained portion 1902 of the positioning and centering device 1900 is elongated adapted for being retained in the cutting bit holder 1606. Further, preferably, the pointed portion 1908 is also elongated and adapted for extending longitudinally along the centering line 1604 of the workpiece table 1602 when the pointed end 1910 thereof is precisely aligned with the centering line of the table and the flat surface 1912 is further adapted for being flush with, that is in contact along its surface with, the upper surface 1603 of the workpiece table 1602 in the first initializing position as also shown in the inset of FIG. 16.

Thus, the retained portion 1902 is preferably adapted for extending outwardly from the anterior portion 1636 of the cutting bit holder 1606 to an end 1910 of the pointed portion 1908. Accordingly, the pointed end 1910 of the positioning and centering device 1900 is thus adapted to be positioned closely to the workpiece 1608 and the workpiece table 1604 for positioning and centering purposes, the pointed portion 1908 being at least partially tapered along at least a part of its length to a point at the end 1910 of the pointed portion. Further, preferably, the pointed portion 1908 of the positioning and centering device 1900 of the positioning and centering system further comprises a flat surface 1912, wherein the flat surface extends along at least a part of the length of the pointed portion 1908 and terminates at the pointed end 1910 of the pointed portion. Thus, the flat surface 1912 of the pointed portion 1908 preferably may be brought to rest flush, that is with the flat surface 1912 contacting, an upper surface 1603 on the workpiece table 1602 with the pointed end 1910 of the pointed portion pointing along the centering line 1604 of the workpiece table in at least a first initializing position as shown in FIG. 16.

Still further, preferably, the retained portion 1902 of the half-cut positioning and centering device 1900 is circular in cross section as suggested in FIGS. 19A-19D, and the pointed portion 1908 is also generally semi-circular in cross section as shown in these Figures, wherein the diameter of the semi-circular cross section gradually decreases to a point 1910 as the pointed portion 1908 tapers from its widest at its intermediate origin 1914 to its pointed end 1910. And further, preferably, the flat surface 1912 of the positioning and centering device extends from this intermediate point of origin 1914 along a length of the retained portion 1902 and the contiguous pointed portion 1908 combined, the flat surface portion further comprising a shelf 1916 cut perpendicular to a longitudinal axis of the positioning and centering device 1900 such that the shelf forms a right angle with the flat surface 1912 at the point of origin 1914 of the flat surface, regardless of whether the rest, or any part, of the device is circular, or semi-circular, in cross section.

Referring to FIGS. 15-20, in accordance with another aspect of the disclosure, there is provided a workpiece and cutter blade positioning and centering system adapted for use with a guide bearing 1610 and template-guided pantograph-type router system 1600 having a workpiece cutting table 1602, a first arm 1612, 53 for moving the router 50 and cutting blade 52 in X and Y coordinate spaces, a second arm 1614 for moving the router and cutting blade in a Z coordinate space, and a cutting blade holder, or chuck 1606.

Figure 2:
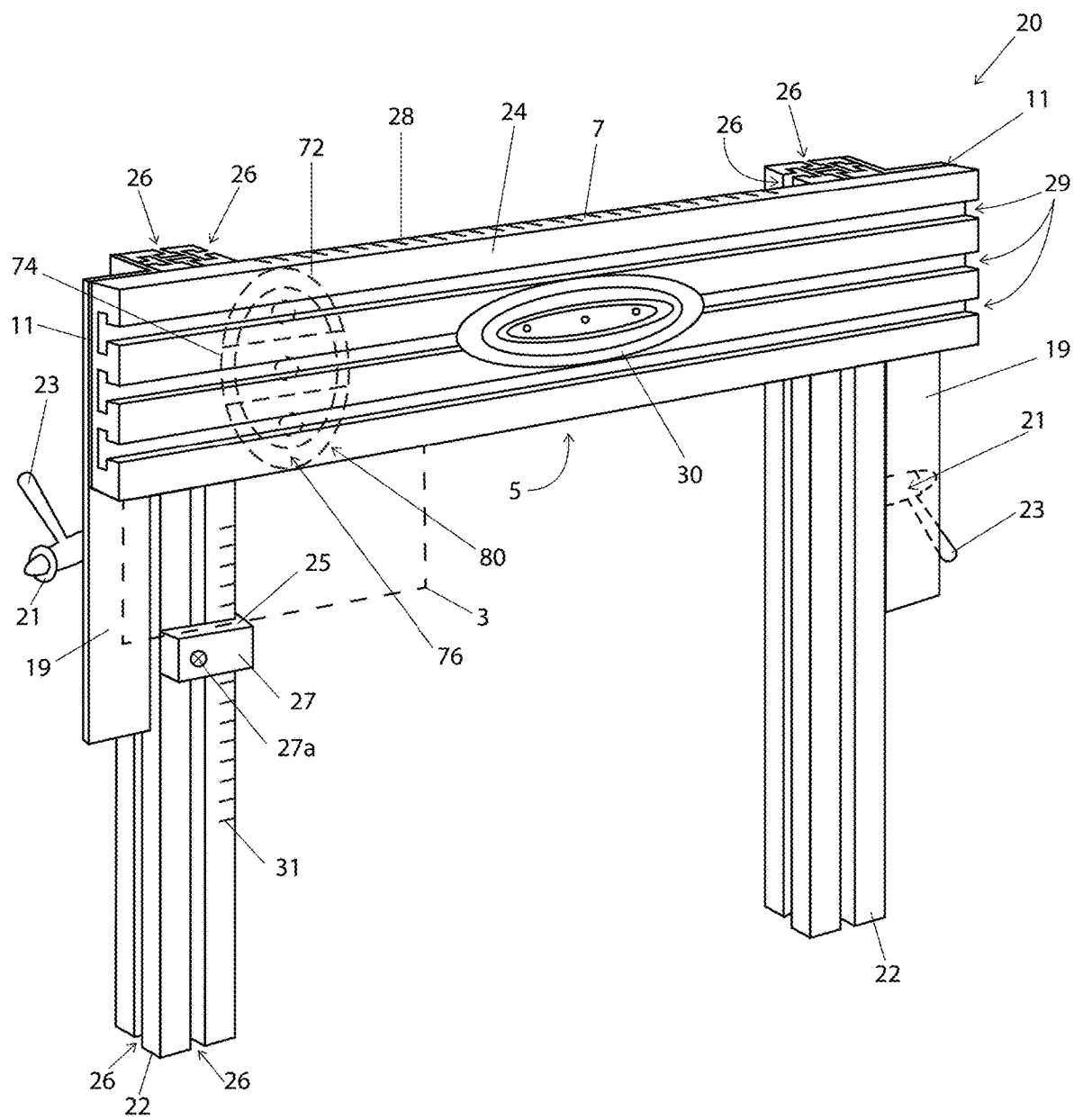
FIG. 2 is a perspective view of an adjustable template holder for a template guide system in accordance with an embodiment and aspect of the disclosure.

The positioning and centering system comprises: a template holder 1618 comprising a plurality of stands, posts, or legs 1620 and an adjustable cross member 1622 fixable horizontally normal to the legs, the cross member having a first upper surface 1624 and a second lower surface 1626, the cross member having defined therein at least one hole 1628. The positioning and centering system further comprises: a first thickness gauge member 1630 on at least one of the plurality of legs 1620, the first thickness gauge member having a surface 1632 adapted to engage the lower surface 1626 of the cross member 1622 in a first initializing position of the cross member as shown in FIG. 16 and the detailed inset in FIG. 15. In this first initializing position of the cross member 1622, the half-cut positioning and centering device 1900 is positioned with the flat surface thereof engaged with the upper surface of the workpiece cutting table 1602, as shown in the detailed inset of FIGS. 15 and 16. As further described further herein in accordance with methods of use of the positioning and centering system disclosed herein, upon moving the cross member 1622 away from the first thickness gauge member 1630, the first thickness gauge member and the cross member are adapted to have a workpiece 1608 thickness inserted therebetween in a second vertically-centered position, as shown in FIGS. 2 and 17, wherein the upper surface 1632 of the first thickness gauge member 1630 and the lower surface 1626 of the cross member 1622 each engage opposing upper and lower surfaces of the thus-inserted workpiece (as shown in phantom at 3 in FIGS. 2 and 17), the cross member being adapted for being releasably fixed to the plurality of vertical legs 1620 with a system of clamps 1634.

The positioning and centering system further comprises: a pointed elongated positioning and centering device 1900 comprising a partially flat surface 1912 and further adapted with a retained portion 1903 for installation into the cutting blade holder and a centering line 1604 on the workpiece cutting table 1602. Also, there is provided a centering pin 1638, preferably comprising a shaft 1638 for a guide bearing 54, the shaft having first and second ends, 1639, 1640. The first end 1639 is adapted for insertion into the arm 1612 of the pantograph-type router system and for being inserted into the hole 1628 defined in the template holder cross member, The second end 1640 is preferably adapted for having mounted thereon the guide bearing 54. Thus, when the shaft 1638 is inserted in both the arm 1612 and the hole 1628, the centering pin, or shaft, aligns the arm at a location wherein the pointed elongated positioning and centering device 1900 is aligned and flush with the centering line 1604 of the workpiece cutting table 1602 in the first initializing position useful for centered placement of a workpiece 1608 on the workpiece cutting table.

Figure 15:
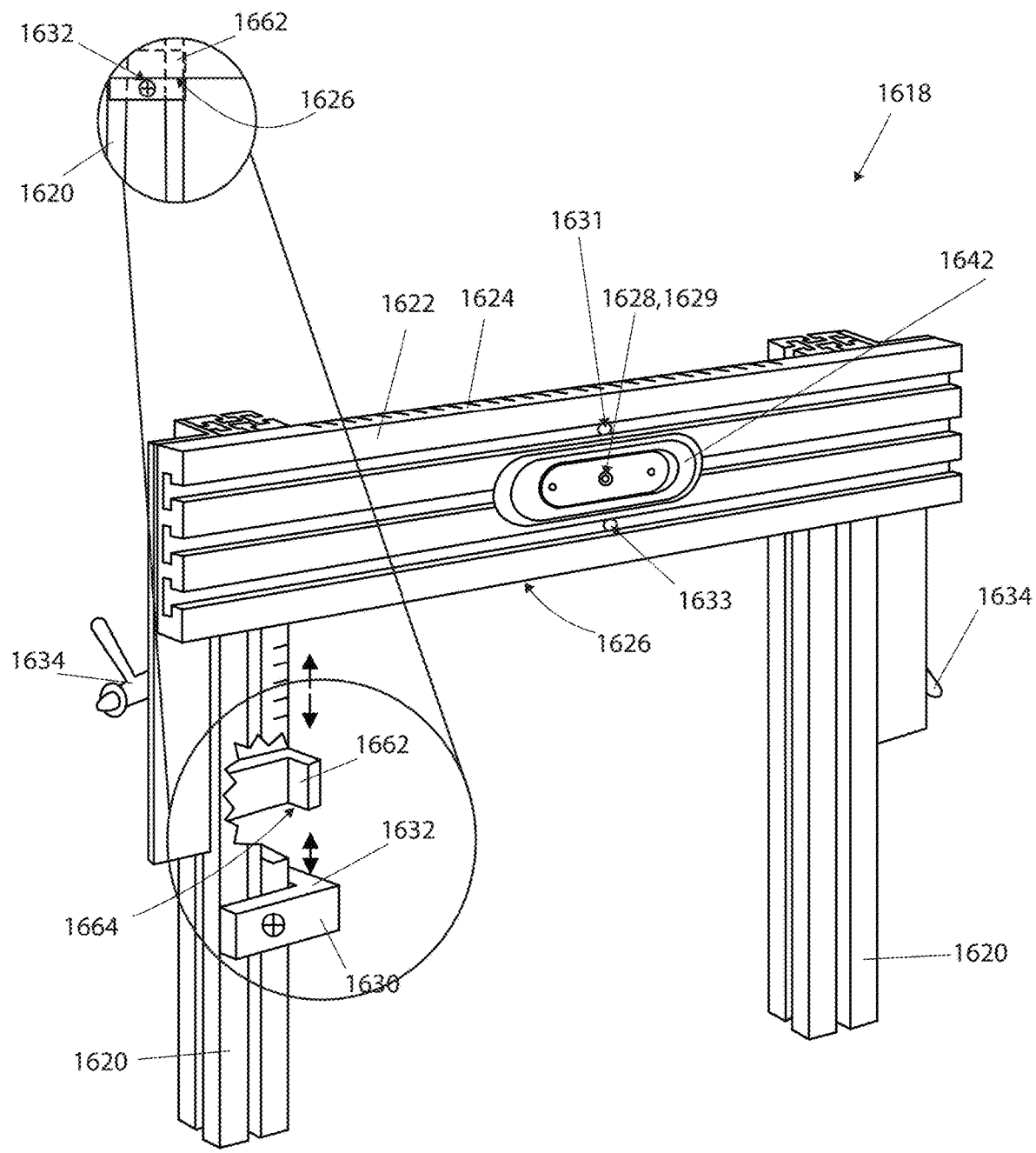
FIG. 15 is a perspective view of a preferred alternative adjustable template holder for a template guidance system showing a two-member thickness gauge thereon and having a detailed inset showing the thickness gauge and cross member set to a first initializing position.

In another aspect of the disclosure, and referring specifically to FIG. 15, the workpiece and cutter blade positioning and centering system further comprises a template 1642 having at least one center hole 1629 therein adapted for aligning with the center hole 1628 of the cross member 1622 of the template holder 1618 and associated tightening means (see key 42 for releasably locking the template into position with the use of template tenons 44 on the cross member). The template 1642 in accordance with this aspect of the disclosure is adapted for being centered on the cross member 1622 by aligning a central hole 1629 of the template with the hole 1628 of the cross member 1622 and inserting the centering pin, or guide bearing shaft, 1638 through both holes 1628, 1629 while tightening the template onto the cross member 1622 with the key 42.

Figure 17:
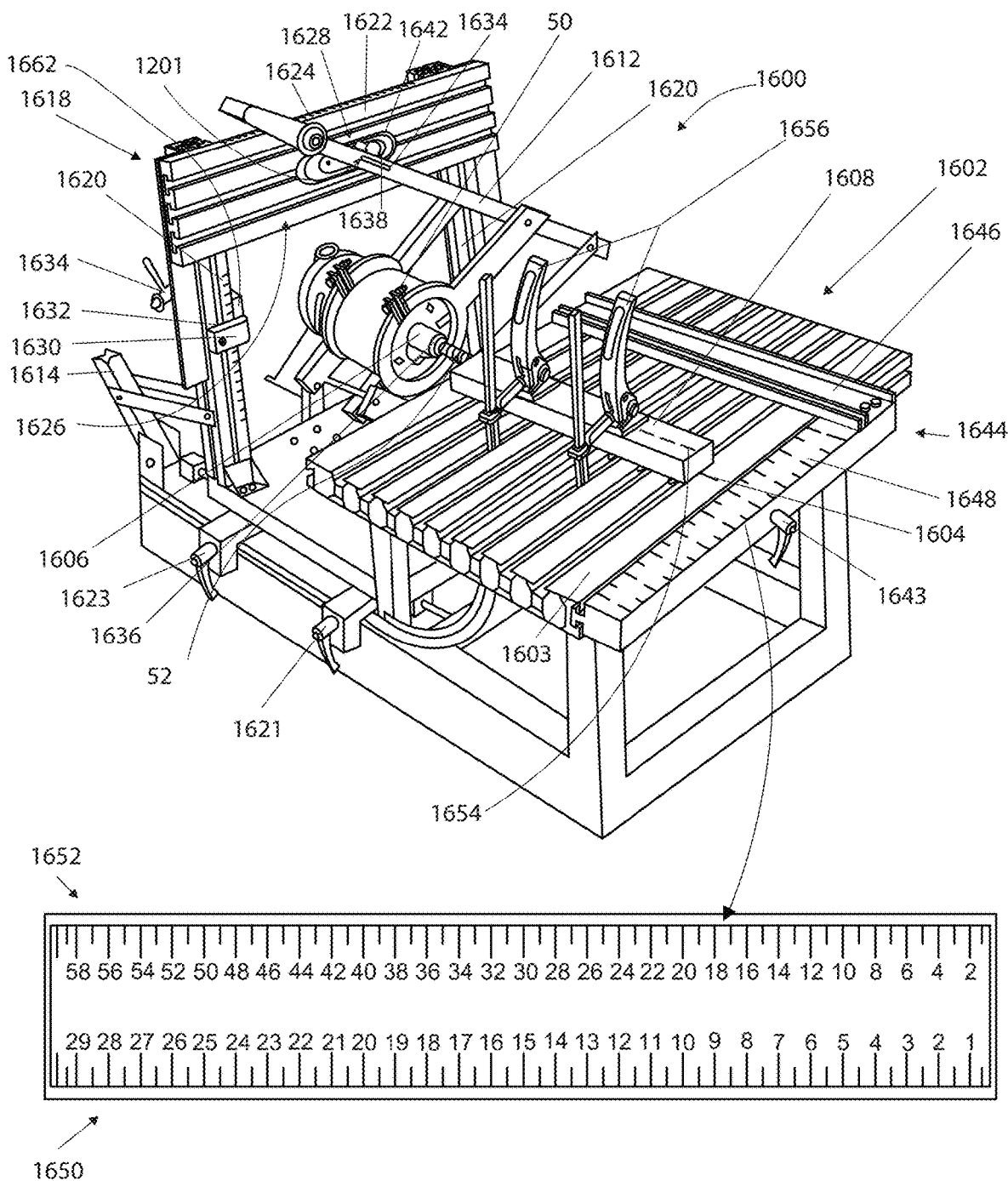
FIG. 17 is a perspective view of the elements of one or more aspects of the disclosure showing the positioning and centering system for a pantograph-type router system in a second centered position and ready to cut a mortise, tenon, or other cut, the system further detailing a metric full-scale-half-scale and fence combination as part of the positioning and centering system.
Figure 18:
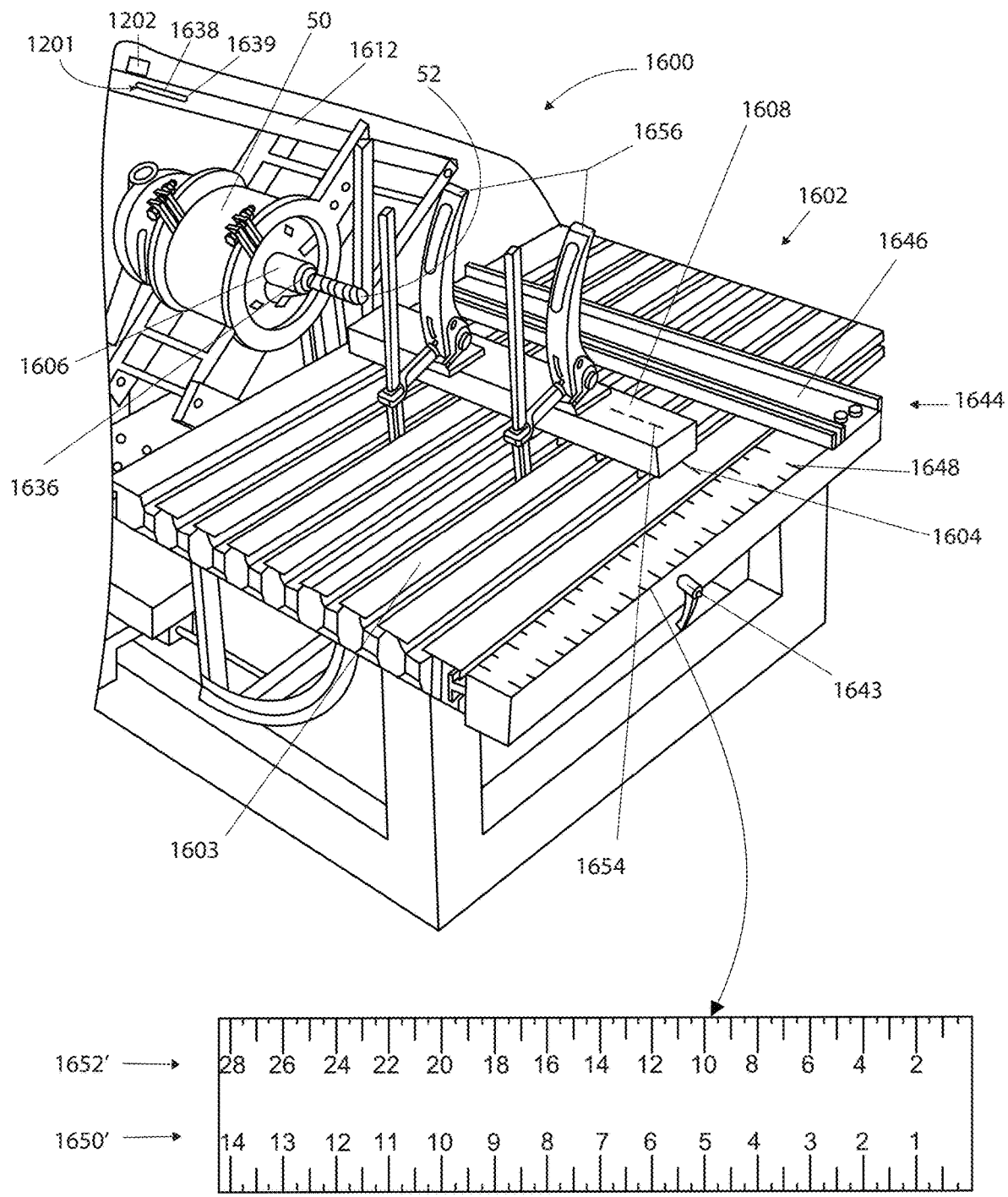
FIG. 18 is a perspective view of the elements of one or more aspects of the disclosure showing the positioning and centering system for a pantograph-type router system in another position and ready to cut a mortise, tenon, or other cut, the system further detailing a standard full-scale-half-scale and fence combination as part of the positioning and centering system.
Figure 19A:
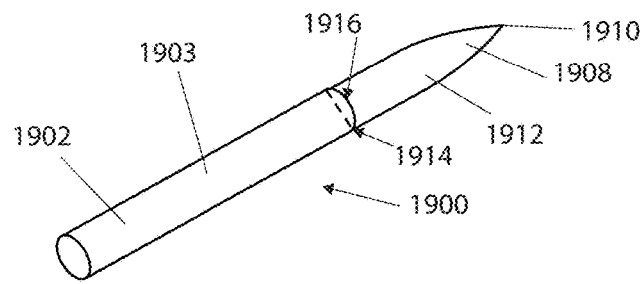
FIGS. 19A-D are various views of a half-cut positioning and centering device in accordance with an aspect of the disclosure.
Figure 19B:
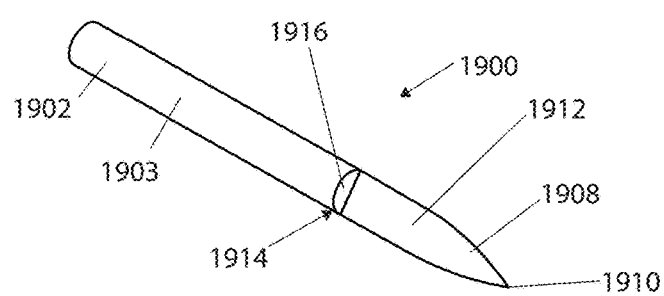
Figure 19C:
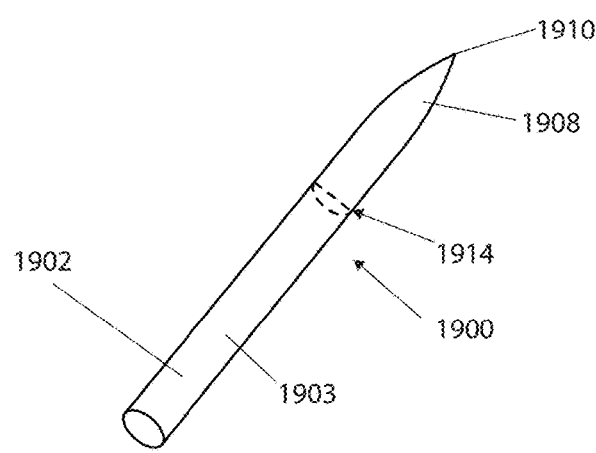
Figure 19D:
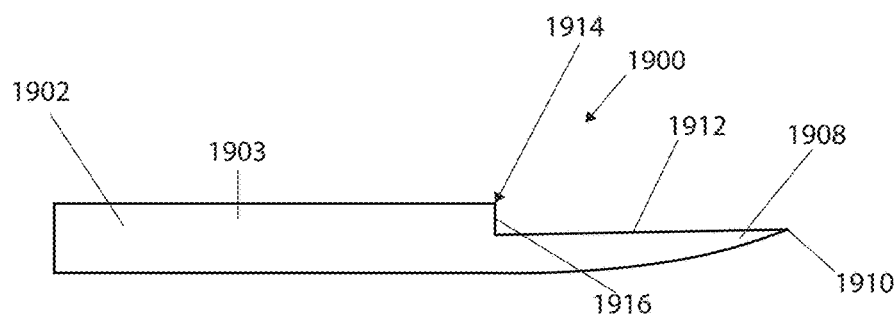

As shown in FIGS. 16-18, in accordance with another aspect of the disclosure, the workpiece and cutter blade positioning and centering system further comprises an adjustable fence and full-scale-half-scale combination 1644, otherwise referred to herein as a fence and scale 1644, which comprises a fence portion 1646 and a full-scale-half-scale portion 1648. The fence and scale 1644 is moveably attached, via the use of a releasably lockable handle and key system 1643 and adjustable relative to the centering line 1604 and the workpiece cutting table 1602. Further, the adjustable fence and scale 1644 is adapted for use measuring a full width of the workpiece 1608 with smaller magnitude, outer, measurements on a full measuring portion 1650, 1650' of the full-scale-half-scale portion 1648 of the adjustable fence and full-scale-half-scale combination 1644 and setting the fence and scale 1644 to a width corresponding to half of the workpiece width 1654 to be aligned at the centering line 1604 of the workpiece cutting table 1602 to thus center the workpiece 1608 relative to the centering line 1604. This is easily accomplished, since as can be readily seen in the inset portions of FIG. 17 (representing metric measurements) and 18 (representing standard inch measurements), the outer numbers 1650, 1650' are half the magnitude of correspondingly spaced inner numbers 1652, 1652', so that upon measuring the width of the workpiece 1608 against the outer smaller numbers (representing the whole scale), setting the fence and scale 1644 on the centering line 1604 by aligning the same magnitude on the inner larger numbers (representing the half scale) easily allows setting the magnitude of the width of the workpiece at the centering line, since the fence portion 1646 butts squarely up against an edge of the workpiece so that it can be easily positioned and fastened into that location with workpiece clamps 1656.

Figure 20:
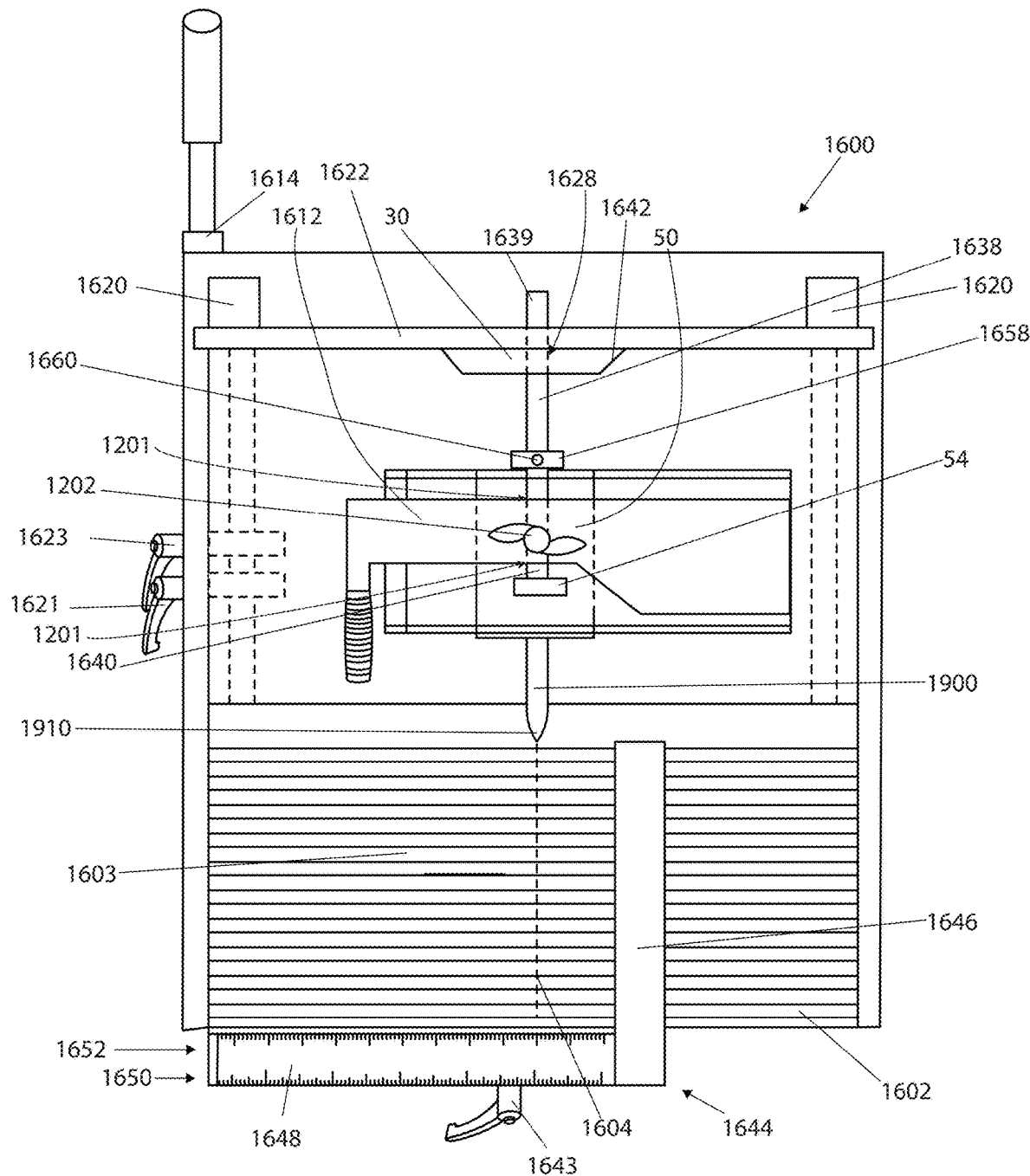
FIG. 20 is a top plan view of the elements of one or more aspects of the disclosure showing the positioning and centering system for a pantograph-type router system in the first initializing position, the system further detailing a standard full-scale-half-scale and fence combination as part of the positioning and centering system.

In accordance with another aspect of the disclosure, as shown in FIGS. 11-13 and 20, the workpiece and cutter blade positioning and centering system further comprises a guide bearing shaft 1102 (in FIGS. 11-13) and 1638 (in FIG. 20) releasably lockable in the first arm 53, 1612 of the pantograph-type router system 1600. Thus, preferably, the aforementioned centering pin 1102, 1638 of the system comprises the guide bearing shaft adapted for being releasably locked in the first arm 53, 1612 in a guide bearing function direction as shown in FIGS. 5, 12-13, and 17, or for being releasably locked in the first arm in a pin-centering function direction as shown in FIGS. 16 and 20.

Thus, in accordance with an aspect of the disclosure, the workpiece and cutter blade positioning and centering system further comprises a collar 1104 (FIGS. 11-13), 1658 (FIG. 20) releasably attachable via a threaded tightening pin 1106 (as shown in FIG. 11), 1660 (FIG. 20) to the guide bearing shaft 1102, 1638 at a pre-determined location on the shaft corresponding to an appropriate depth of insertion of the shaft into the first arm 53, 1612 and thus corresponding to a desired position of the guide bearing 54 relative to the template 1642.

In accordance with another aspect of the disclosure, the workpiece and cutter blade positioning and centering system further comprises a second thickness gauge member 1662 adapted for use as a reference in allowing simplified return of the first thickness gauge member 1630 to the first initializing position after having moved the first thickness gauge member to another position, for example allow cutting on a workpiece that is centered below the surface 1603 of the work piece cutting table 1602. This aspect of the disclosure greatly reduces the amount of effort and time necessary to return the template holder 1622 and router 50 to a position suitable for cutting above the level of the surface of the workpiece table 1602, whereas before it may have been set to a position suitable for cutting below the level of the surface of the workpiece table.

Figure 22A:
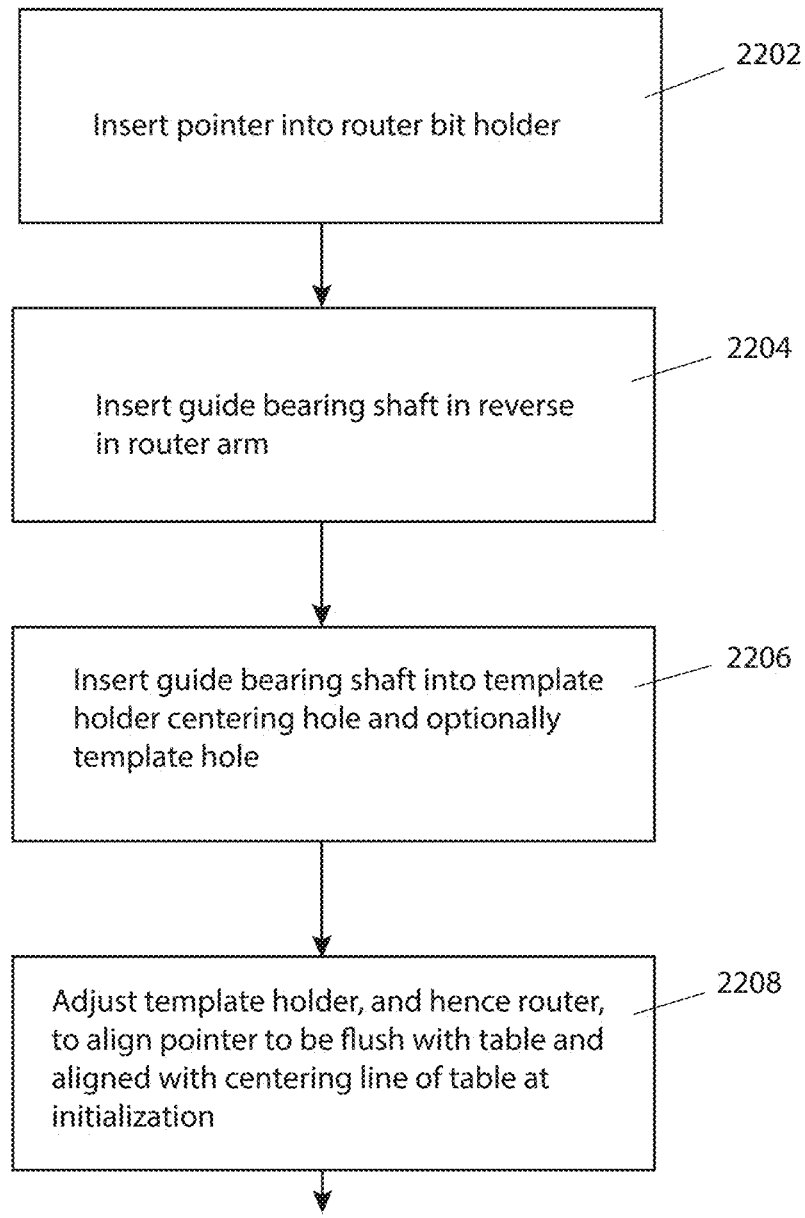
FIGS. 22A and 22B are flow charts showing steps of a method in accordance with one or more aspects of the disclosure.

In accordance with another aspect of the disclosure, there is provided an improved method, basic steps of which are shown in FIG. 22A, of locating a cutting bit relative to a workpiece using a template-guided pantograph-type router system 1600 having a router-bit holder 1606, and a workpiece holding table 1602 having a centering line 1604 thereon relative to which the router 50 is capable of being adjusted. The method comprises the steps:

step 2202 inserting into the router bit holder 1606 a half-cut, or partial-shaft, pointer 1900 having a standard mounting end 1902 for being retained in the router bit holder, or chuck, 1606, an end 1908 having a pointed tip 1910, and a longitudinally-extending cut surface 1912 extending from a location between the mounting end to the pointed tip end; and step 2208 adjusting and locating the router so that the pointed tip end 1910 of the pointer 1900 points precisely along a centering line 1604 of the workpiece holding table 1602 in a first initialized position (in other words, in accordance with this aspect of the disclosure, the method simply comprises the steps 2202 and 2208, for example when the user has already performed steps 2204 and 2206 previously-perhaps as part of another process-and as further described below).

In accordance with another aspect of the disclosure, wherein the router system further comprises a template holder 1622 having a horizontally centrally-located hole 1628, and a guide bearing 52 on a shaft 1638 adapted to be held within a hole 1201 defined in an arm 53 of the pantograph-type router system 1600, a method comprises, and/or the aforementioned method further comprises:

step 2204 inserting in reverse the guide bearing shaft 1638 within a hole 1201 (a guide bearing shaft holder) in the router arm 53, and tightening a securing knob 1202; and step 2208 inserting the shaft, preferably the guide bearing shaft 1638, into the centrally-located hole 1628 (or alternatively other centrally-located holes 1631, 1633) of the template holder 1622 to facilitate aligning the pointer 1900 with the centering line 1604 of the workpiece holding table 1602 as set forth in step 2208.

Figure 22B:
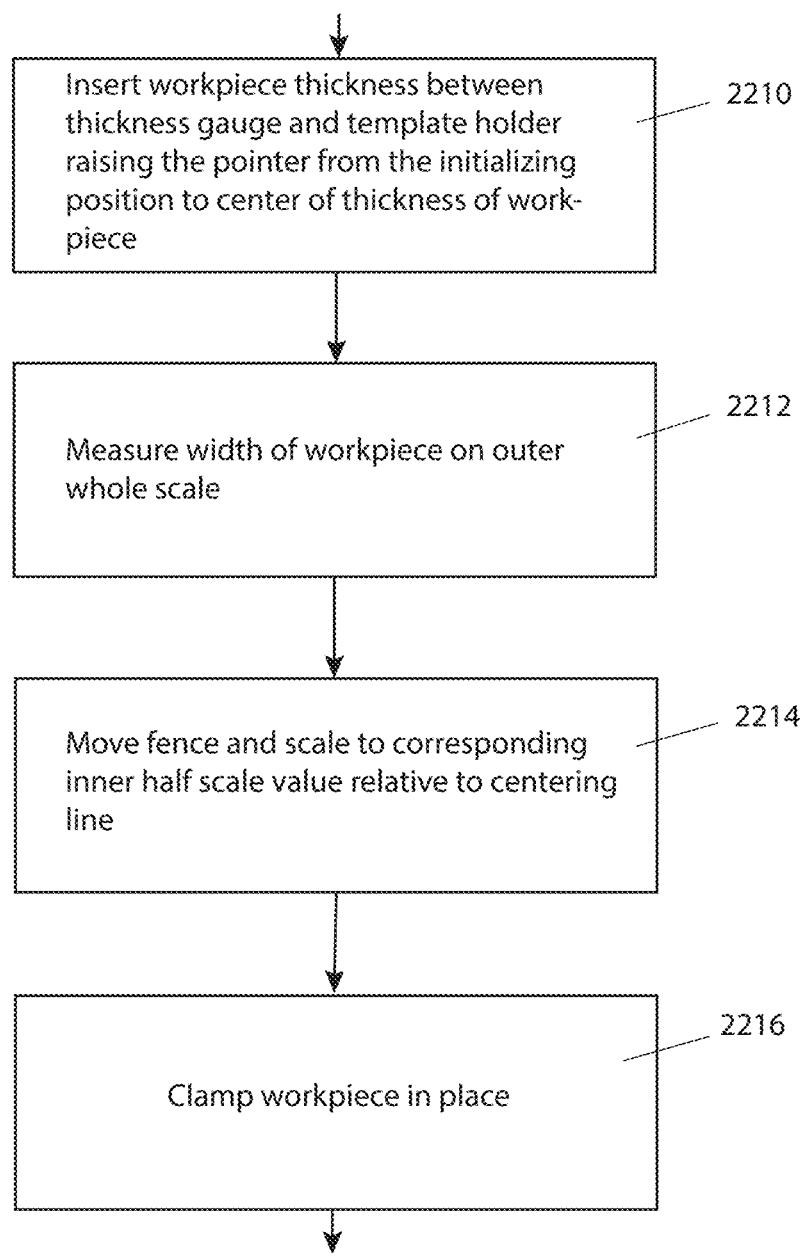

In accordance with another aspect of the disclosure (referring also to FIG. 22B, wherein the router system 1600 further comprises a thickness gauge 1630 moveably mounted on a post 1622 for the template holder 1620 corresponding to a location at zero height of the pointer 1900 pointed-tip end 1910 relative to the workpiece table (e.g., as shown in FIG. 16), wherein the template holder 1622 is adapted to also be located on the post 1620 a set distance, or no distance, from the thickness gauge 1630, and wherein the step 2204 of reversing the guide bearing shaft 1638 to align the pointer 1900 with the centering line 1604 of the workpiece holding table 1602 is preferably accomplished while there is no space between the thickness gauge 1638 and a bottom surface 1626 of the template holder 1622, a method comprises, and/or the aforementioned methods further comprises, the following step(s):

step 2210, preferably after centering the pointer 1900 relative to the workpiece cutting table 1602, further centering the pointer 1900 relative to a central midpoint of the workpiece 1608 height (e.g., as shown in FIG. 17) by inserting a workpiece into the thickness gauge 1630 and adjusting the template holder 1622, and hence the router 50 pinned in the centrally-located hole 1628 via the template holder 1622 and arm 53, upwardly to a location so the template holder rests on the workpiece at its full height, so that the workpiece is between the thickness gauge 1630 and the bottom portion 1626 of the template holder 1622 (e.g., as shown in FIG. 17). Once in this position, the user also tightens the template holder (using the clamps 1634) in place at that resting location on the workpiece. Then, when the workpiece is removed from the thickness gauge and is placed centered about the centering line 1604 on the workpiece cutting table 1602 (per later steps 2212-2216), the router bit 52 will be located at the vertical and horizontal center of the workpiece.

Typically before the mortise is cut, and advisably before the tenon is cut, in accordance with an aspect of the disclosure, wherein the router system 1600 further comprises a template 30 having a centrally-located hole 1629 therein adapted to be aligned with the centrally-located hole 1628 of the template holder 1618 cross member 1622, a method comprises, and/or the foregoing methods further comprise, the following step (as per steps 2206 and 2208 of FIG. 22A): inserting the shaft 1638 into both the centrally-located hole 1629 of the template 30 and the centrally-located hole 1628 of the template holder 1622. Of course there may be provided other horizontally-centered holes 1631, 1633 in the cross member 1622 (or otherwise advantageously-positioned holes), which may be similarly used as will be understood by those skilled in the art).

This aspect of the disclosure, together with small tenons 44 (FIG. 3C) and 84, 85, 88 (FIGS. 8A-8C), simplifies and lends precision to the locating of the template 30 on the cross member 1622 to speed up the process of assuring that the template is centered relative to the surface 1603 of the cutting table 1602.

Further, in accordance with an aspect of the disclosure, wherein the router system 1600 further comprises an adjustable workpiece alignment fence and full-scale-half-scale combination 1644 (aka fence and scale 1644), the fence and scale 1644 comprising a fence portion 1646 and a full-scale-half-scale portion 1648 (aka scale portion 1648), the scale portion 1648 further comprising a full-scale portion 1650, 1650' and a corresponding half-scale portion 1652, 1652', the fence and scale 1644 being capable of being adjusted and fixed by a user at a set distance from, and parallel to, the workpiece table centering line 1604, the method comprising, and/or the foregoing methods further comprising, the following steps:

step 2212, measuring the width of the workpiece on the full-scale portion 1650, 1650';

step 2114, setting, or moving, the fence and scale combination 1644 a distance from the workpiece table centering line 1604 at the half-scale portion 1652, 1652' distance magnitude corresponding to the full-scale portion 1650, 1650' width magnitude of the workpiece 1608; and step 2216, clamping the workpiece 1608 in place. In accordance with this aspect of the disclosure, according to this method, the workpiece 1608 is readily centered relative to the centering line 1604.

Figure 23A:
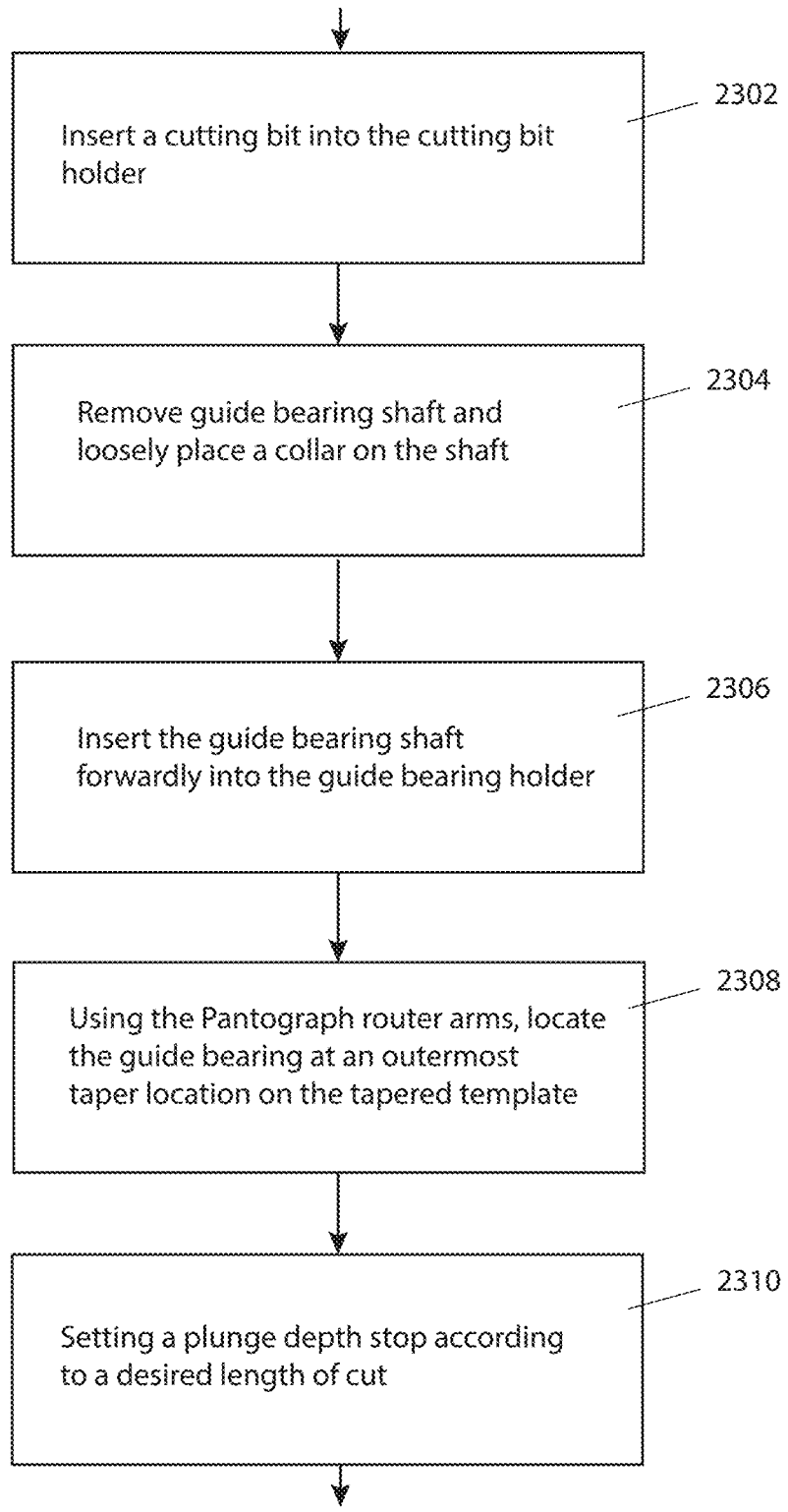
FIGS. 23A and 23B are flow charts showing steps of a method, or continuing steps of a previous method, or methods, in accordance with one or more aspects of the disclosure.
Figure 23B:
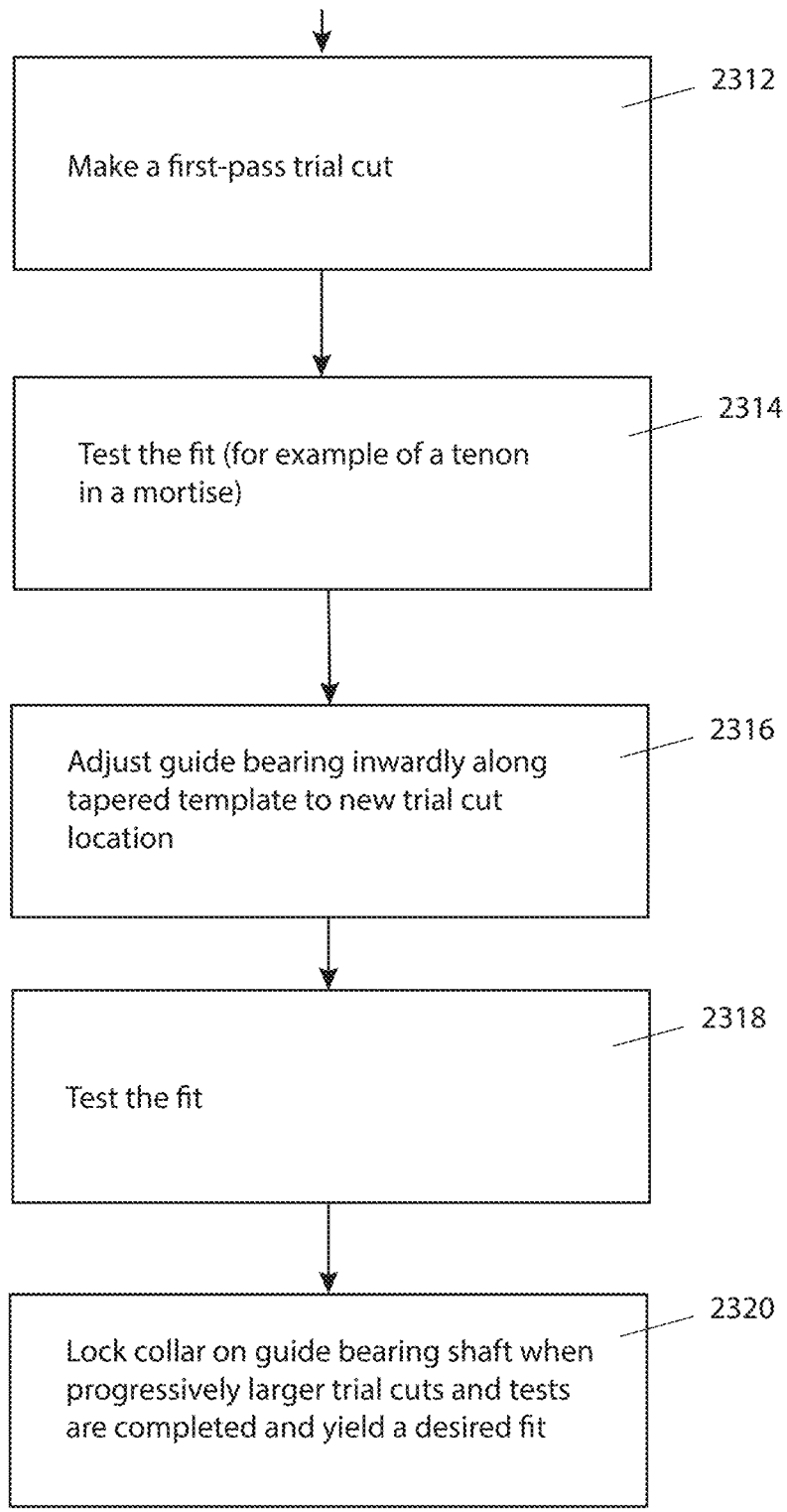
Figure 24A:
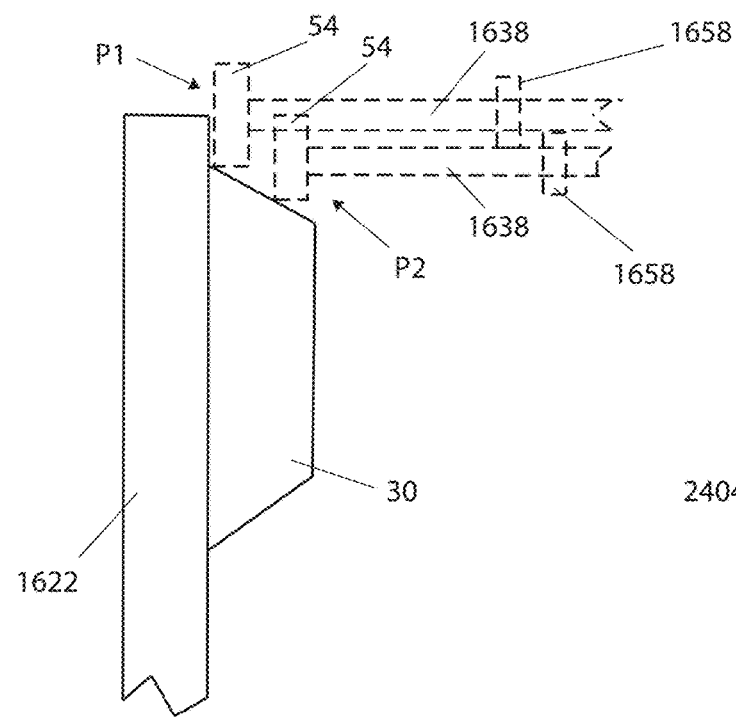
FIG. 24A is a side view of a template holder and template combination illustrating two different trial-cut positions of a collared guide bearing shaft.

Referring to FIGS. 23A and 23B, in accordance with another aspect of the disclosure, wherein the router system 1600 further comprises a lockable collar 1658 on the shaft of the guide bearing 54, and plunge depth stops 1621, 1623, a method comprises, and/or the foregoing methods further comprise, the following steps:

step 2302 replacing the pointer 1900 with a router cutting bit 52;

step 2304 removing the rearwardly-oriented guide bearing shaft 1638 from the hole 1201 defined in the arm 53 and loosely placing the lockable collar 1658 (by adjusting a threaded screw pin 1660 on the lockable collar) on the guide bearing shaft;

step 2306 inserting the guide bearing shaft in the hole 1201 defined in the arm 53 with the guide bearing 1108, 54 being in a forwardly-oriented position as shown in FIGS. 12-13 and 17;

step 2308 locating the first arm 53 and the second arm 1614 of the pantograph-type router system such that the guide bearing is positioned at P1 of FIG. 24A at an extent location (closely adjacent the template holder 1622) on an outside taper 32a (see FIGS. 3B, 4A, and 24A) of the template 30, 30''' corresponding with a largest tenon cut on the workpiece 1608;

step 2310 setting desired plunge stops 1621, 1623 controlling a desired length of a tenon;

step 2312 making a first-pass cut trial-and-error cut with the router at the largest tenon (see e.g., FIG. 24A) cut position on the tapered template and at the desired tenon length (as determined by the plunge stops 1621, 1623);

step 2314 testing the tenon fit;

step 2316 adjusting the guide bearing relative to the outside taper of the template 30 corresponding to P2 of FIG. 24A corresponding to a smaller cut trial-and-error tenon cut position on the tapered template;

step 2218 testing the tenon fit; and step 2320 locking the lockable collar 1658 on the guide bearing shaft, by tightening the threaded screw 1660 on the collar to secure it against the shaft 1638. These steps, in turn, together with the use of knob 81, 1202 to adjust the depth of the guide bearing shaft 1638 relative to a template 30, enable ready re-positioning of the router 50 via the pantograph-type router arms 53, 1614 to a precisely-determined template taper location (P1, P2, P3, etc.), for a highly-accurate tenon size corresponding to a desired mortise size.

Apart from the previously-described methods, the steps of cutting mortise and tenons are generally known. It is also generally understood that cutting the mortise portion first, of a mortise and tenon joint, is advisable. Nevertheless, prior art methods of cutting mortise and tenon joints have been more time consuming and fraught with inaccuracy. Once a positioning and centering device 1900 has been used to ensure the router cutting bit holder 1606 is centered, such that replacing the pointer with a cutting bit 52 would also tend to ensure that the cutting bit is also centered, once the plunge depth stops 1621, 1623 have been set to control the desired depth of cutting for the mortise, and once the workpiece 1608 has been positioned and clamped in place centered on the workpiece cutting table 1602 about the centering line 1604, the user is enabled in cutting the mortise portion of a joint. In this process, typically the mortise thickness is typically the same as the diameter of the cutting blade 52 chosen, together with what is known as some variation otherwise known as runout. The steps of the method disclosed herein are very important for achieving very-high-quality fitting joints, because they allow for microadjustment of a tenon considering slight variations in a mortise, depending on such things as variations from one router system to the next, variations in one cutting blade to the next, sharpening of cutting blades, and variations in one setup to the next.

As a practical matter, the front plunge stop 1621 is positioned such that the cutting bit 52 stops before it gets to a front edge of the workpiece cutting table 1602, so that the cutting bit stops before it can do damage to the table during an operation. This means then, that the workpiece 1608 is fixed to the workpiece cutting table 1602, centered around centering line 1604, with portion of the workpiece to be cut extending over the front edge of the table, the workpiece otherwise being held in place with clamps 1656 on the table. In this regard, it is important to understand that the first arm 53 controls movement of the cutting bit in X, Y coordinate space using side-to-side motions manipulating the guide bearing 54 typically within an inner portion of the template 30 to cut the mortise, and this is typically performed at half scale (or 2:1 ratio, meaning that the mortise will be half the length of the length of the inner portion of the template). Further, the user should note that the depth of plunge in the Z space is controlled by the depth plunge handle 1614, and this operation is typically conducted on a 1 to 1 scale (meaning every unit of travel of the router frame in the Z-direction translates into an equal unit of travel of the cutting bit, and hence depth of the cut).

The plunge depth stops 1621, 1623 control the depth of plunge of the router bit to prevent the router cutting bit 52, or cutting bit holder 1606, from hitting and damaging the table during operation. The stops 1621, 1623 also allow the user to appropriately measure and gauge the proper length of a mortise and tenon combination, since in practice, it can be important to have only a very slight difference between the depth of the mortise (slightly longer) than the length of the tenon, to allow some room for gluing the joint together. Further, the plunge handle 1614 helps to assist the user in verifying centering of the pointer 1900, or cutting bit 52, relative to the workpiece 1608 and/or the table 1602.

After the mortise is cut, typically the tenon is cut with basically the same setup as described previously for the mortise, assuming that the tenon workpiece is the same size as the mortise workpiece (which is not always the case). Where a different sized workpiece for the tenon is required, some of the latter portions of the setup would need to be repeated (for example to determine the thickness and width of the workpiece as per steps 2210, 2212, 2214, 2216, and to determine the location of the guide bearing 54 as per steps 2302, 2304, 2306, 2308, 2310, 2312, 2314, 2316, 2318, 2320, each to the degree necessary) to be sure that the cutting blade is appropriately positioned and centered according to the differently-sized workpiece. Before the tenon is cut, there is also a need to re-set the plunge depth stop 1621 to slightly less depth, perhaps about ⅛" less than the depth of the mortise, to allow for gluing, and further considering the change in position of the workpiece accounting for a perhaps differently-sized workpiece.

The foregoing methods and method steps greatly reduce the amount of time and effort required to cut on workpieces 1608, and in particular to cut mortise and tenon joints on a pantograph-type router system 1600, than that previously experienced. Further, the foregoing methods and method steps greatly reduce the amount of time and effort required to re-setup the pantograph-type router system 1600 to return to work that is similar to work performed previously. Thus, for example, in accordance with the aforementioned device, system, and methods, a user is enabled in quickly recreating similar cuts, in particular tenon cuts, since a pre-set collar 1658 and guide-bearing shaft 1638 combination may be selected, regardless of the length of a particular template 30 chosen to cut a particular tenon, as long as a same type and diameter of cutting bit is used (i.e., from the same manufacturer), since otherwise different cutting bits have different characteristics.

Figure 21:
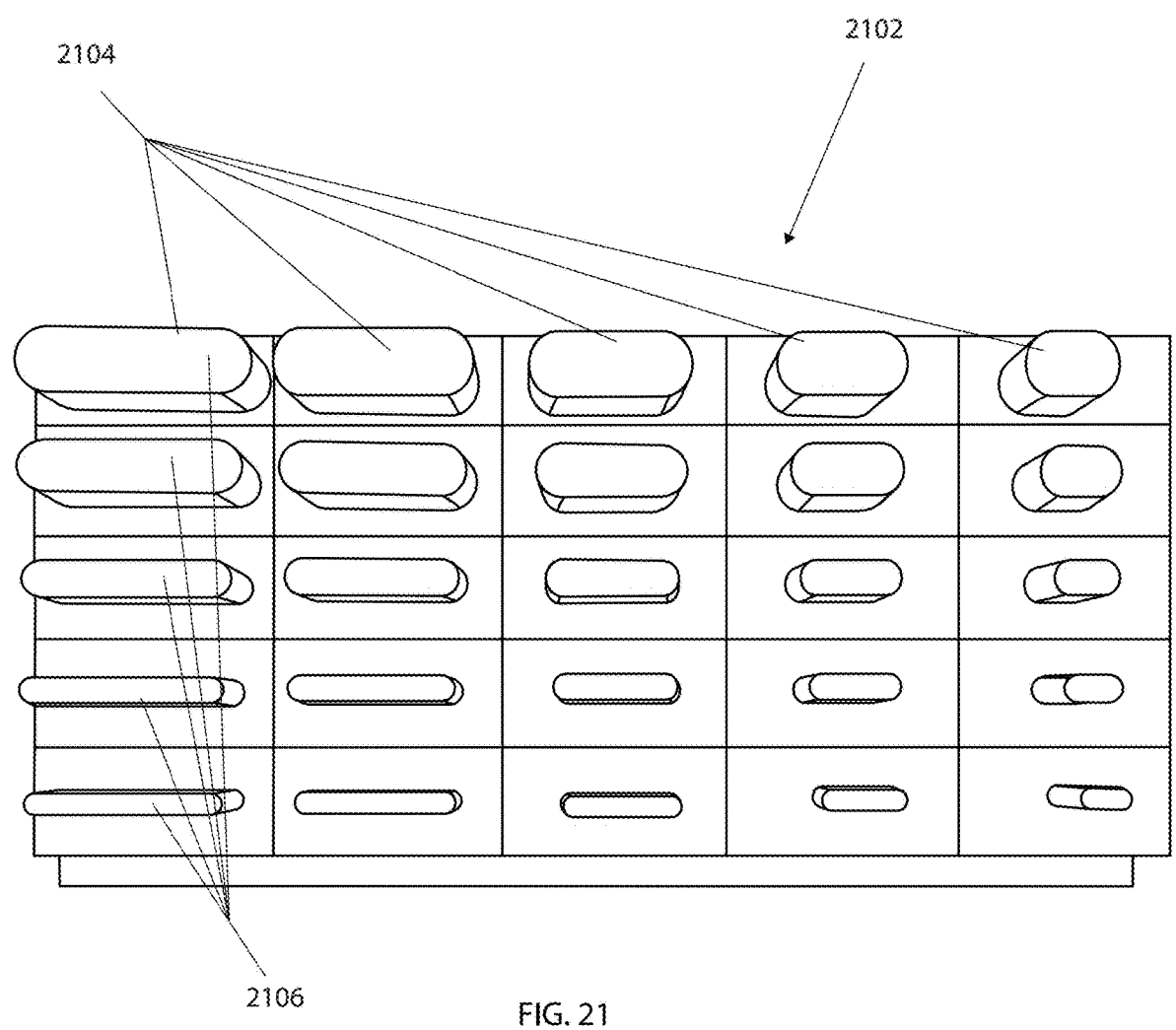
FIG. 21 is an illustration of a tenon display for purposes of clarifying certain aspects of the positioning and centering system of the disclosure.

Referring now also to FIG. 21, these advantages associated with the previously-described simplified methods of positioning and centering, and with a plurality of the aforementioned pre-set collar locations, using a plurality of collars 1658 with one collar per shaft, on a number of pre-saved, pre-determined, different guide bearing 54 (including possibly guide bearings 54' or 1108') and shaft 1638 combinations, makes the cutting of different tenons faster and easier, for example in a production workshop. Thus, for example, differing width tenons 2104 (which have the same thickness), such as are illustrated in row orientation on FIG. 21, may be easily cut with a very quick and easy process, e.g., the processes described herein using a single pre-set collar 1658 location on a shaft 1638, as compared to prior art methods. Thus, this relative ease by using a guide bearing 54 and shaft 1638 combination with a same collar 1658 location on the shaft may obtain whether one is using it to cut a tenon that is for example 1", 1.5", 2.0", 2.5", or 3.0" wide, since each of these may be cut using a template having the same taper, as long as the user is using a same size, and similar type, cutting bit.

To choose an appropriately-sized template, given a particular size of mortise and tenon to be cut (e.g., a ½" by 3" tenon), a user may generally follow a modified sizing calculation as set forth in the tables shown in FIG. 26 for standard-sized joinery, whether using inch-sized sizing calculations or metric-sized sizing calculations. Though the table in FIG. 26 is for standard non-tapered templates, it may be adapted for, for example, 5° (degree) tapered templates by understanding that, for example, the desired size joinery element may be found at about ½ way into the 5° taper of the tapered template. Thus, for example, at about ½ way in the Z direction along the exterior taper for a tapered template for a 3-inch wide tenon, using a given cutting bit diameter and guide bearing diameter per the table in FIG. 26, there will be produced a 3-inch wide tenon.

In this way, the system and methods of the present disclosure enable production of precise joinery which is otherwise very difficult to produce given the facts that bit diameter's change as the bits are sharpened, there are slight variations in bit diameters from one manufacturer to the next, and due to runout (non-perfect rotation of a bit in a chuck). This is because the user is enabled, through a single trial-and-error process, to fix a specific collar and guide bearing shaft combination for cutting a tenon using a continuously-tapered template, wherein the tenon is known through one trial-and-error process to precisely fit a particularly-sized mortis, even given the aforementioned variable factors affecting the sizes of the joinery. And given the table of FIG. 26, it will be appreciated that there are many possible combinations of bit sizes, guide bearing sizes, and template sizes, that may be used to achieve a particular joinery size.

With the device, system, and methods of the present disclosure, once the user has found the ideal location for the guide bearing 54 on the template 30, and the collar 1658 is locked on the shaft 1638, and multiple of such collar and shaft combinations may be marked with sizing information, such as ½", ⅜", ¾" labels correlated with the thickness of the tenon to be cut. Thereafter, the collar and shaft combination(s) may be stored, and easily retrieved, the next time a similarly-sized tenon is to be cut using a similar or same cutting bit. This reduces the amount of time and effort that a user is required to spend in re-finding the right location for the guide bearing 54 on the template 30. And this time and effort savings adds to even greater savings as other positioning and centering device system and methods disclosed herein before are employed by the user. And the foregoing time savings are especially significant in a production workshop, or in a teaching facility workshop. For example assume that a user may cut many of a particular size of joints, say for example 30½-inch-thick by 2-inch-wide tenons, on one day, using a particular bit size, template size, and collar location combination in accordance with one or more aspects of the disclosure. Thereafter, the user may shift to a different type of job with that machinery for a few days using different tooling. And then, assume that a few days later that user may wish to cut another set of similarly-sized joints as were cut previously, but instead this time with 3 inch-wide tenons. Such would be easy to accomplish by simply using the same collared guide bearing as was saved and labeled previously. And if such production shifts between types of jobs are routinely encountered, as would be the case in a production workshop, this would amount to a large time savings over time for the user.

Figure 24B:
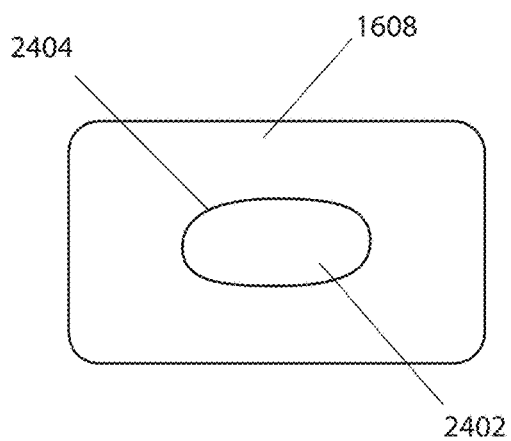
FIG. 24B is a cross section end view of a workpiece tenon and mortise joint showing no gaps between the tenon and mortise sidewalls.
Figure 24C:
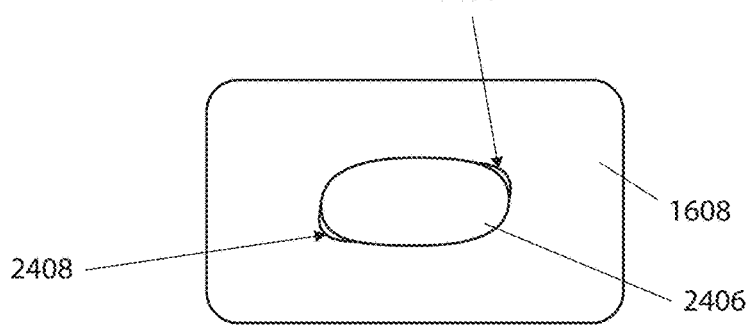
FIG. 24C is a cross section end view of a workpiece tenon and mortise joint showing gaps between the tenon and mortise sidewalls.
Figure 25A:
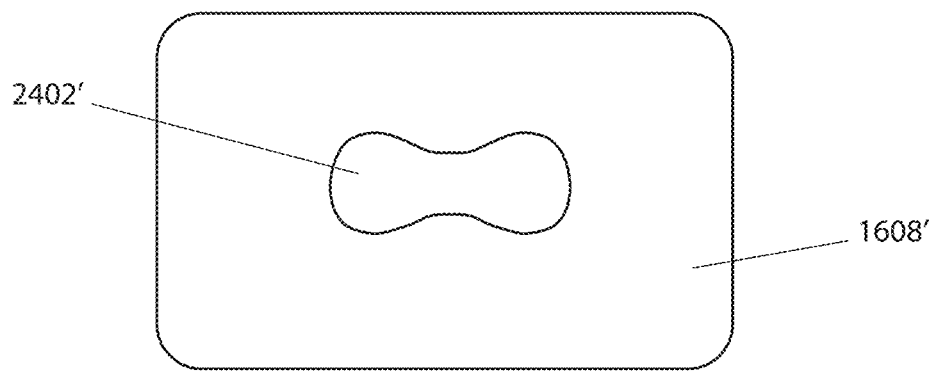
FIGS. 25A and 25B show alternate types of tenon and mortise joints showing no gaps between the tenon and mortise sidewalls.
Figure 25B:
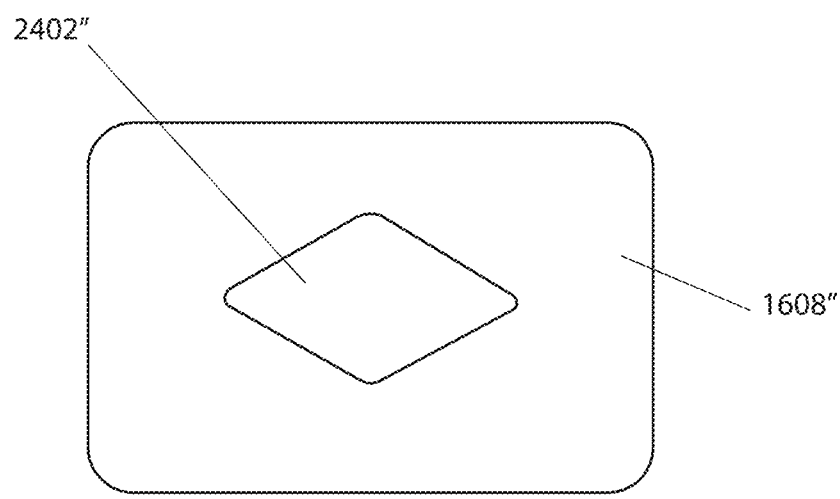

The various aspects of the present disclosure provide a device, system, and methods which are easily repeatable in the sense that one mortise and tenon joint, after another, may be quickly and easily accomplished, resulting in highly accurate cuts of the types illustrated by workpiece 1608 and tenon 2402, 2402', 2402" in FIGS. 24B, 25A, and 25B (note that at 2404, there is no gap). Whereas with prior art methods gaps 2408 are more likely as illustrated between the tenon 2406 and mortise surfaces as illustrated in FIG. 24C, leading to weakness and failure of joinery. As shown in FIGS. 25A and 25B, various sizes and shapes of cuts may be made using the aforementioned methods, depending on the shape of the tapered template selected, and these may be just as readily facilitated and made accurate with the disclosed device system and methods.

Thus, each time a user wants to cut a particular size of tenon joint, for example, regardless of the size of the workpiece chosen, the user is enabled in selecting a collar and shaft combination that will work for that profile, regardless of the length of the template, and hence width, of the tenon to be cut.

Referring again to FIG. 21, there is shown a tenon display 2102 enabling more description of the relationship between templates, cutting bits, and collar locations on shafts, generally. Thus, as similar thickness tenons 2104 are displayed moving left to right, they comprise smaller, and smaller width tenons. Such variations in tenons may be accomplished using smaller and smaller width templates 30, while nevertheless using the same collar 1658 setting location on a guide bearing shaft 1638—assuming similar or same cutting bits 52 from a same manufacturer is being used—and this can greatly reduce the time it takes to do a project requiring such different-width tenons. However, as varying thickness 2016 tenons are displayed moving vertically on the display, the thickness of each tenon gets thinner and thinner from the top to the bottom of the display (though the width may stay similar). Such variations in tenons are often cut with differently-sized bits, and from perhaps different manufacturers, so each may require a different collar setting. Nevertheless, the other steps of the methods disclosed herein may otherwise reduce the time needed for the project, and savings of time may be also nevertheless be accomplished from one project to the next by using pre-set collar settings for like parts of like projects.

Many modifications and other embodiments of the disclosure set forth herein will come to mind to one skilled in the art to which this disclosure pertains and having the benefit of the teaching presented in the foregoing descriptions and the associated drawings. Therefore, it should be understood that the disclosure is not to be limited to the specific embodiments disclose and that modifications and other embodiments are intended to be included within the scope of the appended claims.

We claim:

1. A centering system adapted for use in centering a pantograph-type router, the pantograph-type router having a cutting bit holder having an anterior portion and a posterior portion, the pantograph-type router having an arm for allowing a user to control movement of the router in X, Y coordinate space and a plunge handle for allowing the user to control movement of the router in Z coordinate space, the centering system adapted for use in centering the pantograph-type router, comprising:
   a workpiece table comprising a surface for supporting a workpiece;
   a centering device comprising a retained portion adapted for being retained in the cutting bit holder, wherein said centering device further comprises a pointed portion contiguous with and extending from said retained portion, said pointed portion being at least partially tapered extending along at least a part of its length to a pointed end of said pointed portion, said pointed portion further comprising a flat surface extending along at least a part of the length of said pointed portion and terminating at the pointed end of said pointed portion, such that the pantograph-type router is centered as the flat surface of said pointed portion is brought to rest flush on the surface of said workpiece table with the pointed end of said pointed portion pointing along a centering line.

2. The centering system of claim 1, wherein at least a portion of said retained portion of said centering device is elongated adapted for being retained in the cutting bit holder, wherein said workpiece table has a workpiece table centering line, and wherein the centering system further comprises a centering pin and a template holder having a centering hole in said template holder for further facilitating centering of the pantograph-type router when said centering pin is in the centering hole as said pointed portion is aligned with the workpiece table centering line.

3. The centering system of claim 1, wherein said pointed portion is elongated adapted for extending longitudinally along a centering line when said pointed end is aligned with the centering line and the flat surface of said pointed portion is flush engaged with said surface of said workpiece table, and wherein the system further comprises a centering pin and a template having a centering hole in said template for further facilitating centering of the pantograph-type router when said centering pin is in the centering hole as said pointed portion is aligned.

4. The centering system of claim 3, wherein said retained portion is circular in cross section, and said pointed portion semi-circular in cross section having a decreasing diameter as said pointed portion extends to the pointed end of said pointed portion.

5. The centering system of claim 3, wherein said workpiece table comprises a front edge and the surface of said workpiece table comprises an upper surface, wherein the flat surface of said pointed portion extends from an intermediate point of origin along a length of said retained portion and said pointed portion combined, further comprising a shelf cut perpendicular to a longitudinal axis of said centering device, said shelf forming a right angle with the flat surface at the intermediate point of origin of the flat surface, said shelf engaging the front edge of said workpiece table when the flat surface is flush engaged with the upper surface of said workpiece table to further facilitate centering of the pantograph-type router.

6. The centering system of claim 1, wherein said workpiece table comprises a front edge and the surface of said workpiece table comprises an upper surface, wherein the flat surface, of said pointed portion extends from an intermediate point of origin along a length of said retained portion and said pointed portion combined, further comprising a shelf cut perpendicular to a longitudinal axis of said centering device, said shelf forming a right angle with the flat surface at the intermediate point of origin of the flat surface, said shelf engaging the front edge of said workpiece table when the flat surface is flush engaged with the upper surface of said workpiece table to further facilitate centering of the pantograph-type router.

7. A workpiece and cutter blade positioning and centering system adapted for use with a guide bearing and template-guided pantograph-type router system having a workpiece cutting table, a first arm for moving the router and cutting blade in X and Y coordinate spaces, a second arm for moving the router and cutting blade in a Z coordinate space, and a cutting blade holder, comprising:
   a template holder comprising a plurality of legs and an adjustable cross member fixable horizontally normal to the legs, the cross member having a first upper surface and a second lower surface, the cross member having defined therein at least one hole;
   a first thickness gauge member on at least one of said plurality of legs, said first thickness gauge member having a surface adapted to engage a surface of the cross member in a first initializing position of the cross member, wherein upon moving the cross member away from said first thickness gauge member, said first thickness gauge member and the cross member are adapted to have a workpiece inserted therebetween in a second position wherein a surface of said first thickness gauge member and a surface of the cross member each engage opposing surfaces of the thus-inserted workpiece, the cross member being adapted for being releasably fixed to the plurality of vertical legs;
   a pointed elongated positioning and centering device comprising a partially flat surface and adapted for installation into the cutting blade holder;
   a centering line on the workpiece cutting table; and
   a centering pin having first and second ends and adapted at the first end for insertion into the arm of the pantograph-type router system, and further adapted at the second end also for being inserted into the hole defined in the template holder cross member, wherein upon having been inserted in both the arm and the hole, the centering pin aligns the arm at a location wherein the pointed elongated positioning and centering device is aligned with said centering line of the workpiece cutting table in the first initializing position useful for centered placement of a workpiece on the workpiece cutting table.

8. The workpiece and cutter blade positioning and centering system of claim 7, further comprising a template having a center hole therein adapted for aligning with the center hole of the cross member of said template holder and associated tightening means for releasably locking said template into position on the cross member, said template being adapted for being centered on the cross member by aligning the hole of said template with the hole of the cross member and inserting said centering pin through both holes while tightening said template onto the cross member.

9. The workpiece and cutter blade positioning and centering system of claim 7, further comprising an adjustable fence and full-scale-half-scale combination, said fence being moveably attached and adjustable relative to said centering line and the workpiece cutting table, said adjustable fence and half-scale combination adapted for use measuring a full width of the workpiece with said adjustable fence and full-scale-half-scale combination and setting the adjustable fence and full-scale-half-scale combination to a width corresponding to half of the workpiece width aligned at said centering line of the workpiece cutting table to thus center the workpiece relative to said centering line.

10. The workpiece and cutter blade positioning and centering system of claim 8, wherein the guide bearing further comprises a shaft releasably lockable in the first arm of the pantograph-type router system, and wherein said centering pin comprises said shaft adapted for being releasably locked in the first arm in a guide bearing function direction or for being releasably locked in the first arm in a pin-centering function direction.

11. The workpiece and cutter blade positioning and centering system of claim 10, further comprising a collar releasably attachable to said shaft at a pre-determined location on said shaft corresponding to an appropriate depth of insertion of said shaft into said first arm and thus corresponding to a desired position of the guide bearing relative to said template.

12. The workpiece and cutter blade positioning and centering system of claim 7, further comprising a second thickness gauge member adapted for use as a reference in allowing simplified return of said first thickness gauge member to the first initializing position after having moved said first thickness gauge member to another position.

13. The workpiece and cutter blade positioning and centering system of claim 9, wherein said adjustable fence and full-scale-half-scale combination comprises a fence portion and a full-scale-half-scale portion normal to the fence portion, the full-scale-half-scale portion further comprising an outer scale that is a full-scale measuring device and an inner scale that is a half-scale measuring device integral with the full-scale measuring device, the full-scale-half-scale portion having measurement numbers in paired full-scale-half-scale 2:1 ratios at equidistant outer and inner locations, respectively, relative to the fence portion.

14. The workpiece and cutter blade positioning and centering system of claim 7, wherein said pointed elongated positioning and centering device further comprises an elongated retained portion adapted for being retained in the cutting bit holder, and a pointed portion contiguous with and extending from said retained portion and adapted for extending outwardly from the anterior portion of the cutting bit holder to an end of said pointed portion, the end adapted to be positioned closely to the workpiece and the workpiece table for centering purposes, the pointed portion being at least partially tapered along at least a part of its length to a point at the end of said pointed portion, wherein the pointed portion further comprises the flat surface, the flat surface extending along at least a part of the length of the pointed portion and terminating at the pointed end of the pointed portion, such that the flat surface of the pointed portion may be brought to rest flush on the workpiece table with the pointed end of the pointed portion pointing along the centering line of the workpiece table in at least a first initializing position.

15. An improved method of locating a cutting bit relative to a workpiece using a template-guided pantograph-type router system, the router system having a router-bit holder, and a workpiece holding table having a centering line thereon and relative to which the router is capable of being adjusted, comprising the steps:
    inserting into the router bit holder a partial-shaft pointer having a standard mounting end, a pointed-tip end, and a longitudinally-extending cut surface extending from a location between the mounting end to the pointed tip end;
    adjusting and locating the router so that the pointed tip of the pointer points precisely along a centering line of the workpiece holding table.

16. The method of claim 15, wherein the router system further comprises a template holder having a horizontally centrally-located hole, and a guide bearing on a shaft adapted to be held within a hole defined in an arm of the pantograph-type router system, further comprising the step:
    reversing one of the guide bearing shaft and another shaft within the guide bearing holder so that the shaft may be inserted into the centrally-located hole of the template holder to facilitate aligning the pointer with the centering line of the workpiece holding table.

17. The method of claim 16, wherein the router system further comprises a thickness gauge moveably mounted on a post for the template holder corresponding to a location at zero height of the pointer pointed-tip end relative to the workpiece table, wherein the template holder is adapted to also be located on the post a set distance, or no distance, from the thickness gauge, wherein the step of reversing one of the guide bearing shaft and the another shaft to align the pointer with the centering line of the workpiece holding table is accomplished while there is no space between the thickness gauge and the bottom template holder, and further comprising the steps:
    after centering the pointer relative to the workpiece table, centering the pointer relative to a central midpoint of the workpiece height by inserting a workpiece into the thickness gauge;
    adjusting the template holder, and hence the router pinned in the centrally-located hole of the template holder, upwardly to a location so it rests on the workpiece at its full height so that the workpiece is between the thickness gauge and the bottom portion of the template holder; and
    tightening the template holder in place at that resting location on the workpiece so that, when the workpiece is removed from the thickness gauge and is placed on the workpiece table, the router bit will be located at the center of the workpiece as the workpiece is centered on the centering line of the workpiece holding table.

18. The method of claim 16, wherein the router system further comprises a template having a centrally-located hole therein adapted to be aligned with the centrally-located hole of the template holder, and further comprising the step:
    Inserting the one of the guide bearing shaft and the another shaft into both the centrally-located hole of the template and the centrally-located hole of the template holder.

19. The method of claim 17, wherein the router system further comprises an adjustable workpiece alignment fence connected to a full-scale-half-scale having a full-scale portion and a corresponding half-scale portion, the fence being capable of being adjusted and fixed by a user at a set distance from, and parallel to, the workpiece table centering line, further comprising the steps:
    measuring the width of the workpiece on the full-scale portion; and setting the fence a distance from the workpiece table centering line at the half-scale portion distance magnitude corresponding to the full-scale portion width magnitude of the workpiece.

20. The method of claim 19, wherein the router system further comprises a lockable collar on the shaft of the guide bearing, and plunge depth stop, further comprising the steps:
replacing the pointer with a router cutting bit;
removing the one of the rearwardly-oriented guide bearing shaft and the rearwardly-oriented another shaft from the hole defined in the arm;
loosely placing the lockable collar on the one of the guide bearing shaft and the another shaft;
inserting the guide bearing shaft in the hole defined in the arm with the guide bearing being in a forwardly-oriented position;
locating the arm of the pantograph-type router system such that the guide bearing is positioned at a location on an outside taper of the template corresponding with a largest tenon cut on the workpiece;
setting a desired plunge stop depth controlling a desired length of a tenon;
making a first pass cut trial-and-error cut with the router at the largest tenon cut position on the tapered template and at the desired tenon length;
testing the tenon fit;
adjusting the guide bearing relative to the outside taper of the template corresponding to a smaller cut trial-and-error tenon cut position on the tapered template;
testing the tenon fit; and
locking the lockable collar on the guide bearing shaft to enable ready re-positioning of the router via the pantograph-type router arm at the thus precisely-determined template taper location for a highly-accurate tenon size corresponding to a desired mortise size.

* * * * *